United States Patent
You et al.

(10) Patent No.: US 10,952,209 B2
(45) Date of Patent: Mar. 16, 2021

(54) METHOD AND LC APPARATUS FOR RECEIVING DOWNLINK CONTROL CHANNEL

(71) Applicant: LG ELECTRONICS INC., Seoul (KR)

(72) Inventors: Hyangsun You, Seoul (KR); Yunjung Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/567,951

(22) PCT Filed: Apr. 18, 2016

(86) PCT No.: PCT/KR2016/003973
§ 371 (c)(1),
(2) Date: Oct. 19, 2017

(87) PCT Pub. No.: WO2016/175486
PCT Pub. Date: Nov. 3, 2016

(65) Prior Publication Data
US 2018/0110045 A1 Apr. 19, 2018

Related U.S. Application Data

(60) Provisional application No. 62/154,663, filed on Apr. 29, 2015, provisional application No. 62/158,549, (Continued)

(51) Int. Cl.
*H04W 72/04* (2009.01)
*H04L 1/00* (2006.01)
(Continued)

(52) U.S. Cl.
CPC ......... *H04W 72/0446* (2013.01); *H04J 11/00* (2013.01); *H04L 1/0046* (2013.01);
(Continued)

(58) Field of Classification Search
None
See application file for complete search history.

(56) References Cited

U.S. PATENT DOCUMENTS

| 2014/0098761 A1* | 4/2014 | Lee | H04W 24/02 |
| | | | 370/329 |
| 2015/0131579 A1* | 5/2015 | Li | H04L 1/1858 |
| | | | 370/329 |

(Continued)

FOREIGN PATENT DOCUMENTS

| CN | 101388707 | 3/2009 |
| CN | 103391151 | 11/2013 |

(Continued)

OTHER PUBLICATIONS

Chinese application No. 201680032858.3, Office Action dated Jan. 2, 2020, 7 pages.

(Continued)

*Primary Examiner* — Christopher T Wyllie
(74) *Attorney, Agent, or Firm* — Lee Hong Degerman Kang & Waimey

(57) ABSTRACT

The disclosure of the present specification provides a method for receiving a downlink control channel in a low-capability (LC) or low-cost (LC) apparatus. The method may comprise a step of determining a search space for monitoring the downlink control channel, wherein the search space can be defined by a candidate of the downlink control channel according to a set level and a repetition level. Each candidate can be repeated on a plurality of consecutive subframes which start from a start subframe. The location of the start subframe can be determined by a value obtained from an RRC signal. The method may comprise a step of decoding each candidate of the downlink control channel repeated on the consecutive subframes.

20 Claims, 40 Drawing Sheets

Related U.S. Application Data filed on May 8, 2015, provisional application No. 62/236,995, filed on Oct. 5, 2015, provisional application No. 62/248,285, filed on Oct. 29, 2015, provisional application No. 62/248,375, filed on Oct. 30, 2015, provisional application No. 62/251,752, filed on Nov. 6, 2015.

(51) Int. Cl.
*H04L 1/08* (2006.01)
*H04J 11/00* (2006.01)
*H04L 5/00* (2006.01)
*H04W 4/70* (2018.01)

(52) U.S. Cl.
CPC .............. *H04L 1/08* (2013.01); *H04L 5/0053* (2013.01); *H04L 5/0064* (2013.01); *H04W 72/042* (2013.01); *H04W 4/70* (2018.02)

(56) References Cited

U.S. PATENT DOCUMENTS

| | | | |
|---|---|---|---|
| 2015/0181440 A1* | 6/2015 | Chen | H04B 7/0697 370/329 |
| 2015/0341956 A1* | 11/2015 | Sun | H04L 5/0001 370/329 |
| 2016/0095111 A1* | 3/2016 | Wong | H04W 72/048 370/336 |
| 2016/0100422 A1* | 4/2016 | Papasakellariou | H04L 1/1861 370/329 |
| 2016/0112997 A1* | 4/2016 | Chen | H04W 72/042 370/329 |
| 2016/0219587 A1* | 7/2016 | Lin | H04L 5/0044 |
| 2016/0249331 A1* | 8/2016 | Park | H04L 1/08 |
| 2016/0338018 A1* | 11/2016 | Awad | H04L 5/0053 |
| 2017/0359801 A1* | 12/2017 | Chen | H04W 4/70 |
| 2018/0048448 A1* | 2/2018 | Zhang | H04L 5/0053 |
| 2018/0084561 A1* | 3/2018 | Liu | H04L 1/08 |
| 2018/0160453 A1* | 6/2018 | Lee | H04W 48/12 |

FOREIGN PATENT DOCUMENTS

| | | | | |
|---|---|---|---|---|
| CN | 104202828 | | 12/2014 | |
| CN | 2015101694423 | * | 4/2015 | |
| KR | 1020150041562 | | 4/2015 | |
| WO | 2013019088 | | 2/2013 | |
| WO | 2014/111043 | | 7/2014 | |
| WO | 2015/006919 | | 1/2015 | |
| WO | 2015/050339 | | 4/2015 | |
| WO | WO 2015/050339 | * | 4/2015 | ............ H04L 27/26 |

OTHER PUBLICATIONS

European Patent Office Application Serial No. 16786672.2, Search Report dated Dec. 6, 2018, 10 pages.

LG Electronics, "(E)PDCCH transmission for MTC coverage enhancement", 3GPP TSG RAN WG1 Meeting #76, R1-140306, Feb. 2014, 6 pages.

LG Electronics, "Downlink control channel related issues for MTC", 3GPP TSG RAN WG1 Meeting #80, R1-150199, Feb. 2015, 9 pages.

Nokia Networks, "Physical Downlink Control Channel for MTC," 3GPP TSG-RAN WG1 #80bis, R1-151305, Apr. 2015, 6 pages.

NEC, "Physical downlink control channel for enhanced coverage MTC UEs," 3GPP TSG-RAN WG1 #80bis, R1-151561, Apr. 2015, 6 pages.

Samsung, "M-PDCCH Transmission for Low Cost UEs," 3GPP TSG-RAN WG1 #80bis, R1-151582, Apr. 2015, 5 pages.

ZTE, "Detailed design on Physical downlink control channel for MTC enhancement," 3GPP TSG-RAN WG1 #80bis, R1-151728, Apr. 2015, 10 pages.

3rd Generation Partnership Project (3GPP), "Technical Specification Group Radio Access Network; Evolved Universal Terrestrial Radio Access (E-UTRA); Physical Channels and Modulation (Release 10)," 3GPP TS 36.211 V10.4.0, Dec. 2011, 101 pages.

3rd Generation Partnership Project (3GPP), "Technical Specification Group Radio Access Network; Evolved Universal Terrestrial Radio Access (E-UTRA); Multiplexing and channel coding (Release 10)," 3GPP TS 36.212 V10.2.0, Jun. 2011, 78 pages.

PCT International Application No. PCT/KR2016/003973, Written Opinion of the International Searching Authority dated Jul. 26, 2016, 108 pages.

Chinese application No. 201680032858.3, Office Action dated Apr. 2, 2020, 10 pages.

State Intellectual Property Office of the People's Republic of China Application Serial No. 201680032858.3, Office Action dated Nov. 3, 2020, 5 pages.

* cited by examiner interleaved/discontinuous SS

METHOD AND LC APPARATUS FOR RECEIVING DOWNLINK CONTROL CHANNEL

CROSS-REFERENCE TO RELATED APPLICATIONS

This application is the National Stage filing under 35 U.S.C. 371 of International Application No. PCT/KR2016/003973, filed on Apr. 18, 2016, which claims the benefit of U.S. Provisional Application No. 62/154,663, filed on Apr. 29, 2015, 62/158,549, filed on May 8, 2015, 62/236,995, filed on Oct. 5, 2015, 62/248,285, filed on Oct. 29, 2015, 62/248,375, filed on Oct. 30, 2015, and 62/251,752, filed on Nov. 6, 2015, the contents of which are all hereby incorporated by reference herein in their entirety.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", a physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

Meanwhile, in recent years, research into communication between devices or the device and a server without human interaction, that is, without human intervention, that is, machine-type communication (MTC) has been actively conducted. The MTC represents a concept in which not a terminal used by human but a machine performs communication by using the existing wireless communication network.

Since MTC has features different from communication of a normal UE, a service optimized to MTC may differ from a service optimized to human-to-human communication. In comparison with a current mobile network communication service, MTC can be characterized as a different market scenario, data communication, less costs and efforts, a potentially great number of MTC devices, wide service areas, low traffic for each MTC device, etc.

Meanwhile, in order to increase a penetration rate through reduction in cost of an MTC device, a proposal that the MTC device should use only a subband of about 1.4 MHz, regardless of overall system bandwidth of a cell, is under discussion.

This, however, has a problem that the MTC device cannot properly receive an existing PDCCH transmitted from a base station on the entire system band.

SUMMARY OF THE INVENTION

Accordingly, a disclosure of the present specification has been made in an effort to solve the aforementioned problem.

To achieve the foregoing purposes, the disclosure of the present invention proposes a method for receiving a downlink control channel. The method may performed by a low-cost/low-capability (LC) device and comprise: determining a search space for monitoring the downlink control channel. The search space may be defined by candidates of the downlink control channel according to an aggregation level and a repetition level. Each candidate may be repeated in a plurality of consecutive subframes starting with a start subframe. A location of the start subframe may be determined based on a value obtained from a radio resource control (RRC) signal. The method may comprise: decoding each candidate of the downlink control channel repeated on the plurality of the consecutive subframes.

If a number of the repetitions is N, the N may be counted only using valid downlink subframes.

A number of the candidates may be determined based on the aggregation level, the repetition level and a coverage enhancement (CE) mode.

The repetition level may be selected from {1, 2, 4, 8, 16, 32, 64, 128, 256}.

A number of the consecutive subframes for repeating the downlink control channel may be determined based on a maximum repetition number.

The search space may exist per a specific subframe periodicity.

The method may further comprise: determining the number of candidates at the aggregation level in each subframe among the plurality of consecutive subframes.

To achieve the foregoing purposes, the disclosure of the present invention proposes a low-cost/low-capability (LC) device for receiving a downlink control channel. The LC device may comprise: a transceiver; and a processor configured to determine a search space for monitoring the downlink control channel. The search space may be defined by candidates of the downlink control channel according to an aggregation level and a repetition level. Each candidate may be repeated in a plurality of consecutive subframes starting with a start subframe. A location of the start subframe is determined based on a value obtained from a radio resource control (RRC) signal. The processor is further configured to: decode each candidate of the downlink control channel repeated on the plurality of the consecutive subframes.

According to the disclosure of the present specification, the problems of the above-described prior art are solved.

DESCRIPTION OF EXEMPLARY EMBODIMENTS

Figure 1:
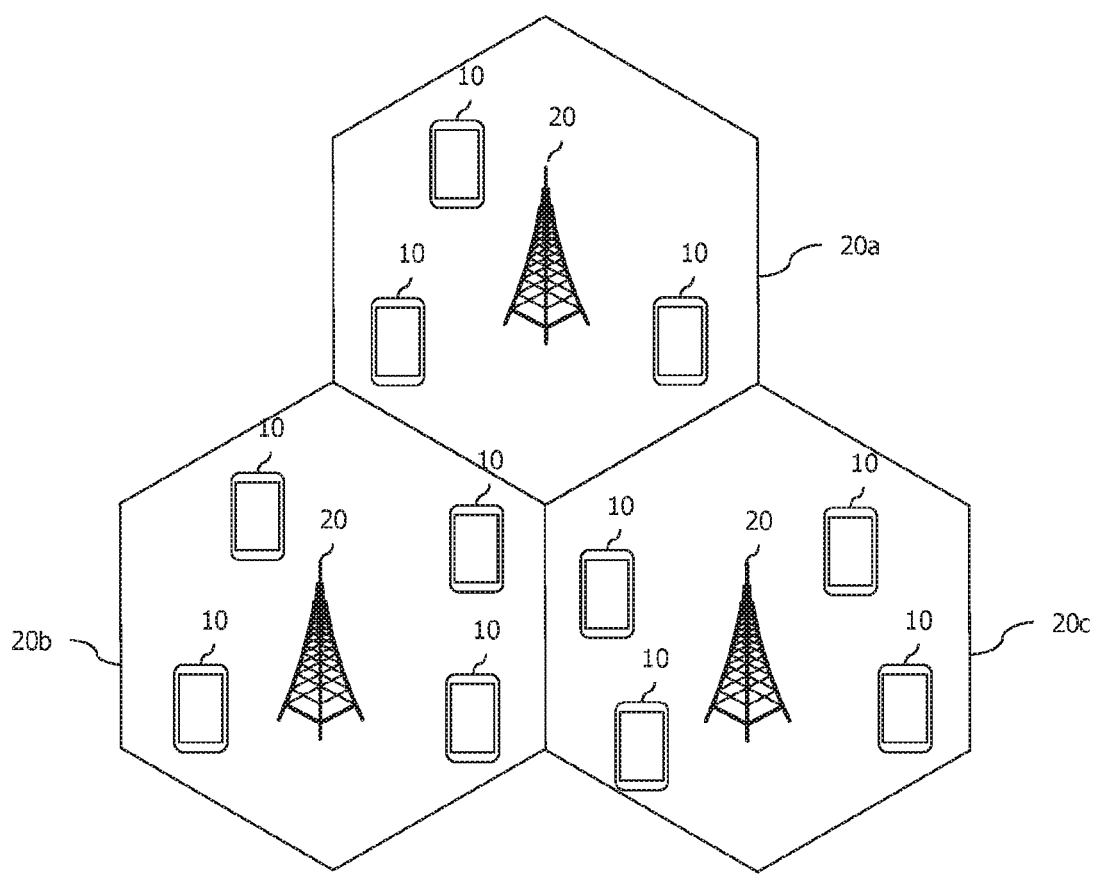
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
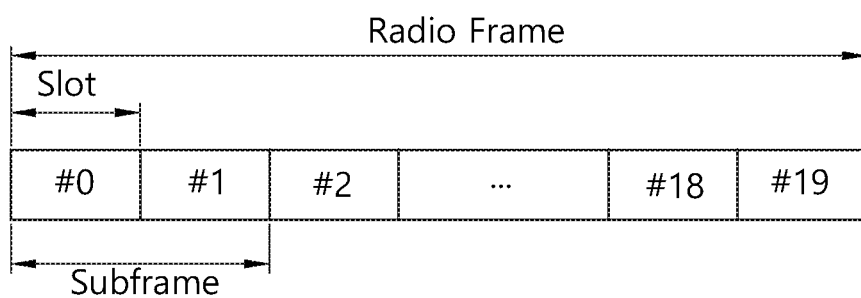
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of OFDM symbols. The number of OFDM symbols included in one slot may vary depending on a cyclic prefix (CP).

Figure 3:
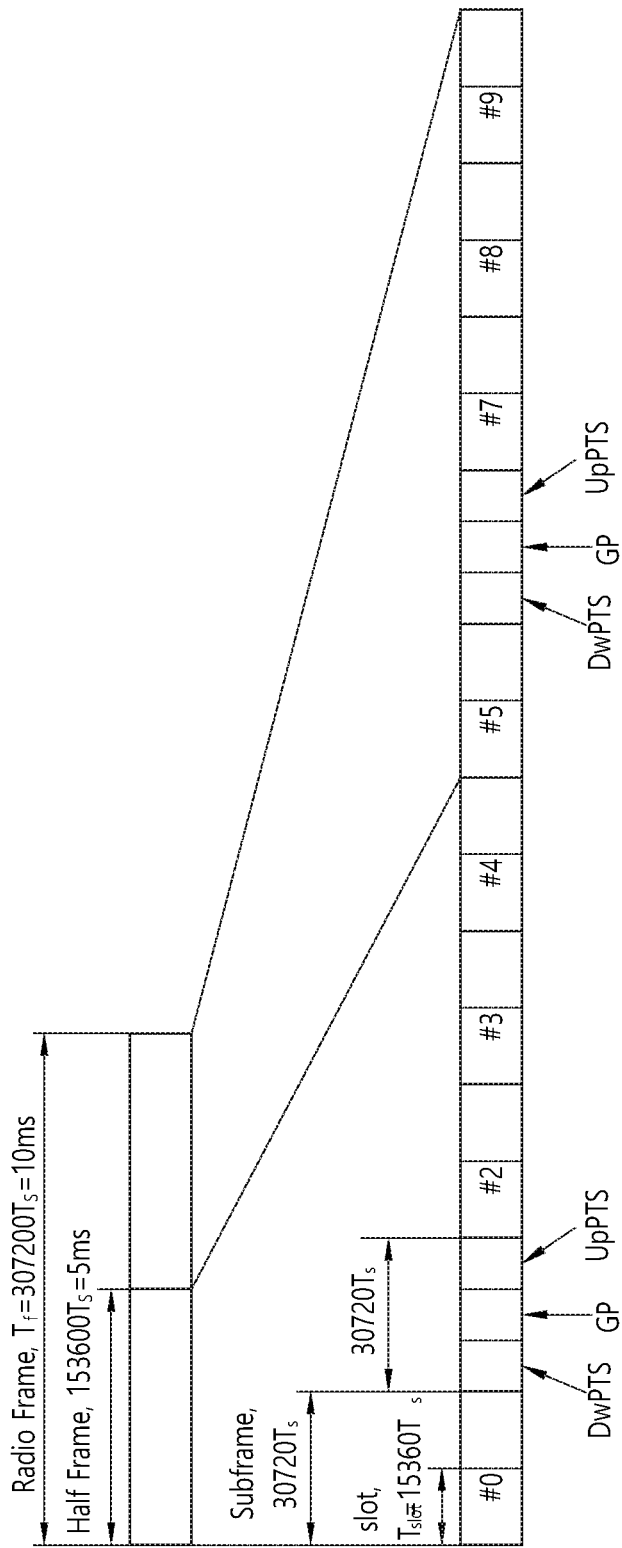
FIG. 3 illustrates a structure of a downlink radio frame according to TDD in the 3GPP LTE.

FIG. 3 illustrates the architecture of a downlink radio frame according to TDD in 3GPP LTE.

For this, 3GPP TS 36.211 V10.4.0 (2011-23) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

TABLE 2

| Special subframe configuration | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | 6592 * Ts | 2192 * Ts | 2560 * Ts | 7680 * Ts | 2192 * Ts | 2560 * Ts |
| 1 | 19760 * Ts | | | 20480 * Ts | | |
| 2 | 21952 * Ts | | | 23040 * Ts | | |
| 3 | 24144 * Ts | | | 25600 * Ts | | |
| 4 | 26336 * Ts | | | 7680 * Ts | 4384 * Ts | 5120 * ts |
| 5 | 6592 * Ts | 4384 * Ts | 5120 * ts | 20480 * Ts | | |
| 6 | 19760 * Ts | | | 23040 * Ts | | |
| 7 | 21952 * Ts | | | — | | |
| 8 | 24144 * Ts | | | — | | |

Figure 4:
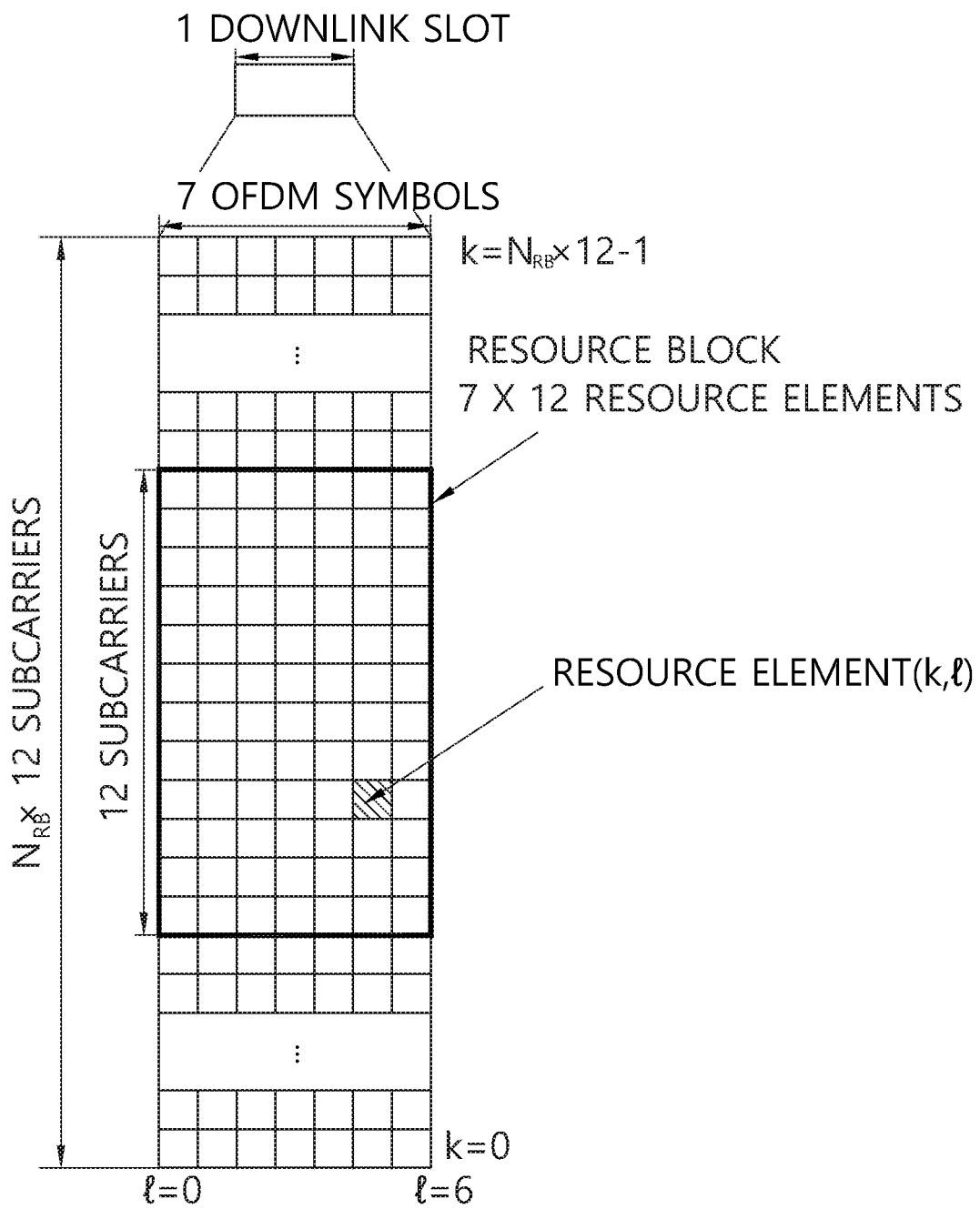
FIG. 4 is an exemplary diagram illustrating a resource grid for one uplink or downlink slot in the 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
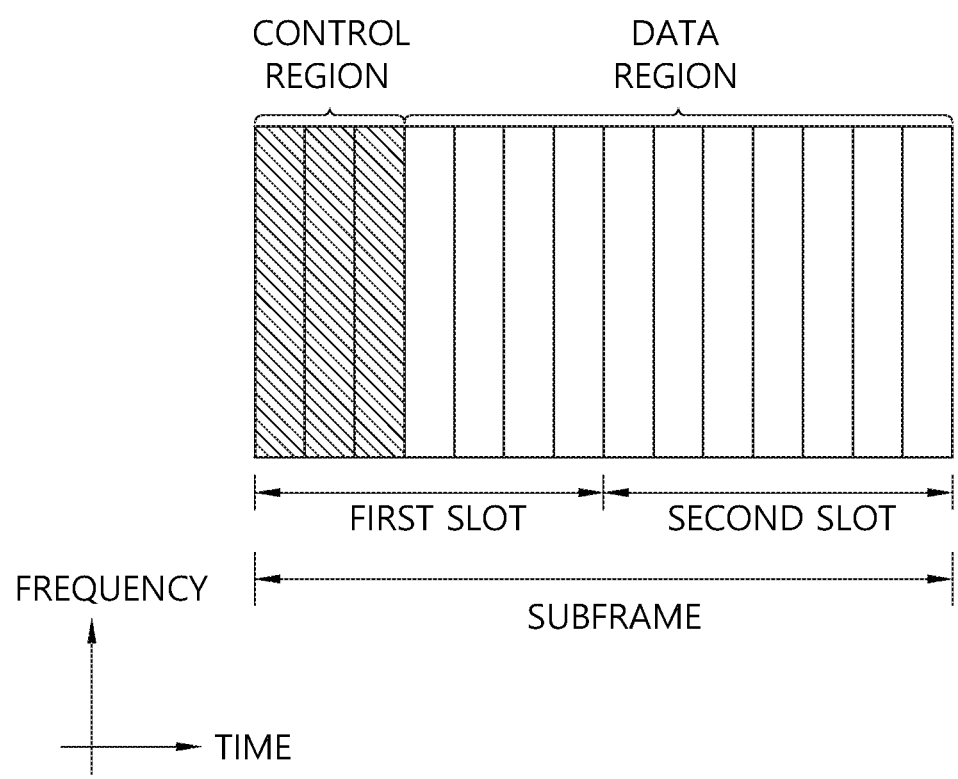
FIG. 5 illustrates a structure of a downlink subframe.

FIG. 5 illustrates the architecture of a downlink sub-frame.

In FIG. 5, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

In 3GPP LTE, in order to decrease the load owing to the blind decoding, a search space is used. The search space may be referred to a monitoring set of CCE for the PDCCH. The UE monitors the PDCCH within the corresponding search space.

When a UE monitors the PDCCH based on the C-RNTI, the DCI format and the search space which is to be monitored are determined according to the transmission mode of the PDSCH. The table below represents an example of the PDCCH monitoring in which the C-RNTI is setup.

TABLE 3

| Transmission mode | DCI format | Search space | Transmission mode of PDSCH according to PDCCH |
|---|---|---|---|
| Transmission mode 1 | DCI format 1A | Public service and terminal specific | Single antenna port, port 0 |
| | DCI format 1 | Terminal specific | Single antenna port, port 0 |
| Transmission mode 2 | DCI format 1A | Public service and terminal specific | Transmit diversity |
| | DCI format 1 | Terminal specific | Transmit diversity |
| Transmission mode 3 | DCI format 1A | Public service and terminal specific | Transmit diversity |
| | DCI format 2A | Terminal specific | CDD(Cyclic Delay Diversity) or transmit diversity |
| Transmission mode 4 | DCI format 1A | Public service and terminal specific | Transmit diversity |
| | DCI format 2 | Terminal specific | Closed-loop spatial multiplexing |
| Transmission mode 5 | DCI format 1A | Public service and terminal specific | Transmit diversity |
| | DCI format 1D | Terminal specific | MU-MIMO(Multi-user Multiple Input Multiple Output) |
| Transmission mode 6 | DCI format 1A | Public service and terminal specific | Transmit diversity |
| | DCI format 1B | Terminal specific | Closed-loop spatial multiplexing |
| Transmission mode 7 | DCI format 1A | Public service and terminal specific | If the number of PBCH transmisison ports is 1, single antenna port, port 0. Otherwise, transmit diversity |
| | DCI format 1 | Terminal specific | Single antenna port, port 5 |
| Transmission mode 8 | DCI format 1A | Public service and terminal specific | If the number of PBCH transmisison ports is 1, single antenna port, port 0. Otherwise, transmit diversity |
| | DCI format 2B | Terminal specific | Dual layer transmisison (port 7 or 8), or single antenna port, port 7 or 8 |
| Transmission mode 9 | DCI format 1A | Public service and terminal specific | Non-MBSFN sub-frame: if the number of PBCH antenna ports is 1, port 0 is used as independent antenna port. Otherwise, transmit Diversity |

TABLE 3-continued

| Transmission mode | DCI format | Search space | Transmission mode of PDSCH according to PDCCH |
|---|---|---|---|
| | DCI format 2C | Terminal specific | MBSFN sub-frame: port 7 as independent antenna port<br>8 transmisison layers, ports 7-14 are used or port 7 or 8 is used as independent antenna port |
| Transmission mode 10 | DCI 1A | Public service and terminal specific | Non-MBSFN sub-frame: if the number of PBCH antenna ports is 1, port 0 is used as independent antenna port. Otherwise, transmit Diversity MBSFN sub-frame: port 7 as independent antenna port |
| | DCI format 2D | Terminal specific | 8 transmisison layers, ports 7-14 are used or port 7 or 8 is used as independent antenna port |

The usage of the DCI format is classified as shown in Table 3 below.

TABLE 4

| DCI format | Contents |
|---|---|
| DCI format 0 | Used in PUSCH scheduling |
| DCI format 1 | Used in scheduling of one PDSCH codeword |
| DCI format 1A | Used in compact scheduling of one PDSCH codeword and random access process |
| DCI format 1B | Used in compact scheduling of one PDSCH codeword having precoding information |
| DCI format 1C | Used in very compact scheduling of one PDSCH codeword |
| DCI format 1D | Used in precoding and compact scheduling of one PDSCH codeword having power offset information |
| DCI format 2 | Used in PDSCH scheduling of terminals configured in closed-loop spatial multiplexing mode |
| DCI format 2A | Used in PDSCH scheduling of terminals configured in open-loop spatial multiplexing mode |
| DCI format 2B | DCI format 2B is used for resouce allocation for dual-layer beam-forming of PDSCH. |
| DCI format 2C | DCI format 2C is used for resouce allocation for closed-loop SU-MIMO or MU-MIMO operation to 8 layers. |
| DCI format 2D | DCI format 2C is used for resouce allocation to 8 layers. |
| DCI format 3 | Used to transmit TPC command of PUCCH and PUSCH having 2 bit power adjustmentns |
| DCI format 3A | Used to transmit TPC command of PUCCH and PUSCH having 1 bit power adjustment |
| DCI format 4 | Used in PUSCH scheduling of uplink (UP) operated in multi-antenna port transmisison mode |

For example, a DCI format 0 will be described with reference to section 5.3.3.1.1 of 3GPP TS 36.212 V10.2.0 (2011-06). The DCI format 0 includes a field as listed in a following table.

TABLE 5

| Field | Bit number |
|---|---|
| Carrier indicator | 0 or 3 bits |
| Flag for format0/format1A differentiation | 1 bit |
| FH (Frequency hopping) flag | 1 bit |
| Resource block allocation and hopping resource allocation | |
| MCS(Modulation and coding scheme) and RV (redundancy version) | 5 bits |
| NDI (New data indicator) | 1 bit |
| TPC | 2 bits |
| Cyclic shift for DM RS and OCC index | 3 bit |
| UL index | 2 bits |
| DAI (Downlink Allocation Index) | 2 bits |
| CSI request | 1 or 2 bits |

TABLE 5-continued

| Field | Bit number |
|---|---|
| SRS request | 0 or 1 bit |
| Resource allocation type | 1 bit |

In the above table, the redundancy version (RV) is used for the HARQ operation that will be described below. The redundancy version (RV) field may include any one of 1, 2, 3 and 4. 1, 2, 3 and 4 are repeatedly used in circular manner.

The uplink channels include a PUSCH, a PUCCH, an SRS (Sounding Reference Signal), and a PRACH (physical random access channel).

Figure 6:
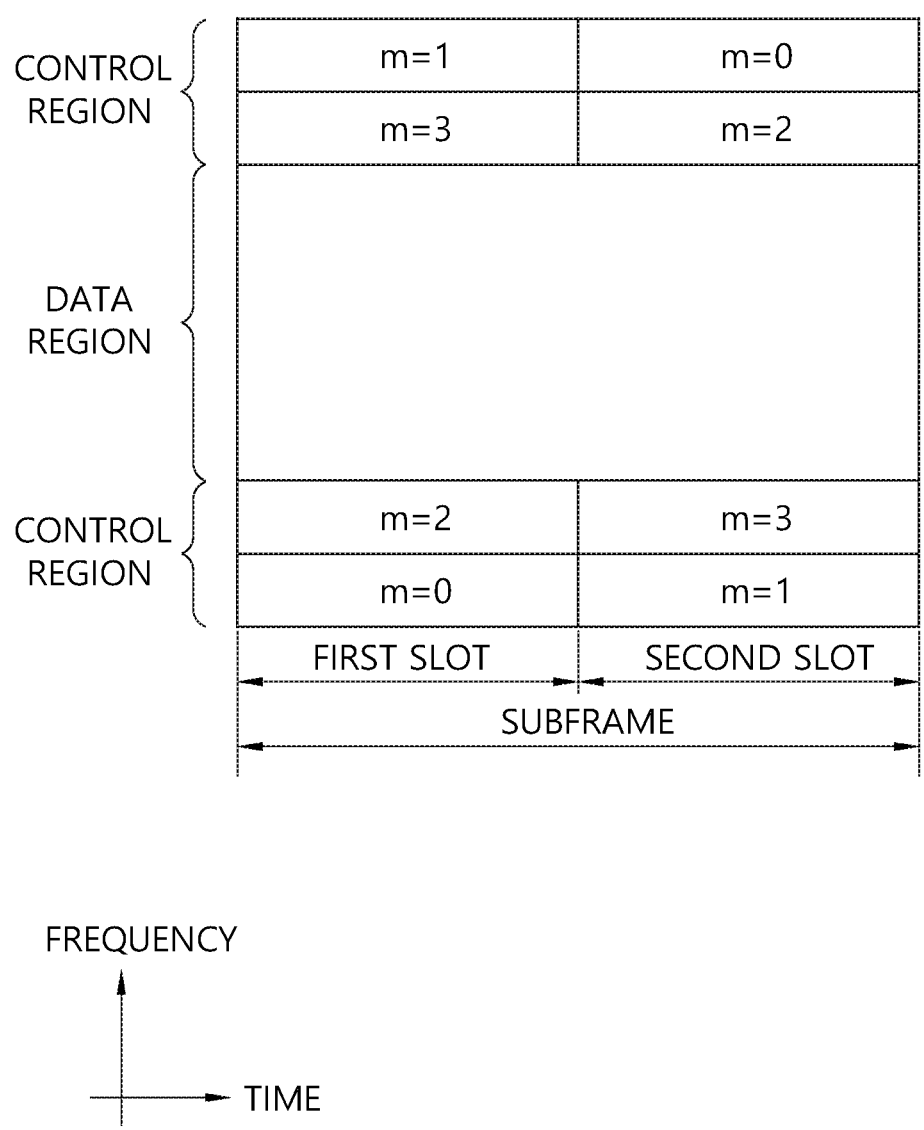
FIG. 6. illustrates a structure of an uplink subframe in 3GPP LTE.

FIG. 6 shows a structure of an uplink subframe in 3GPP LTE.

Referring to FIG. 6, the uplink subframe can be divided into a control region and a data region. A physical uplink control channel (PUCCH) for carrying uplink control information is allocated to the control region. A physical uplink shared channel (PUSCH) for carrying data is allocated to the data region.

The PUCCH for one UE is allocated in an RB pair in a subframe. RBs belonging to the RB pair occupy different subcarriers in each of a first slot and a second slot. A frequency occupied by the RBs belonging to the RB pair to which the PUCCH is allocated changes at a slot boundary. This is called that the RB pair allocated to the PUCCH is frequency-hopped at the slot boundary.

Since the UE transmits the uplink control information on a time basis through different subcarriers, a frequency diversity gain can be obtained. m is a location index indicating a logical frequency domain location of a RB pair allocated to a PUCCH in a subframe.

Examples of the uplink control information transmitted on a PUCCH include hybrid automatic repeat request (HARQ), acknowledgement (ACK)/non-acknowledgement (NACK), channel quality indicator (CQI) indicating a DL channel state, scheduling request (SR) which is a UL radio resource allocation request, etc.

The PUSCH is mapped to an uplink shared channel (UL-SCH) which is a transport channel. Uplink data transmitted through the PUSCH may be a transport block which is a data block for the UL-SCH transmitted during a TTI. The transport block may be user information. In addition, the uplink data may be multiplexed data. The multiplexed data may be obtained by multiplexing the control information and a transport block for the UL-SCH.

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provided an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

<EPDCCH (Enhanced Physical Downlink Control Channel)>

Meanwhile, a PDCCH is monitored in a limited region called a control region within a subframe, and a CRS transmitted in the entire band is used for demodulation of the PDCCH. As types of control information are diversified and an amount of control information is increased, flexibility of scheduling only with the existing PDCCH is lowered. Also, in order to reduce a burden due to CRS transmission, an enhanced PDCCH (EPDCCH) has been introduced.

Figure 7:
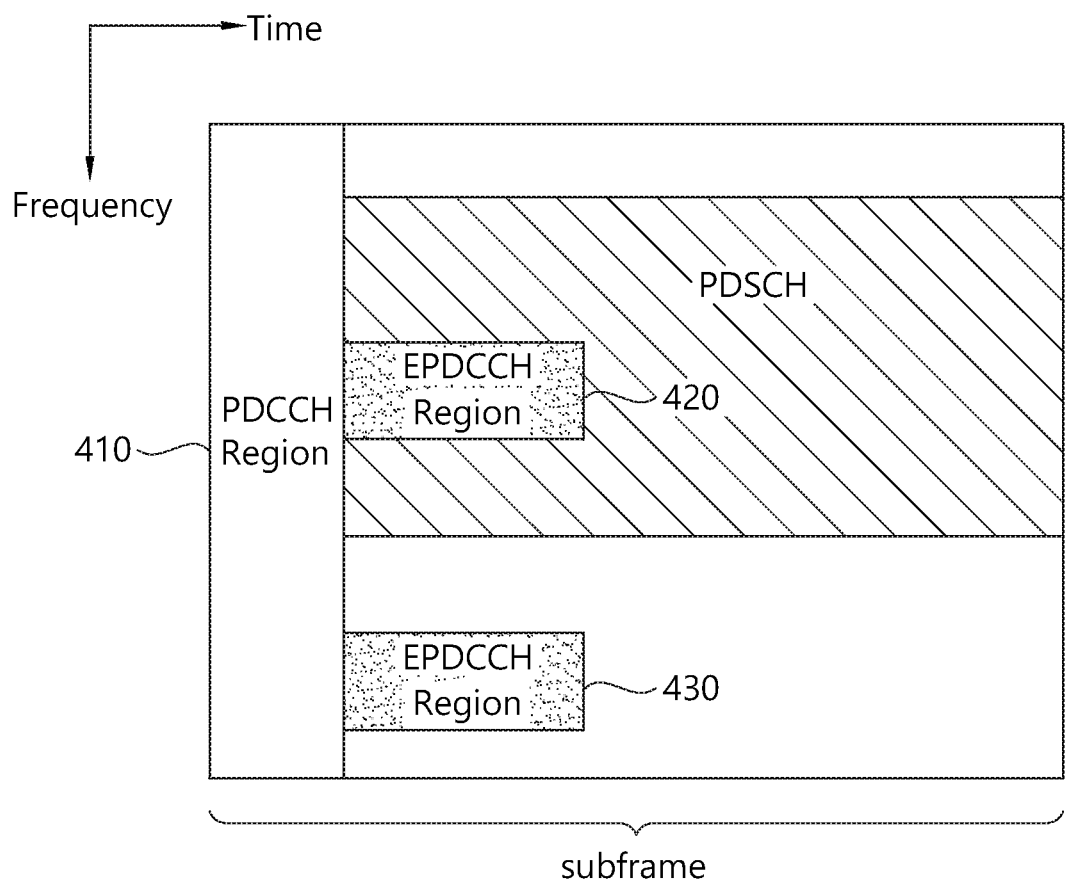
FIG. 7 illustrates an example of a subframe having an EPDCCH.

FIG. 7 illustrates an example of a subframe having an EPDCCH.

A subframe may include zero or one PDCCH region 4100 and zero or more PEDCCH regions 420 and 430.

The PEDCCH regions 420 and 430 are regions in which a wireless device monitors an EPDCCH. The PDCCH region 410 is positioned within a maximum of four preceding OFDM symbols, while the EPDCCH regions 420 and 430 may be flexibly scheduled in subsequent OFDM symbols after the PECCH region 410.

One or more EPDCCH regions 420 and 430 are designated in a wireless device, and the wireless device may monitor an EPDCCH in the designated EPDCCH regions 420 and 430.

The number/position/size of the EPDCCH regions 420 and 430 and/or information regarding a subframe for monitoring the PEDCCH may be provided by a BS to the wireless device through an RRC message, or the like.

In the PDCCH region 410, a PDCCH may be demodulated on the basis of a CRS. In the EPDCCH regions 420 and 430, a demodulation (DM) RS, rather than a CRS, may be defined to demodulate an EPDCCH. An associated DM RS may be transmitted in the EPDCCH regions 420 and 430.

Each of the EPDCCH regions 420 and 430 may be used to perform scheduling on different cells. For example, an EPDCCH within the EPDCCH region 420 may carry scheduling information for a primary cell and an EPDCCH within the EPDCCH region 430 may carry scheduling information for a secondary cell.

When an EPDCCH is transmitted in the EPDCCH regions 420 and 430 through multiple antennas, the same precoding as that of an DPCCH may be applied to a DM RS within the EPDCCH regions 420 and 430.

Compared with a PDCCH which uses a CCE as a transmission resource unit, a transmission resource unit for an EPDCCH is called an enhanced control channel element (ECCE). An aggregation level (AL) may be defined by a resource unit for monitoring an EEPDCCH. For example, when 1 ECCE is a minimum resource for an EPDCCH, an AL may be defined as AL={1, 2, 4, 8, 16}.

Hereinafter, an EPDCCH search space may correspond to an EPDCCH region. In the EPDCCH search space, one or more EPDCCH candidates may be monitored in one or more ALs.

Hereinafter, resource allocation for an EPDCCH will be described.

The EPDCCH is transmitted using one or more ECCEs. Each ECCE includes a plurality of enhanced resource element groups (EREGs). An ECCH may include four eight EREGs according to a CP and a subframe type according to time division duplex (TDD) DL-UL. For example, in a normal CP, the ECCE may include 4 EREGs, and in an extended CP, the ECCE may include 8 EREGs.

A physical resource block (PRB) pair refers to two PRBs having the same RB number in one subframe. The PRB pair refers to a first PRB of a first slot and a second PRB of a second slot. In a normal CP, a PRB pair includes 12 subcarriers and 14 OFDM symbols, and thus, the PRB pair includes 168 source elements (REs).

The EPDCCH search space may be set as one or a plurality of PRB pairs. One PRB pair includes 16 EREGs. Thus, when an ECCE includes 4 EREGs, a PRB pair includes four ECCEs, and when an ECCE includes 8 EREGs, a PRB pair includes two ECCEs.

<Machine Type Communication (MTC)>

Meanwhile, hereinafter, the MTC will be described.

Figure 8A:
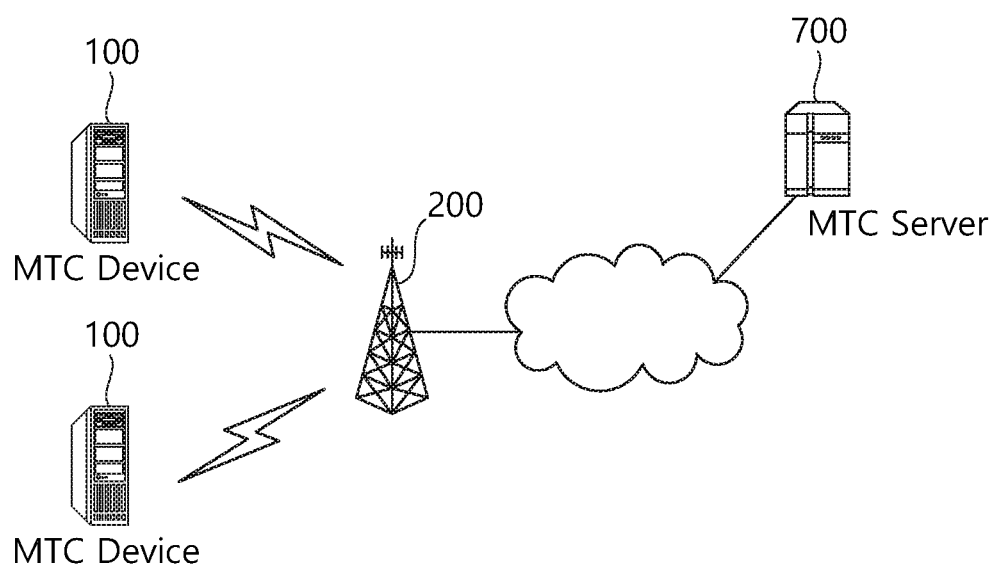
FIG. 8A illustrates an example of machine type communication (MTC).

FIG. 8a illustrates an example of the machine type communication (MTC).

The machine type communication (MTC) represents information exchange through between MTC devices 100 through a base station 200 or information exchange between the MTC device 100 and an MTC server 700 through the base station, which does not accompany human interaction.

The MTC server 700 is an entity which communicates with the MTC device 100. The MTC server 700 executes an MTC application and provides an MTC specific service to the MTC device.

The MTC device 100 as a wireless device providing the MTC may be fixed or mobile.

The service provided through the MTC has discrimination from a service in communication in which human intervenes in the related art and includes various categories of services including tracking, metering, payment, a medical field service, remote control, and the like. In more detail, the service provided through the MTC may include electric meter reading, water level measurement, utilization of a monitoring camera, reporting of an inventory of a vending machine, and the like.

As peculiarities of the MTC device, since a transmission data amount is small and uplink/downlink data transmission/reception often occurs, it is efficient to decrease manufacturing cost of the MTC device and reduce battery consumption according to the low data transmission rate. The MTC device is characterized in that mobility is small, and as a result, the MTC device is characterized in that a channel environment is not almost changed.

Meanwhile, the MTC is also called Internet of Things (IoT). Accordingly, the MTC device may be called an IoT device.

Figure 8B:
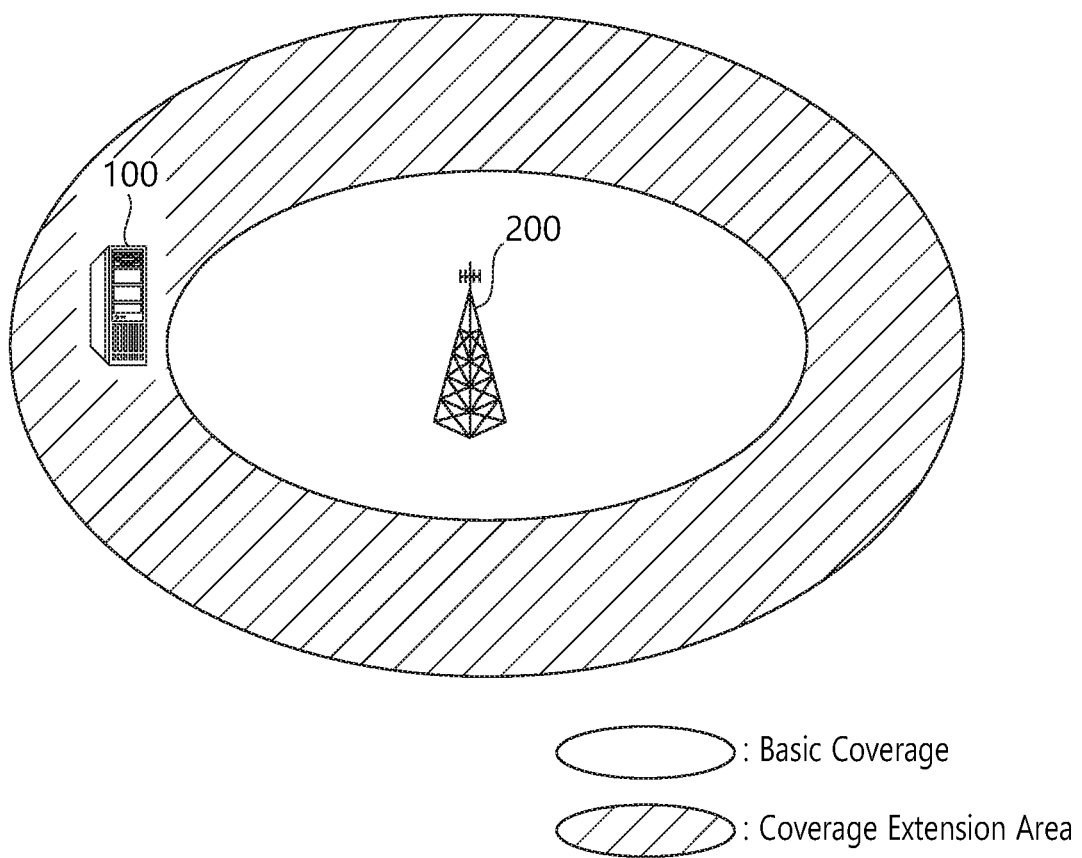
FIG. 8B illustrates extension or enhancement of cell coverage for an MTC device.

FIG. 8b illustrates an example of cell coverage extension for an MTC device.

In recent years, it is considered that cell coverage of the base station extends for the MTC device 100 and various techniques for the cell coverage extension are discussed.

However, in the case where the coverage of the cell extends, when the base station transmits a downlink channel to the MTC device positioned in the coverage extension area, the MTC device undergoes a difficulty in receiving the downlink channel.

Figure 9:
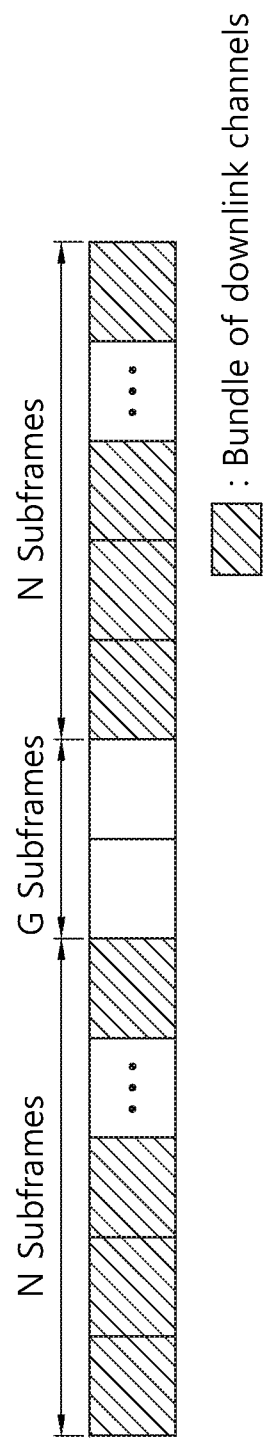
FIG. 9 illustrates an example of transmitting a bundle of downlink channels.

FIG. 9 is an exemplary diagram illustrating an example of transmitting a bundle of downlink channels.

As known with reference to FIG. 9, the base station repeatedly transmits the downlink channel (for example, the PDCCH and/or PDSCH) to the MTC device positioned in the coverage extension area on multiple subframes (for example, N subframes). As described above, the downlink channels which are repeated on the multiple subframes are called a bundle of the downlink channels.

Meanwhile, the MTC device receives the bundle of the downlink channels on the multiple subframes and decodes a part or the entirety of the bundle to increase decoding success rate.

Figure 10A:
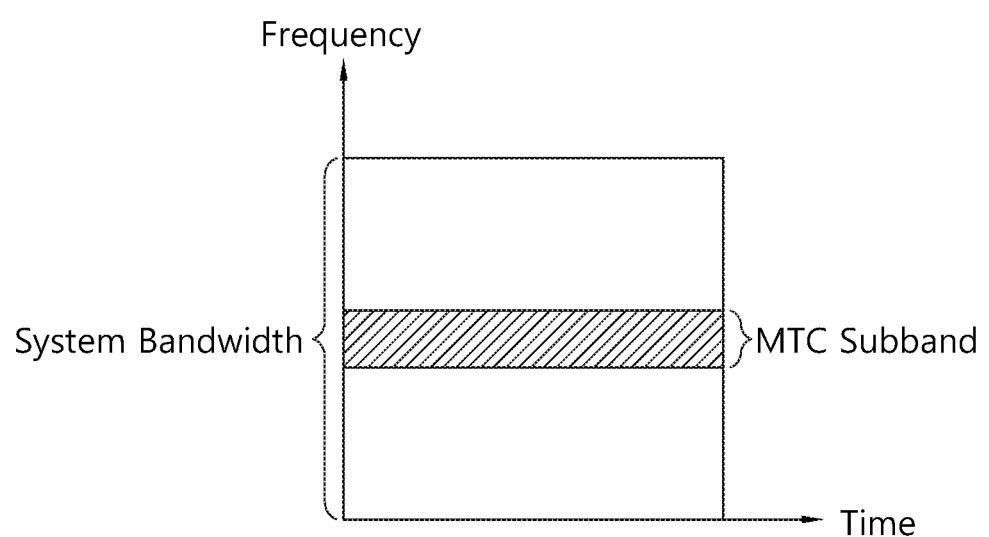
FIG. 10a and FIG. 10b are examples of subbands for MTC device operation.
Figure 10B:
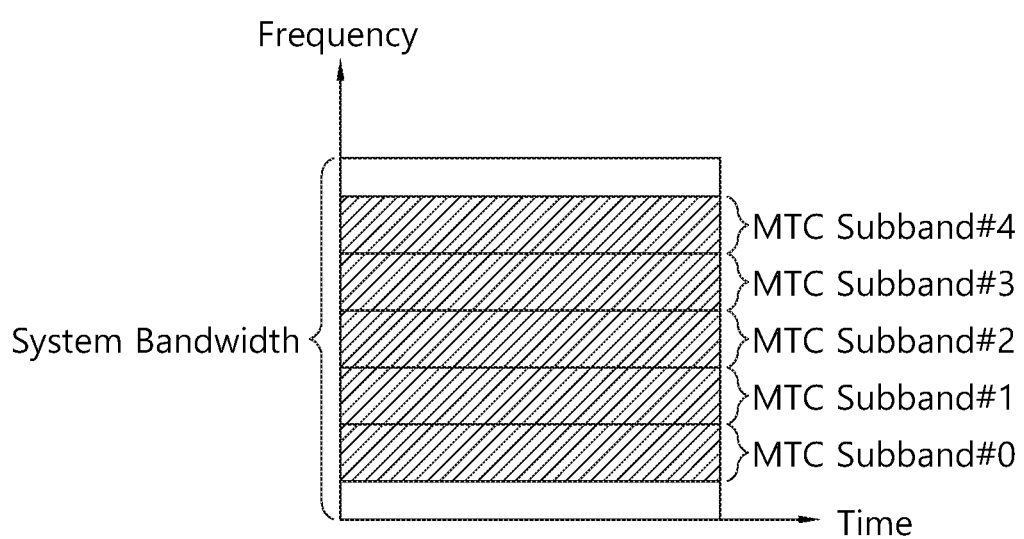

FIGS. 10A and 10B are views showing examples of a subband for operation of an MTC device.

As one scheme for low cost of the MTC device, as shown in FIG. 10A, regardless of the system bandwidth of the cell, the MTC device may use a subband of about 1.4 MHz for example.

In this connection, the region of the subband for operation of the MTC device may be located in the central region (for example, six middle PRBs) of the system bandwidth of the cell as shown in FIG. 10A.

Alternatively, as shown in FIG. 10B, multiple subbands for the MTC devices are allocated in one subframe for multiplexing between MTC devices. Thus, the MTC devices may use different subbands. In this connection, most of the MTC devices may use other subbands rather than the central region (for example, middle six PRBs) of the cell's system band.

Further, the MTC device operating on the reduced band may not properly receive the legacy PDCCH transmitted from the base station on the entire system band. Further, considering multiplexing with PDCCHs transmitted to other general UEs, it may not be desirable for the cell to transmit the PDCCH for the corresponding MTC device in an OFDM symbol region for legacy PDCCH transmission.

DISCLOSURE OF THE PRESENT INVENTION

Thus, a disclosure of the present invention proposes a method for solving the problems.

As one of solutions, a control channel for an MTC device transmitted within a subband in which the MTC device of low complexity/low-specification/low cost operates is required to be introduced.

Hereinafter, in the present specification, the MTC device of low complexity/low-specification/low cost will be referred to as an LC device. Here, according to the disclosure of the present specification, coverage enhancement (CE) may be classified as two modes. A first mode (or a CE mode A) is a mode in which repeated transmission is not performed or a mode for a small number of repeated transmissions. A second mode (or a CE mode B) is a mode in which a large number of repeated transmissions is allowed. In which of the two modes an LC device is to operate may be signaled to the LC device. Here, parameters assumed by the LC device for transmission and reception of a control channel/data channel may be varied according to CE modes. Also, a DCI format monitored by the LC device may be varied according to CE modes. However, some physical channels may be repeatedly transmitted for the same number of times, regardless of CE mode A and CE mode B.

Figure 11:
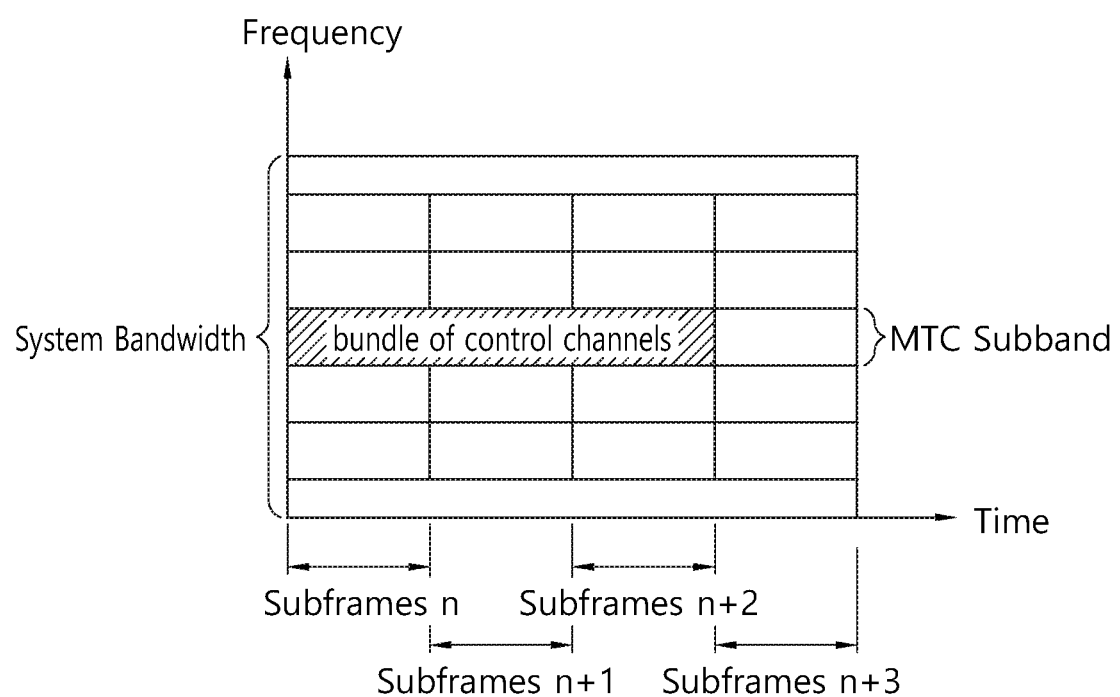
FIG. 11 shows one example of a control channel being transmitted in a subband for MTC device operation.

FIG. 11 illustrates an example of a control channel transmitted within a subband in which the LC device operates.

As illustrated in FIG. 11, when the MTC device operates in a certain MTC subband of a system bandwidth of the cell, rather than operating using the entire system bandwidths of the cell, the BS may transmit a control channel for the MTC device within the subband of the MTC. Such a control channel may be repeatedly transmitted on a plurality of subframes.

The control channel may be similar to an existing EPDCCH. That is, a control channel for the LC device may be generated using the existing EPDCCH as is. Or, the control channel (or M-PDCCH) for the LC device may have a form deformed from the existing PDCCH/EDPCCH.

Hereinafter, the control channel for the LC device of low-complexity/low-specification/low-cost will be referred to as an MTC-EPDCCH or M-PDCCH. Such an MTC-EPDCCH or M-PDCCH may be used for an MTC device or may also be used for a UE of low-complexity/low-specification/low-cost or a UE positioned in a coverage extended or coverage enhanced area.

Meanwhile, for an LC device operating within a certain subband (e.g., 6 PRBs) irrespective of system bandwidth as described above, a BS may transmit an M-PDCCH using the entire available resources within the subband (e.g., 6 PRBs). Or, the LC device may assume that one DCI is transmitted from the BS using the entire resources by EPDCCH sets set for the LC device. In other words, in case where a maximum of one DCI is transmitted by EPDCCH sets so two PEDCCH sets are simultaneously set on one subframe, the LC device may assume that a maximum of two DCIs are transmitted from the BS. Or, by setting such a configuration scheme as a one-DCI-per-PRB mapping scheme, whether a network (i.e., the BS) uses such a scheme may be set in the LC device by EPDCCH sets or set in the LC device through higher layer signaling. Or, such a scheme may be determined by a coverage enhancement (CE) level. The LC device may implicitly know whether the foregoing scheme is used according to CE levels. Such a scheme may be particularly applied to the LC device requiring CE. In this case, since maximum resources are used on one subframe for transmission of the M-PDCCH, time during which the M-PDCCH is transmitted (i.e., the overall time based on repeated transmissions) may be advantageously reduced. Also, this scheme is advantageous in terms of reduction in latency and power saving of the LC device. Here, the available resource may be a source used for transmission of other channels/signals such as an existing PDCCH transmission resource, a transmission resource of a PSS/SSS, a PBCH, a CRS, a DMRS, and/or a CSI-RS, and the like, from a resource within 6 PFBs or a resource within a configured PRB set. Or, the available resource may be a resource excluding a resource used for transmission of other channels/signals among RE resources in which the M-PDCCH can be transmitted.

Here, for the LC device (or for a UE to which the CE mode is set), the BS may consider to transmit an M-PDCCH using the entire resource of 6 PRBs or using a resource within the configured PRB set on a subframe all the time. Here, the M-PDCCH may have one aggregation level (AL) within the subframe. For example, when four PRBs are used, AL may be fixed to 16 (AL=16).

For the purposes of description, in this specification, it is described that the LC device monitors one AL by subframes, but the disclosure of this specification may also be applied to a case in which a plurality of candidates are present at several ALs or one AL by each subframe. In case where a plurality of candidates are present on one subframe, an EPDCCH/M-PDCCH repeated on each subframe may be the same in an ECCE index (e.g., a starting position) or in a position of a used RE (e.g., a logical position or a position of an RE within a subband). In this specification, in the case of using repetition, extension of a search space in which blind decoding is performed will be described, and it may coexist with a current search space present in each subframe.

Meanwhile, in order to adaptively transmit an M-PDCCH according to channel situations, the LC device may monitor a plurality of repetition levels. This may be advantageously used even when repetition is made on more subframes in case where an AL set in the LC device is a high AL so a repetition level, or the like, is to be increased. Here, the repetition level may be replaced with the number of repetitions, the number of subframes in which the M-PDCCH is transmitted, and the like. Or, the repetition level may be an index mapped to a specific repetition number (the number of subframes for repetition. The repetition level may also be calculated as the number of subbands, rather than the number of subframes, if the LC device is capable of monitoring several subbands. For example, when an LC device is capable of monitoring a maximum of two subbands, the LC device may combine and use two subbands, and in this case, the repetition number may be calculated in two aspects of the number of subbands and the number of subframes. That is, M-PDCCH candidates monitored by the LC device may have different repetition levels. For example, a repetition level of M-PDCCH candidate 0 may be 4, a repetition level of M-PDCCH candidate 1 is 8, and a repetition level of M-PDCCH candidate 2 may be 16. Here, in this specification, for the purposes of description, the number of subframes in which the repetition number/M-PDCCH is transmitted is called a repetition level (RL).

Figure 12A:
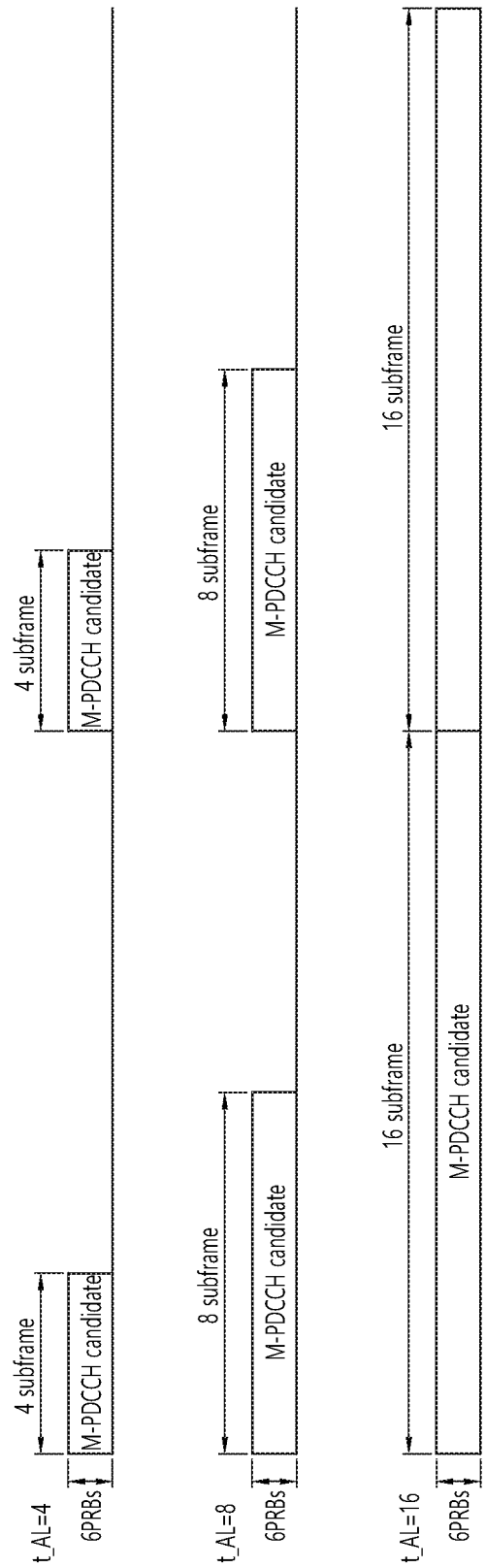
FIGS. 12A and 12B illustrate an example of transmitting an M-PDCCH according to repetition levels (RL).
Figure 12B:
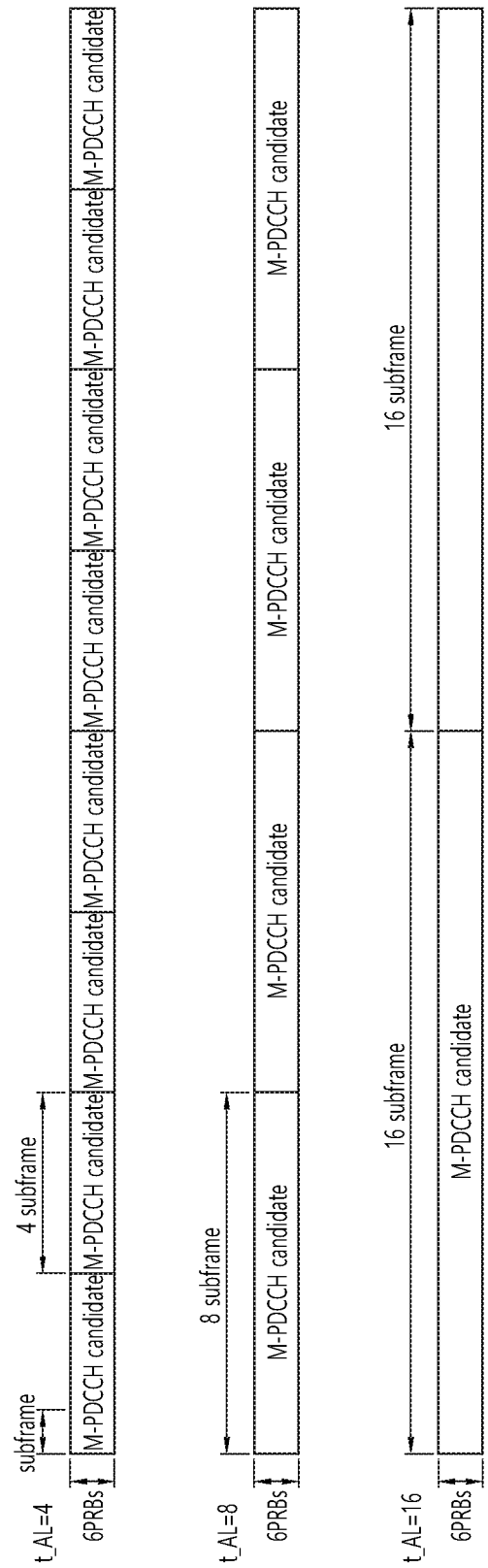

FIGS. 12A and 12B illustrate transmission of an M-PDCCH according to repetition levels (RLs).

As illustrated in FIG. 12A, although repetition levels or aggregation levels (t_AL) in a time domain are different, each M-PDCCH candidate may start to be transmitted at the same timing. That is, each M-PDCCH candidate may be transmitted at the same timing according to the same transmission period and the same transmission offset.

Or, as illustrated in FIG. 12B, M-PDCCH candidates having different repetition levels or aggregation levels (t_AL) in the time domain may be transmitted at different start timings.

Meanwhile, in order to transmit the M-PDCCH to an LC device requiring coverage enhancement (CE), the BS may transmit the M-PDCCH using more resources. However, in the case of an LC device whose bandwidth is reduced to 6 PRBs, an amount of M-PDCCH resources that can be received on one subframe is very limited. Thus, in order to transmit the M-PDCCH using more resources, the BS may use resources present on a plurality of subframes. In a scheme therefor, a search space for the LC device may be positioned across a plurality of subframes. In this specification, a resource region present across a plurality of subframes will be referred to as an M-PDCCH-resource-set. Also, a search space (SS) in which the LC device monitors the M-PDCCH within the corresponding M-PDCCH-resource-set will be termed an MTC-SS.

Figure 13:
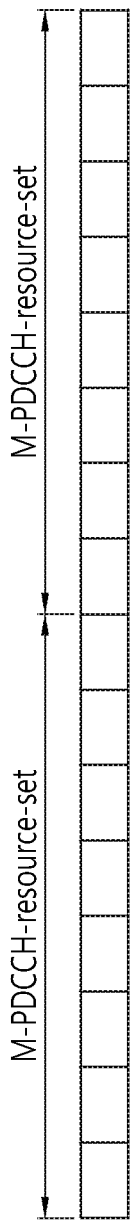
FIG. 13 illustrates an example of an M-PDCCH-resource-set according to the present disclosure.

FIG. 13 illustrates the M-PDCCH-resource-set according to a disclosure of the present invention.

As illustrated in FIG. 13, the M-PDCCH-resource-set includes a plurality of subframes (e.g., M number of subframes) and each subframe may include a plurality of PRBs (e.g., 6 PRBs). The M-PDCCH may be transmitted to the LC device through a resource within the M-PDCCH-resource-set.

Here, the subframes included in the M-PDCCH-resource-set may be consecutive or not. For example, a special subframe in which a length of a DwPTS is short (e.g., a special subframe according to a special subframe configuration 0) may be excluded in the subframes for the M-PDCCH-resource-set. M, the number of subframes included in the M-PDCCH-resource-set may be a value fixed, set by an SIB and/or higher layer signaling by the BS, or determined according to a coverage extension level required for the LC device for the M-PDCCH.

Positions of PRBs included in the M-PDCCH-resource-set may be the same in every subframe or may be different in each subframe (that is, positions of the PRBs may be hopped in every subframe). Here, a period at which positions of the PRBs within the subframes are changed may be one subframe, or positions of the PRBs within subframes may be changed at the period of a plurality of subframes (or the positions of the PRBs within the subframes may be maintained during a plurality of subframes). The number of PRBs within subframes or a change pattern of the positions of the PRBs within subframes regarding a specific M-PDCCH-resource-set may be previously determined or may be set by the BS through higher layer signaling.

Meanwhile, only one M-PDCCH-resource-set may be present simultaneously (at the same time). Or, two or more M-PDCCH-resource-sets may be present simultaneously (at the same time and on the same subframe). The LC device may monitor M-PDCCH-resource-sets including different numbers of subframes simultaneously (at the same time and on the same subframe). Here, the M-PDCCH-resource-sets may have different M values and/or different number of PRB resources (within subframes). That is, when one LC device monitors, the M value of the M-PDCCH-resource-set to be monitored by one LC device may be plural. Here, an M-PDCCH-resource-set including a separate subframe set according to the M value may be present and the LC device may monitor all the M-PDCCH-resource-sets regarding the plurality of M values.

When the LC device monitors M-PDCCHs on a plurality of subframes according to the M-PDCCH-resource-set, a subframe region in which an MTC-PDCCH is actually transmitted from the BS may be some of subframes included in the M-PDCCH-resource-set. For example, subframes #K to #K+9 are included in one M-PDCCH-resource-set, but the BS may transmit M-PDCCH candidates using only resources present in the subframes #K to #K+4 to a specific LC device.

Meanwhile, in order to reduce complexity of blind decoding of the LC device for receiving M-PDCCHs, the LC device may need to know a position of a subframe in which the M-PDCCH starts to be received on a bundle of a plurality of subframes. To this end, a position of a subframe in which the BS may start to transmit the M-PDCCH may not be free as in the related art and the M-PDCCH may start to be transmitted only through a previously agreed position of a subframe.

Since a position of a subframe in which the M-PDCCH-resource-set may start and a subframe in which the M-PDCCH actually transmitted to the LC device starts to be transmitted may be different, the present invention proposes that a position of a (first) subframe in which the M-PDCCH-resource-set starts is determined according to a set of specific subframes, rather than the subframe in which the M-PDCCH starts to be transmitted. That is, the LC device may assume that a starting (first) subframe of the M-PDCCH-resource-set is positioned only in a position of a specific subframe.

Figure 14A:
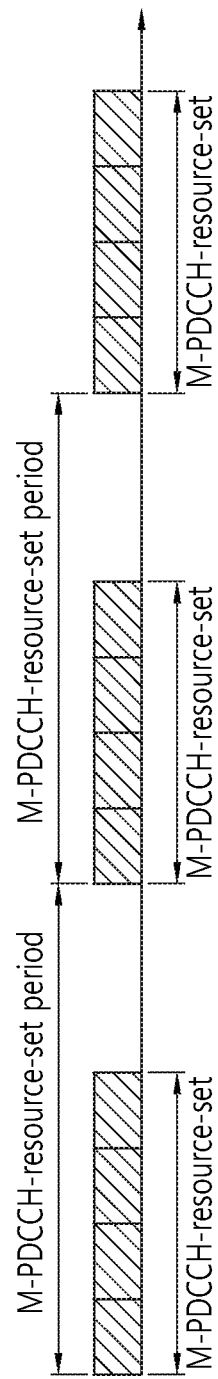
FIG. 14A illustrates a relationship between a period of an M-PDCCH-resource-set and the M-PDCCH-resource-set.

FIG. 14A illustrates a relationship between a period of the M-PDCCH-resource-set and the M-PDCCH-resource-set.

As illustrated in FIG. 14A, a period of the M-PDCCH-resource-set may be positioned in a subframe section in which the M-PDCCH-resource-set occurs. The period of the M-PDCCH-resource-set, i.e., a period of the subframe in which the M-PDCCH is able to start to be transmitted, may be a value previously set or may be set by the BS in the LC device through an SIB or higher layer signaling (e.g., RRC signaling).

The period of the M-PDCCH-resource-set mentioned in this specification is the same as a period of an M-PDCCH-subframe. Also, the M-PDCCH-resource-set may refer to a set of subframes included in the M-PDCCH-resource-set.

Figure 14B:
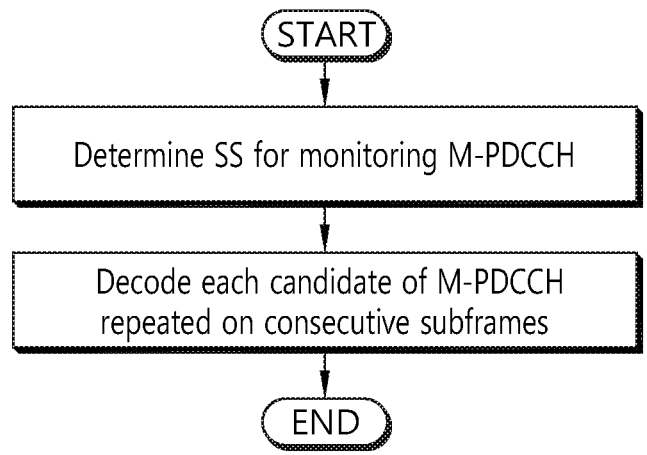
FIG. 14B illustrates an example of a method according to the present disclosure.

FIG. 14B illustrates a method according to a disclosure of the present invention.

Referring to FIG. 14B, the LC device determines a search space (SS) for monitoring the M-PDCCH. Here, the SS may be defined by a candidate of a downlink control channel according to an aggregation level and a repetition level as described hereinafter. Also, as described hereinafter, each candidate may be repeated on a plurality of consecutive subframes starting from a starting subframe. Here, a position of the starting subframe may be determined by a value obtained from RRC signaling as described above. Thereafter, the LC device may decode each candidate of the downlink control channel repeated on the consecutive subframes.

I. First Disclosure: Search Space (MTC-SS)

A search space (SS) of the existing PDCCH according to an aggregation level (AL) may be defined as follows.

TABLE 6

A set of PDCCH candidates to be monitored is defined by an SS. Here, an SS $S^{(L)}_k$ is defined by a set of PDCCH candidates in an aggregation level L $\in\{1, 2, 4, 8\}$. Regarding each serving cell for monitoring a PDCCH, a CCE corresponding to a PDCCH candidate m of the SS $S^{(L)}_k$ is given as follows.
$L\{(Y_k + m') \bmod \lfloor N_{CCE,k} / L \rfloor\} + i$
Here, $Y_k$ is defined as follows and here, i=0, ..., L-1. Regarding a common search space, m'=m. In case where a UE is set in a carrier indicator field (CIF) regarding a serving cell for monitoring a PDCCH in a UE-specific search space, m'=m+$M^{(L)}$*$n_{ci}$. Here, nci is a value of the CIF. Meanwhile, when the UE is not set in CIF, m'=m. Here, m=0,...,$M^{(L)}$−1. $M^{(L)}$ is the number of PDCCH candidates to be monitored in a given search space.

Here, PDCCH candidates to be monitored are as follows.

TABLE 7

| | Search space $S^{(L)}_k$ | | Number of |
|---|---|---|---|
| Type | AL L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

However, according to the disclosure of this clause, a search space of the M-PDCCH according to the AL (L) may be defined as follows.

TABLE 8

In an AL L $\in\{1, 2, 4, 8\}$, a device-specific SS $ES^{(L)}_k$ is defined by a set of M-PDCCH candidates. Regarding an M-PDCCH-PRB-set P, ECCEs corresponding to an M-PDCCH candidate m of the search space $ES^{(L)}_k$ are given as follows.

$$L\left\{\left(Y_{p,k} + \left\lfloor \frac{m \cdot N_{ECCE,p,k}}{L \cdot M^{(L)}_p} \right\rfloor + b \right) \bmod \lfloor N_{ECCE,p,k} / L \rfloor \right\} + i$$

Here, $Y_{p,k}$ is defined as follows.
i = 0, ..., L − 1
If a CIF is set for a serving cell in which a device is to monitor an M-PDCCH, b = $n_{CI}$.
Otherwise, b = 0.
$n_{CI}$ is a value of the CIF.
M = 0, 1, ..., $M^{(L)}_{p-1}$.
If the CIF is not set for a serving cell in which the M-PDCCH is to be monitored, $M^{(L)}_P$ is the number of M-PDCCH candidates to be monitored in an aggregation level (L) within an M-PDCCH-PRB-set P regarding a serving cell in which the M-PDCCHs are to be monitored. Otherwise, $M^{(L)}_P$ is the number of M-PDCCH candidates to be monitored according to the aggregation level (L) within the M-PDCCH-PRB-set P regarding a serving cell indicated by $n_{CI}$.

I-1. Subframe Included in M-SS

In case where a search space of an M-PDCCH (M-SS) includes a plurality of subframes, the M-SS may be present at every specific subframe period. Here, a subframe period (i.e., time period) at which the M-SS is present will be referred to as an 'SS-period'.

Figure 15:
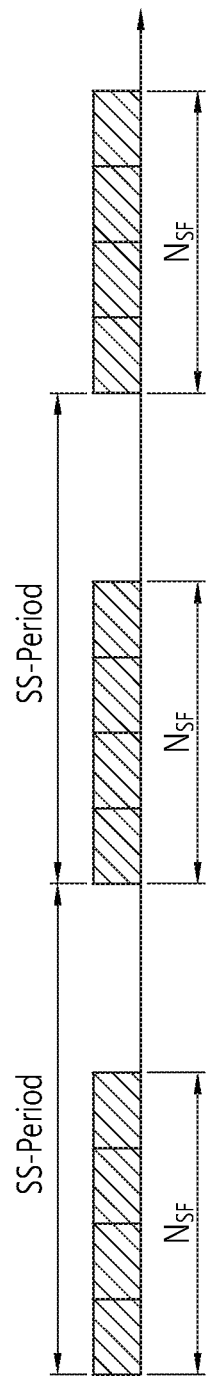
FIG. 15 illustrates a time period (SS-period) in which an M-SS is present.

FIG. 15 illustrates a time period (SS-period) in which the M-SS is present.

Referring to FIG. 15, monitoring an M-PDCCH may be attempted on $N_{SF}$ number of subframes at every corresponding subframe period. Here, the value of $N_{SF}$ may be the same as the SS-period all the time. Here, in order to indicate a position of a subframe in which monitoring of the M-PDCCH is performed, parameters such as a value of the SS-period, the value of $N_{SF}$, and an offset value (SS-offset) of a position of the subframe in which monitoring of the M-PDCCH is performed, and the like, may be used. The parameters may be values set by a higher layer or may be previously fixed values.

Here, a plurality of M-SSs (e.g., two M-SSs) may be present. The M-SSs each may use the SS-period, $N_{SF}$, and the offset value (SS-offset) of a position of the subframe in which monitoring of the M-PDCCH is performed, and the like, and setting may be separately performed. When this contents are expressed using a concept of the M-PDCCHresource-set, one M-SS may be (separately) present in every M-PDCCH-resource-set. That is, a plurality of M-PDCCH-resource-sets may be present, a period of the corresponding M-PDCCH-resource-sets, the number ($N_{SF}$) of subframes included in the M-PDCCH-resource-sets, the number of PRBs within subframes, and the like, may be independently present in each M-PDCCH-resource-set, and setting may be separately performed.

Here, a search space of each M-PDCCH may be present at each aggregation level or repetition level supported by the M-PDCCH. If the LC device is set to use only one aggregation level, the search space of the M-PDCCH may be present by aggregation levels.

When the LC device is set to have a plurality of M-SSs, subframes regarding the aggregation level (L) and the repetition level (R) corresponding to an M-PDCCH candidate m of a specific M-SS (or an M-SS in a specific M-PDCCH-resource-set when the LC device is set to have a plurality of M-PDCCH-resource-sets) may be as follows.

$$R\{(Y_r+m+b) \bmod \lfloor N_{SF,r}/R \rfloor\}+i \quad \text{[Equation 1]}$$

Here, r denotes an index regarding each SS-period section (each M-PDCCH-resource-set). That is, a configuration of subframes included in the M-SS may be varied in each of the SS-period section (M-PDCCH-resource-set). Here, $N_{SF,r}$ refers to an $N_{SF}$ value regarding an SS-period section index r (M-PDCCH-PRB-resource-set index r). The LC device may assume only one $N_{SF,r}$ value regarding one M-SS.

Here, i may have a value of 0, 1, . . . , R−1.

Here, characteristically, a value of b may be always 0. Or, $b=M(R)*n_{CI}$ or $b=M(L,R)*n_{CI}$. Here, $n_{CI}$ may be a value of CIF. Here, when the CIF is not set, b=0. Or, when the CIF is set for a cell in which the M-PDCCH is to be monitored, $b=n_{CI}$. Otherwise, b=0.

Also, in this case, m may have a value of 0, 1, . . . , M(R). M(R) denotes the number of decoding candidates having the repetition level R. Or, a value of m may have a value of 0, 1, . . . , M(L,R). M(L,R) refers to the number of decoding candidates having the aggregation level (L) and the repetition level (R).

$Y_r$, an offset value regarding a position of subframes included in a search space, may be determined by the index r regarding the SS-period section (each M-PDCCH-PRB-resource-set).

In a first example, $Y_r$ may always have a value of 0.

In a second example, $Y_r$, a device-specific random number, may be a value determined by the index r regarding the SS-period (each M-PDCCH-PRB-resource-set) and/or a UE ID (e.g., C-RNTI).

In a third example, $Y_r$, a device-specific value, may be a value which is not changed although the SS-period section (each M-PDCCH-PRB-resource-set) is changed, and determined by a UE ID (e.g., C-RNTI).

Here, in the second and third examples, a range of the value of $Y_r$ may be set to have a range of a) 0, 1, . . . , $N_{SF,r}$−1 or b) 0, 1, . . . , $N_{SF,r}$−R.

The repetition level (R) may refer to the number of subframes in which the M-PDCCH is transmitted. Or, the number of subframes determined by repetition levels may be set by the network in the LC device (the number of subframes used for each repetition level may be set by an SIB, or the like) or the network may signal a factor multiplied to the repetition levels. For example, when the number of subframes according to a repetition level 4 is 8 and the network signals a factor=0.8, the LC device may determine the number of subframes corresponding to floor (8*0.8)=6. Or, the number of subframes may be determined by a maximum CE level supported by the network. For example, when the maximum CE level supported by the network is lower by 3 dB than the maximum CE level supported by a standard document, a value of the number of subframes may be reduced to 50%. In other words, the factor may be used to signify a supported coverage extension level against a maximum CE level supported in the standard document. Thus, although the maximum CE level supported by the network is changed, the search space to be blind-searched by the LC device may not be changed. However, the number of subframes to be monitored in each SS may be determined by the factor. For the sake of convenience, a T-M-CSF (time-domain MTC-Control subframe) may refer to a value obtained by dividing the number of subframes required for satisfying a repetition level corresponding to R=4 by 4. That is, floor (# of repetition/R)=T-M-$CSF_R$. This is for the sake of convenience and more R may be set in consideration of a maximum CE level set by the network.

In case where a value of the repetition level (R) and the number of subframes in which the M-PDCCH is actually transmitted are not the same, the number of subframes corresponding to the M-PDCCH candidate of the M-SS is assumed to be $N_R$. Here, subframes regarding the aggregation level (L) and the repetition level (R) corresponding to the M-PDCCH candidates of the M-SS are as follows. In detail, according to this clause, part corresponding to R in a formula for obtaining the number of subframes regarding the aggregation level (L) and the repetition level (R) corresponding to the M-PDCCH candidates of the M-SS may be changed to $N_R$.

$$R\{(Y_r+m+b) \bmod \lfloor N_{SF,r}/N_R \rfloor\}+i \quad \text{[Equation 2]}$$

Characteristically, when the value of $N_{SF,r}$ is always the same in each SS-period section (each M-PDCCH-PRB-resource-set), subframes regarding the aggregation level (L) and the repetition level (R) corresponding to the M-PDCCH candidates of the M-SS may be as follows.

$$R\{(Y_r+m+b) \bmod \lfloor N_{SF}/R \rfloor\}+i \quad \text{[Equation 3]}$$

Positions of the subframes described above may indicate relative subframe positions from a first subframe within the SS-period section (each M-PDCCH-PRB-resource-set).

That is, when an index of the first subframe regarding index k regarding the SS-period section (each M-PDCCH-PRB-resource-set) is $SF_r$, subframes regarding the aggregation level (L) and the repetition level (R) corresponding to the M-PDCCH candidates of the M-SS may be as follows.

$$S_r + R\{(Y_r+m+b) \bmod \lfloor N_{SF,r}/R \rfloor\}+i \quad \text{[Equation 4]}$$

In case where the value of the repetition level (R) and the number of subframes in which the M-PDCCH is actually transmitted are not the same, the number of the subframes corresponding to the repetition level (R) will be referred to as $N_R$. Here, subframes regarding the aggregation level (L) and the repetition level (R) corresponding to the M-PDCCH candidates of the M-SS may be as follows.

$$S_r + R\{(Y_r+m+b) \bmod \lfloor N_{SF,r}/N_R \rfloor\}+i \quad \text{[Equation 5]}$$

It may be assumed that one decoding candidate, starting from a corresponding starting subframe, is repeated on R number of subframes. In detail, the number ($N_{SF}$) of subframes included in the M-PDCCH-resource-set is based upon the premise that only a valid downlink subframe (subframe in which the M-PDCCH or the E-PDCCH is received) is counted. When a subframe corresponds to a collision with a common search space (CSS), a measurement gap, a gap for measurement of an inter-subband CSI, a gap for frequency readjustment, a UL subframe in TDD, an MBSFN, and the like, so the LC device can hardly expect M-PDCCH/M-PDCCH repetition, the subframe is excluded from valid subframes. To this end, it may be assumed that, when the LC device is set to hop a subband in every K number of subframes and a last subframe of each of the K number of subframes is set to be used as a gap for frequency readjustment, the LC device does not receive an M-PDCCH/M-PDCCH on the subframe set as the corresponding gap, regardless of whether the LC device actually uses the last Kth subframe as a gap. Such a gap is valid when frequency hopping (subband hopping) is set. For example, the gap may not be used when a frequency is not required to be readjusted to receive a control channel or cell common data on a CSS or when a previous subframe corresponding to the gap is an MBSFN so frequency readjustment may be performed in advance. Or the gap may not be separately set in a corresponding situation under the assumption that such subframes are always used as a gap. However, for consistency between the network and the LC device, a given gap is assumed, regardless of necessity of the gap, in a situation in which a gap is not dynamically required (e.g., CSS monitoring), or the like. The situation in which a gap is not required to be assumed may include an MBSFN, UL (if UL is used as a gap), and the like.

If a search space is changed within a subframe, a starting index of a corresponding ECCE or CCE may be determined as in the related art.

When it is assumed that SS-periods are the same by repetition levels and there are several repetition levels to be monitored by the LC device, only one SS candidate may be set to be present in each SS period and a first subframe and a last subframe may be aligned. Here, in the case of a low repetition level, the M-PDCCH may be repeatedly transmitted occasionally.

Or, the SS periods may be set to be the same and offsets may be set to be different by repetition levels, so that in any one case, one repetition level may be blind-decoded but each repetition level may be changed over time.

Figure 16A:
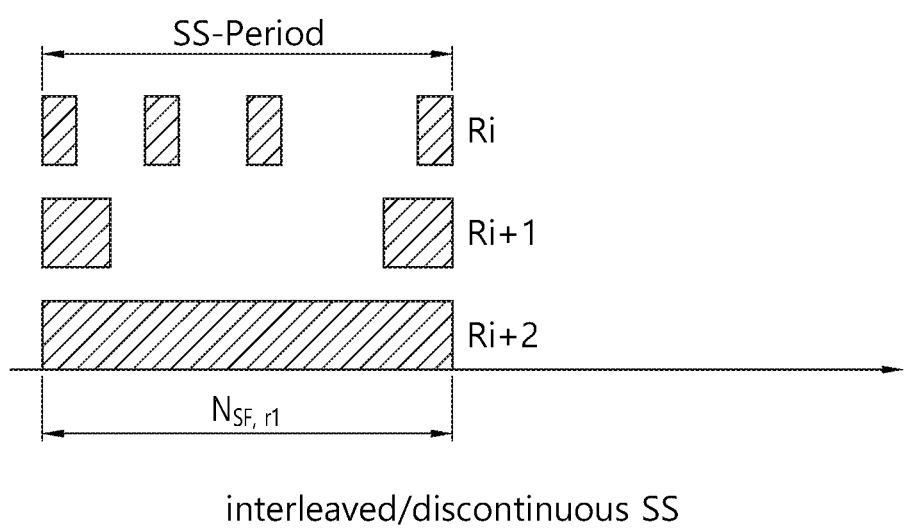
FIGS. 16A and 16B illustrate an example of a search space.
Figure 16B:
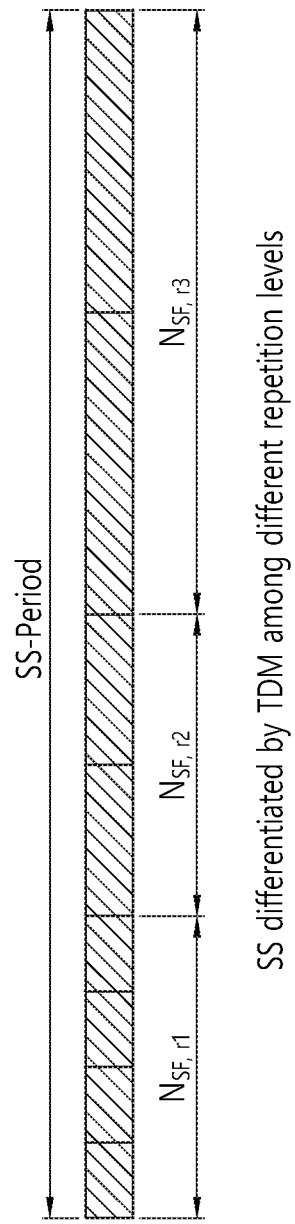

FIGS. 16A and 16B illustrate an example of a search space.

FIGS. 16A and 16B illustrate an example of the aforementioned two cases. This is a simple example and a plurality of candidates may be set. Also, in order to support the example illustrated in FIG. 16B, a period and an offset may be given by repetition levels.

A search space in which the LC device monitors an M-PDCCH may be defined for a specific repetition level. That is, in an $n_p$th M-PDCCH monitoring period, a search space regarding (L,R) may be defined as $MS^{(L,R)}_{n_p}$.

Figure 17A:
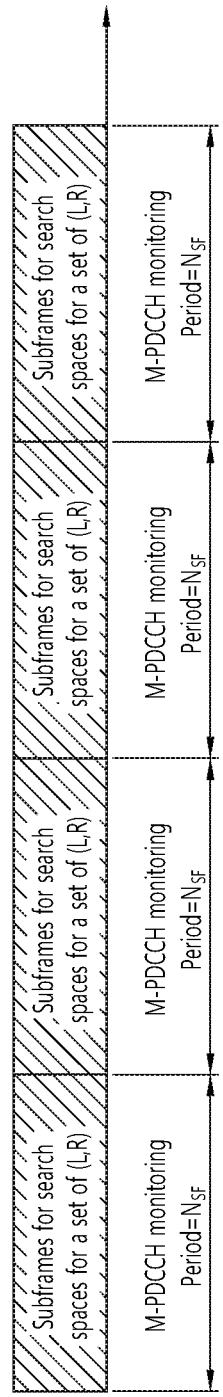
FIGS. 17A and 17B illustrate an example of a monitoring period and a search space.
Figure 17B:
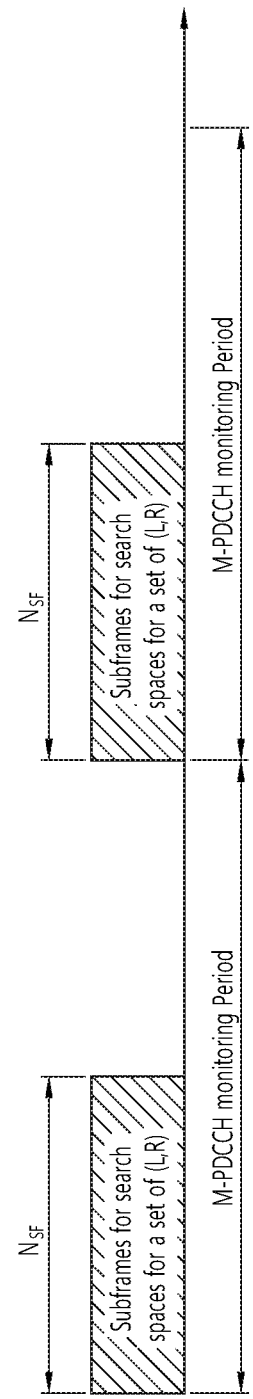

FIGS. 17A and 17B illustrate an example of a monitoring period and a search space.

When the number of subframes in which search spaces regarding every repetition level in which the LC device monitors the M-PDCCH are positioned is $N_{SF}$, an M-PDCCH monitoring period (=SS period) may always be the same as $N_{SF}$ as illustrated in FIG. 17A. This may mean that the LC device always monitors the M-PDCCH on every subframe.

Meanwhile, as illustrated in FIG. 17B, the value of $N_{SF}$ may be smaller than the M-PDCCH monitoring period so the LC device may monitor the M-PDCCH only in a partial subframe section of the M-PDCCH monitoring period. In this case, since a time section in which the LC device does not monitor the M-PDCCH is generated, if an amount of data is small, a waste of power due to unnecessary M-PDCCH monitoring by the LC device may be prevented. Here, an offset value for setting a position of $N_{SF}$ number of subframes in which a search space for the LC device for monitor the M-PDCCH is present may always set to 0 or may be determined device-specifically. When the offset value is determined device-specifically, the offset value may be semi-statically set in the LC device through RRC signaling and/or may be determined by an ID (e.g., C-RNTI) of a device.

At an $n_p$th period, a subframe index corresponding to an M-PDCCH decoding candidate m of a search space $MS^{(L,R)}_{n_p}$ regarding (L,R) may be as follows.

$$R(m \bmod \lfloor N_{SF}/N_R \rfloor) + i \qquad \text{[Equation 6]}$$

$$R \cdot m + i \qquad \text{[Equation 7]}$$

Here, $N_R$ may be the same as a subframe number (subframe number regarding M-PDCCH transmission) corresponding to the repetition level (R).

FIGS. 18A to 18D illustrate M-PDCCH decoding candidates.

Figure 18A:
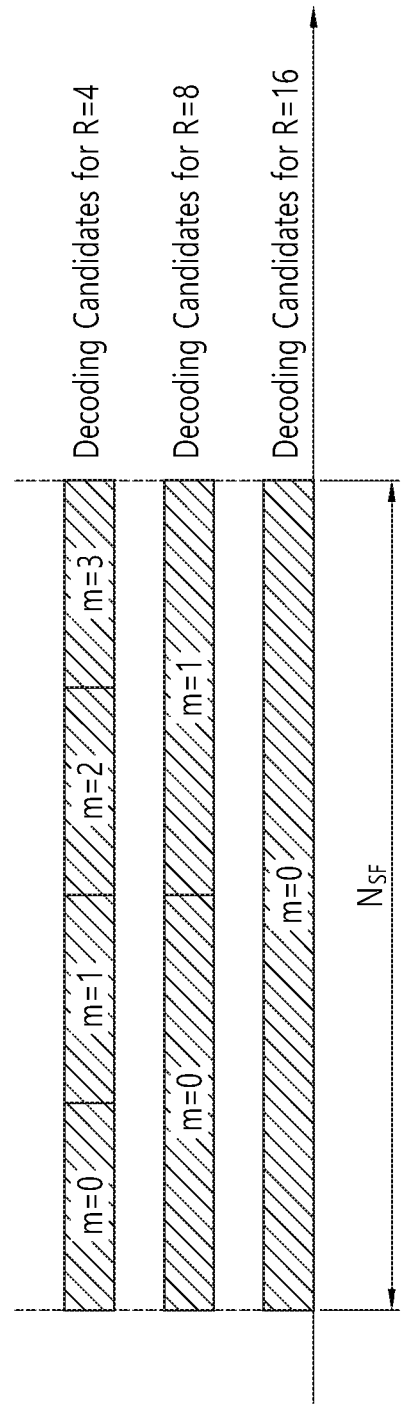
FIGS. 18A to 18D illustrate an example of M-PDCCH decoding candidates.
Figure 18B:
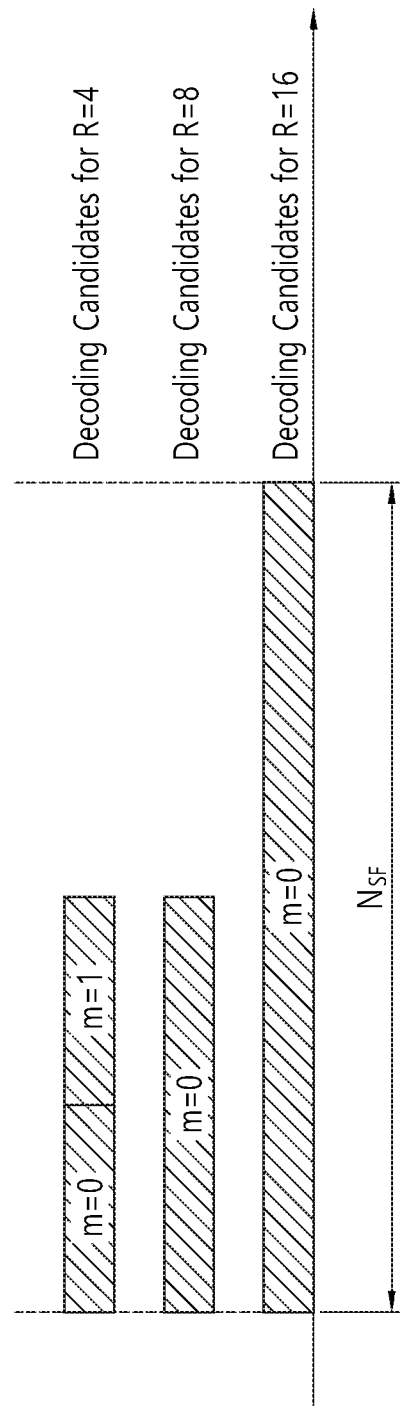
Figure 18C:
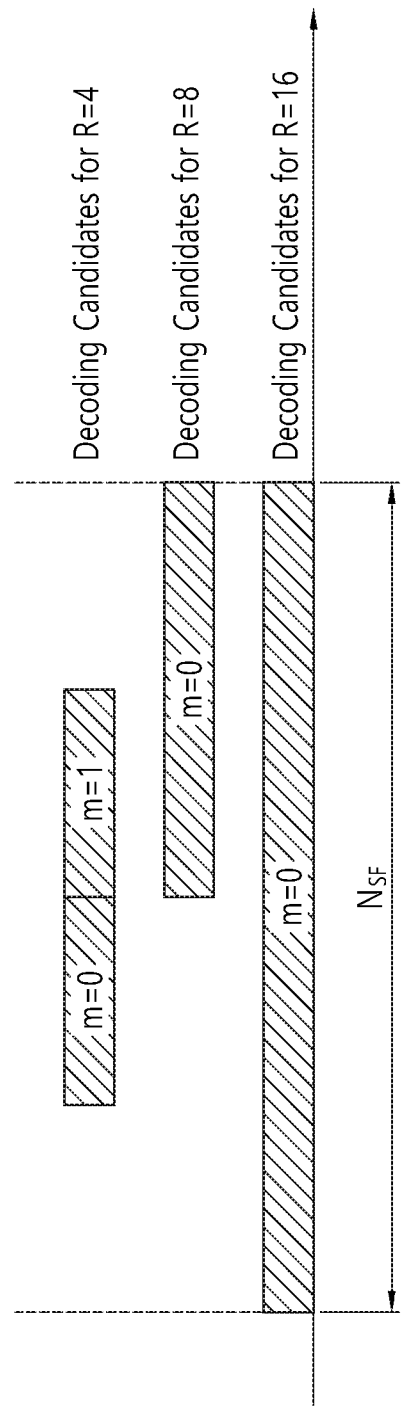
Figure 18D:
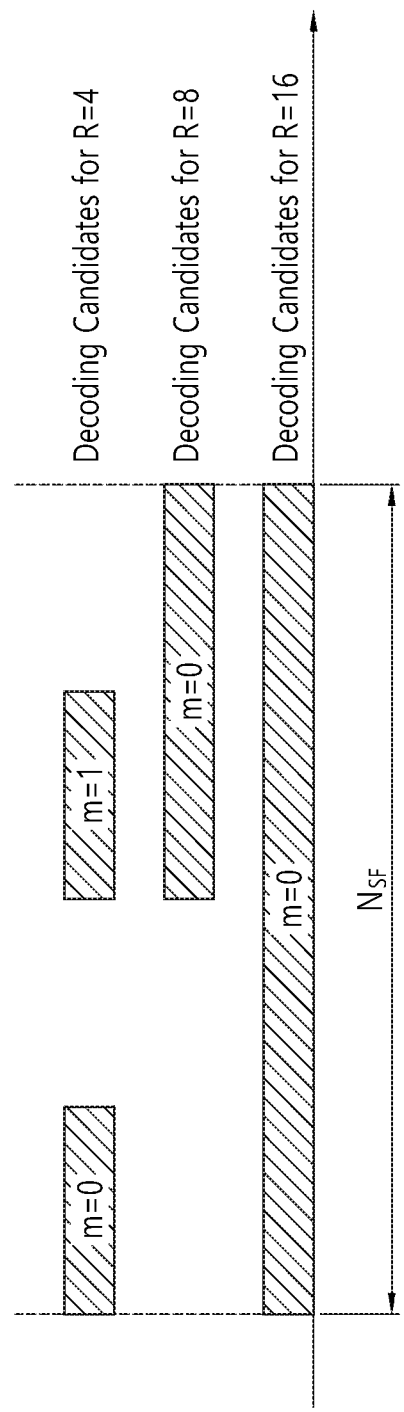

When the above equation is applied, decoding candidates are positioned in consecutive subframes from a first subframe of the $N_{SF}$ number of subframes included in the search space as illustrated in FIGS. 18A and 18B. The aforementioned equation may be more particularly appropriate when the number of decoding candidates present per (L, R) monitored by the LC device is equal to $N_{SF}/N_R$. Or, the aforementioned equation may be more appropriate when the number of monitored decoding candidates present per (L, R) is 1.

In another example, it may be determined as follows.

$$R\{(Z_{n_p} + m) \bmod \lfloor N_{SF}/N_R \rfloor\} + \qquad \text{[Equation 8]}$$

$$R\left\{\left(Z_{n_p} + \left\lfloor \frac{m \cdot N_{SF}}{R \cdot M^{(L,R)}} \right\rfloor\right) \bmod \lfloor N_{SF}/N_R \rfloor\right\} + i \qquad \text{[Equation 9]}$$

When Equation 8 is applied, decoding candidates regarding (L, R) are positioned in consecutive subframes from a position of a specific subframe of the $N_{SF}$ number of subframes included in the search space.

I-2. Number of Decoding Candidates

In case where only one aggregation level is supported in the M-PDCCH or in case where the number of decoding candidates according to a specific repetition level regarding every aggregation level is the same, the number M(R) of decoding candidates according to the repetition level L may be defined. In detail, the number of decoding candidates by repetition levels according to a value of $N_{SF,r}$ may be defined.

For example, the number of decoding candidates according to repetition levels may be defined by the following table. An $N_{SF,r}$ value for M-PDCCH monitoring may be set for the LC device by the BS through higher layer signaling. Or, the $N_{SF,r}$ value may be determined according to a coverage enhancement level of the LC device. In detail, regarding one M-SS, the $N_{SF,r}$ value may be a semi-statically changed value. Or, the $N_{SF,r}$ value may be varied according to a value of r as an index regarding each SS period section (each M-PDCCH-PRB-resource-set) but a specific SS-period section (each M-PDCCH-PRB-resource-set) may have only one value. Thus, the LC device may determine the number of decoding candidates to be monitored by repetition levels as illustrated in Table 9 according to the $N_{SF,r}$ value applied in a specific SS-period section (each M-PDCCH-PRB-resource-set) regarding one M-SS. That is, repetition levels to be monitored by the LC device and/or the number of decoding candidates of the repetition levels may be varied according to the $N_{SF,r}$ value applied to the LC device. That is, for example, when the value of $N_{SF,r}$ in a specific SS-period section (each M-PDCCH-PRB-resource-set) is 16, the LC device monitors repetition levels (R) 4, 8, and 16 and monitors a total of seven decoding candidates including four decoding candidate having a repetition level (R)=4, two decoding candidates having R=8, and one decoding candidate having R=16.

TABLE 9

| | Number of M(R) decoding candidates | | | | |
|---|---|---|---|---|---|
| $N_{SF,r}$ | R = 4 | R = 8 | R = 16 | R = 32 | R = 64 |
| 16 | 4 | 2 | 1 | 0 | 0 |
| 32 | 8 | 4 | 2 | 1 | 0 |
| 64 | 16 | 8 | 4 | 2 | 1 |

In case where several aggregation levels are supported in the M-PDCCH, M(L,R), the number of decoding candidates according to the aggregation levels (L) and the repetition levels (R), may be defined. Characteristically, the number of decoding candidates of each aggregation level (L) and repetition level (R) according to the value of $N_{SF,r}$ may be defined.

For example, in case where a size of the M-PDCCH-PRB-set is fixed to one value (e.g., 6 PRBs), the number of decoding candidates according to an aggregation level and a repetition level may be defined as illustrated in Table 10 below. That is, for example, in case where a value of $N_{SF,r}$ is 32 in a specific SS-period section (each M-PDCCH-PRB-resource-set), the LC device monitors (L, R)=(8, 16), (16, 16), (24, 16), (8, 32), (16, 32), (24, 32) and monitors a total of 14 decoding candidates including six decoding candidates having (L, R)=(8, 16), two decoding candidates having (L, R)=(16, 16), two decoding candidates having (L, R)=(24, 16), two decoding candidates having (L, R)=(8, 32), one decoding candidate having (L, R)=(16, 32), and one decoding candidate having (L, R)=(24, 32). Here, L is an aggregation level and R is a repetition level.

TABLE 10

| | Number of M(L, R) decoding candidates | | | | | | | | | |
|---|---|---|---|---|---|---|---|---|---|---|
| $N_{SF,r}$ | L = 4, R = 8 | L = 8, R = 8 | L = 8, R = 16 | L = 16, R = 16 | L = 24, R = 16 | L = 8, R = 32 | L = 16, R = 32 | L = 24, R = 32 | L = 16, R = 64 | L = 24, R = 64 |
| 16 | 8 | 6 | 3 | 1 | 1 | | | | | |
| 32 | | | 6 | 2 | 2 | 2 | 1 | 1 | | |
| 64 | | | | | | 6 | 2 | 2 | 1 | 1 |

Or, for example, the number of decoding candidates may be set to be different according to (aggregation level, repetition level) according to a size of them-PDCCH-PRB-set and the value of $N_{SF,r}$. The $N_{SF,r}$ value for M-PDCCH monitoring and the M-PDCCH-PRB-set of the LC device may be set by the BS through higher layer signaling. Or, the $N_{SF,r}$ value and the M-PDCCH-PRB-set may be determined according to a coverage enhancement level of the LC device. Characteristically, regarding one M-SS, the $N_{SF,r}$ value and/or the M-PDCCH-PRB-set may be a semi-statically changed value. The LC device may determine a set of {aggregation level, repetition level} to be monitored by the LC device and the number of decoding candidates according to the $N_{SF,r}$ value set (used) for the LC device and/or the M-PDCCH-PRB-set.

Or, the value of M(R) or the value of M(L,R) may always be the same as $N_{SF,r}/R$ or $N_{SF}/R$. In case where the value of the repetition level (R) and the number of subframes in which the M-PDCCH is actually transmitted are not the same, the number of subframes corresponding to the repetition level (R) is assumed to be $N_R$. Here, the value of M(R) or the value of M(L,R) may always be the same as $N_{SF,r}/N_R$ or $N_{SF}/N_R$.

For example, the M-SS set for the LC device may be, for example, that $N_{SF,r}$ is a set of {M(L,R)}. For example, in the above table, {(4,8), (8,8), (8,16), (16,16), (24,16)} ($N_{SF,r}=16$).

Characteristically, a value of an aggregation level and/or a value of repetition level to be monitored by the LC device and a value of M(L,R) or M(R) by aggregation levels and/or repetition levels may be determined according to a decoding candidate set index as illustrated in Table 11 below, for example. Here, the decoding candidate set index may be a fixed value or set by the BS for the LC device through an SIB or higher layer signaling. Or the decoding candidate set index may be determined according to a coverage enhancement level of the LC device or a maximum coverage enhancement level supported by the BS. Or, the decoding candidate set index may be determined according to a coverage enhancement level of the LC device as illustrated in Table 12 and Table 13 below.

TABLE 11

| Decoding set candidate index | Number of M(L, R) decoding candidates | | | | | | | | |
|---|---|---|---|---|---|---|---|---|---|
| | L = 4, R = 8 | L = 8, R = 8 | L = 8, R = 16 | L = 16, R = 16 | L = 24, R = 16 | L = 8, R = 32 | L = 16, R = 32 | L = 24, R = 32 | L = 16, R = 64 | L = 24, R = 64 |
| 0 | 8 | 6 | 3 | 1 | 1 | | | | | |
| 1 | | | 6 | 2 | 2 | 2 | 1 | 1 | | |
| 2 | | | | | | 6 | 2 | 2 | 1 | 1 |

TABLE 12

| Coverage enhancement level | Number of M(L, R) decoding candidates | | | | | | | | |
|---|---|---|---|---|---|---|---|---|---|
| | L = 4, R = 8 | L = 8, R = 8 | L = 8, R = 16 | L = 16, R = 16 | L = 24, R = 16 | L = 8, R = 32 | L = 16, R = 32 | L = 24, R = 32 | L = 16, R = 64 | L = 24, R = 64 |
| 0 (5 dB) | 8 | 6 | 3 | 1 | 1 | | | | | |
| 1 (10 dB) | | | 6 | 2 | 2 | 2 | 1 | 1 | | |
| 2 (15 dB) | | | | | | 6 | 2 | 2 | 1 | 1 |

TABLE 13

| Coverage enhancement level | Number of M(L, R) decoding candidates | | | | | | | | | |
|---|---|---|---|---|---|---|---|---|---|---|
| | L = 8, R = 1 | L = 24, R = 1 | L = 8, R = 16 | L = 16, R = 16 | L = 24, R = 16 | L = 8, R = 32 | L = 16, R = 32 | L = 24, R = 32 | L = 16, R = 64 | L = 24, R = 64 |
| 0 (0 dB) | 3 | 1 | | | | | | | | |
| 1 (5 dB) | | | 3 | 1 | 1 | | | | | |
| 2 (10 dB) | | | 6 | 2 | 2 | 2 | 1 | 1 | | |
| 3 (15 dB) | | | | | | 6 | 2 | 2 | 1 | 1 |

Characteristically, a value of M(L,R) or M(R) of each aggregation level and/or repetition level to be monitored by the LC device may be set in the LC device cell-specifically. Or, a value of M(L,R) or M(R) of each aggregation level and/or repetition level to be monitored by the LC device may be set in the LC device cell-specifically according to coverage enhancement levels. Here, such setting may be performed through an SIB.

Or, the number of available decoding candidates for each {L,R} or R may be defined by a plurality of numbers on a standard document. For example, when the number of {L,R} or R monitored by the LC device is K, the number of available decoding candidates for each {L,R} or R regarding the corresponding K number of {L,R} or R may be defined by a plurality of numbers on a standard document. For example, when the number of {L,R} or R monitored by the LC device is 4, a set regarding the number of available decoding candidates for each {L,R} or R regarding the corresponding four {L,R} or R is defined as a candidate number 1=[4, 3, 2, 1], candidate number 2=[2, 2, 2, 1], candidate number 3=[4, 4, 1, 1], and candidate number 4=[1, 1, 1, 1] on the standard document. Here, nth value of each candidate number refers to the number of decoding candidates regarding nth {L,R} or R value. Here, in order to determine the number of decoding candidates for each {L,R} or R to be used for the LC device to monitor the M-PDCCH, one of the corresponding available candidate numbers (e.g., among the candidate numbers 1, 2, 3, and 4) is selected and an index regarding the candidate number used by the LC device may be set in the LC device. Such setting may be transmitted through RRC signaling device-specifically. Or, such setting may be transmitted by an SIB cell-specifically. Or, such setting may be set in the LC device cell-specifically by coverage enhancement levels.

II. Second Disclosure: Method for Configuring M-SS

In this clause, a method for configuring a search space for an LC device on the basis of the definition of the MTC-SS described above in clause I is proposed.

II-1. M-SS Configuring Method 1

M-SS#1 in which a specific LC device to monitor the M-PDCCH may be present at the period of SS-period. Here, the SS-period may be the same as $N_{SF}$.

Here, the value of $N_{SF}$ is varied semi-statically according to a coverage enhancement level of the LC device, and the aggregation levels and/or repetition levels to be monitored by the LC device and the number of decoding candidates by the aggregation levels (L) and the repetition levels (R) may be varied. Also, $N_{SF}$ may be determined according to a coverage enhancement level of the LC device and the M-PDCCH PRB set size (according to each M-PDCCH set) (or according to a set aggregation level). The value of $N_{SF}$ regarding the M-SS#1 may be signaled to the LC device through an SIB or signaled through RRC signaling device-specific ally.

Here, a subframe regarding the aggregation level (L) and the repetition level (R) corresponding to the M-PDCCH of the M-SS may be as follows.

$$R\{(m+b) \bmod \lfloor N_{SF}/R \rfloor\}+i \quad \text{[Equation 10]}$$

Here, when it is assumed that the LC device does not support carrier aggregation and cross-carrier scheduling, the value of b may always be the same as 0.

In case where the value of the repetition level (R) and the number of subframes in which the M-PDCCH is actually transmitted are not the same, the number of subframes corresponding to the repetition level (R) will be assumed to be $N_R$. Here, subframes regarding the aggregation level (L) and the repetition level (R) corresponding to the M-PDCCH candidate of the M-SS may be as follows.

$$R\{(m+b) \bmod \lfloor N_{SF}/N_R \rfloor\} + i \quad \text{[Equation 11]}$$

Figure 19:
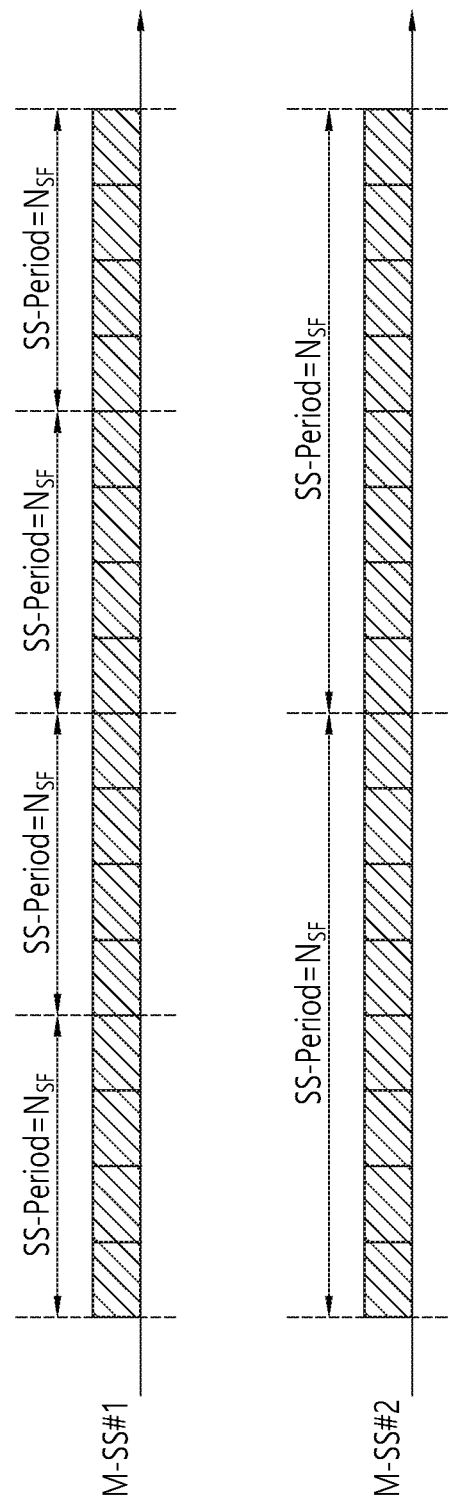
FIG. 19 illustrates an example of monitoring two search spaces (i.e., M-SS#1 and M-SS#2) by an LC device.

FIG. 19 illustrates an example in which the LC device monitors two search spaces (i.e., M-SS#1 and M-SS#2).

As illustrated in FIG. 19, apart from the M-SS#1, the LC device may monitor the M-SS#2, an additional M-SS. Characteristically, the M-SS#2 may be present in a resource within an M-PDCCH-resource-set configured separately from an M-PDCCH-resource-set to which the M-SS#1 belongs. The M-SS#1 may be used to transmit a control channel (e.g., a control channel for scheduling data device-specifically or a control channel for scheduling a random access response (RAR)) required to be transmitted dependently on a coverage enhancement level of the LC device. The M-SS#2 may be used to transmit a control channel (e.g., a control channel for scheduling a paging message, a control channel for scheduling an RRC configuration/re-configuration message, (a control channel for scheduling an RAR)) required to be transmitted in relation to a maximum coverage enhancement level supported by a cell, regardless of the coverage enhancement level of the LC device. Thus, types of control channels monitored by the LC device in the M-SS#1 and the M-SS#2 may be different. In defining a type, an RNTI and/or DCI format, and the like, may be considered.

The M-SS#2 may have a value of $N_{SF}$ different from that of the M-SS#1. Characteristically, the value of $N_{SF}$ may not be changed in relation to the maximum coverage enhancement level supported by a cell or may rarely be changed. The corresponding value may always be greater than or equal to $N_{SF}$.

Here, the number of decoding candidates for each aggregation level (L) and repetition level (R) to be monitored by the LC device (according to $N_{SF}$) may be separately defined (set). Here, the value of $N_{SF}$ regarding the M-SS#2 may be signaled to the LC device through an SIB or may be signaled to the LC device through RRC signaling.

For example, a value of M(L,R) regarding the M-SS#1 may be configured as illustrated in Table 14 below such that it is varied according to a value of $N_{SF}$ set (used) in the LC device. However, regarding the M-SS#2, the value of $N_{SF}$ is not diverse, relative to the M-SS#1 and may not be changed, and values of M(L,R) may be set to include aggregation levels and/or repetition levels for supporting coverage larger than that of the M-SS#1.

Here, the M-SS#1 may be a USS, and the M-ss#2 may be a CSS.

TABLE 14

| | Number of M(L, R) decoding candidates | | | | | | | | |
|---|---|---|---|---|---|---|---|---|---|
| $N_{SF}$ | L = 4, R = 8 | L = 8, R = 8 | L = 8, R = 16 | L = 16, R = 16 | L = 24, R = 16 | L = 8, R = 32 | L = 16, R = 32 | L = 24, R = 32 | L = 16, R = 64 | L = 24, R = 64 |
| 16 | 8 | 6 | 3 | 1 | 1 | | | | | |
| 32 | | | 6 | 2 | 2 | 2 | 1 | 1 | | |
| 64 | | | | | | 6 | 2 | 2 | 1 | 1 |

TABLE 15

| | Number of M(L, R) decoding candidates | | | | | | | | |
|---|---|---|---|---|---|---|---|---|---|
| $N_{SF}$ | L = 4, R = 8 | L = 8, R = 8 | L = 8, R = 16 | L = 16, R = 16 | L = 24, R = 16 | L = 8, R = 32 | L = 16, R = 32 | L = 24, R = 32 | L = 16, R = 64 | L = 24, R = 64 |
| 64 | | | | | | | 2 | 2 | 1 | 1 |

II-2. M-SS Configuring Method 2

The M-SS#1 in which a specific LC device monitors the M-PDCCH may be present at a period of SS-period.

Figure 20:
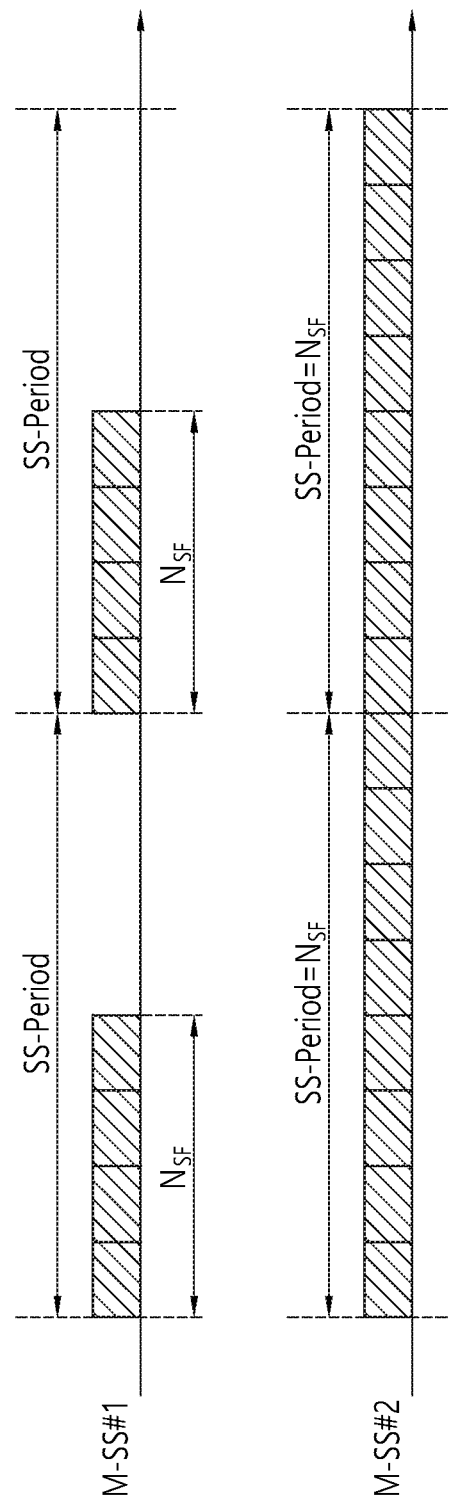
FIG. 20 illustrates an example in which the number of subframes is independently set with respect to an SS-period.

FIG. 20 illustrates an example in which the number ($N_{SF}$) of subframes is set independently from an SS-period.

As illustrated in FIG. 20, $N_{SF}$ may be set independently from the SS-period. The SS-period and/or the value of $N_{SF}$ may be signaled to the LC device through an SIB or may be signaled to the LC device through RRC signaling device-specifically.

The value of $N_{SF}$ may be varied semi-statically according to a coverage enhancement level of the LC device and the number of decoding candidates of each aggregation level (L) and repetition level (R) to be monitored by the LC device may be varied. The value of $N_{SF}$ regarding the M-SS#1 may be signaled to the LC device through an SIB or may be signaled to the LC device through RRC signaling device-specifically.

In this case, a subframe regarding the aggregation level (L) and the repetition level (R) corresponding to the M-PDCCH candidate of the M-SS may be as follows.

$$R\{(Y_r+m+b) \bmod \lfloor N_{SF}/R \rfloor\}+i \qquad \text{[Equation 12]}$$

Here, when it is assumed that the LC device does not support carrier aggregation and cross-carrier scheduling, the value of b may always be the same as 0.

Here, the value of $Y_r$ may always be 0. Or, the value of $Y_r$ may be determined by an ID (e.g., a C-RNTI) of device device-specifically or may be determined by an index r regarding an SS-period section (each M-PDCCH-PRB-resource-set) by a random number device-specifically or by an ID (e.g., a C-RNTI) of a device.

In case where the value of the repetition level (R) and the number of subframes in which the M-PDCCH is actually transmitted are not the same, the number of subframes corresponding to the repetition level (R) will be assumed to be $N_R$. Here, subframes regarding the aggregation level (L) and the repetition level (R) corresponding to the M-PDCCH candidate of the M-SS may be as follows.

$$R\{(Y_r+m+b) \bmod \lfloor N_{SF}/N_R \rfloor\}+i \qquad \text{[Equation 13]}$$

As illustrated in FIG. 20, apart from the M-SS#1, the LC device may monitor the M-SS#2, an additional M-SS. The M-SS#2 may be present in a resource within an M-PDCCH-resource-set configured separately from an M-PDCCH-resource-set to which the M-SS#1 belongs. The M-SS#1 may be used to transmit a control channel (e.g., a control channel for scheduling data device-specifically or a control channel for scheduling a random access response (RAR)) required to be transmitted dependently on a coverage enhancement level of the LC device. The M-SS#2 may be used to transmit a control channel (e.g., a control channel for scheduling a paging message, a control channel for scheduling an RRC configuration/re-configuration message, (a control channel for scheduling an RAR)) required to be transmitted in relation to a maximum coverage enhancement level supported by a cell, regardless of the coverage enhancement level of the LC device. Thus, types of control channels monitored by the LC device in the M-SS#1 and the M-SS#2 may be different.

The M-SS#2 may have an SS-period value and/or a value of $N_{SF}$ different from that of the M-SS#1. The SS-period value or the value of $N_{SF}$ may not be changed in relation to the maximum coverage enhancement level supported by a cell or may rarely be changed. Or the SS-period values of the M-SS#1 and the M-SS#2 are the same and the SS-period values may not be changed in relation to a maximum coverage enhancement level supported by a cell or may rarely be changed. However, the M-SS#2 may have a value of $N_{SF}$ with the M-SS#1.

Here, the number of decoding candidates for each aggregation level (L) and repetition level (R) to be monitored by the LC device (according to $N_{SF}$) may be separately defined (set). Here, the SS-period value and/or the value of $N_{SF}$ regarding the M-SS#2 may be signaled to the LC device through an SIB or may be signaled to the LC device through RRC signaling.

For example, a value of M(L,R) regarding the M-SS#1 may be configured as illustrated in Table 14 such that it is varied according to a value of $N_{SF}$ set (used) in the LC device. However, regarding the M-SS#2, the value of $N_{SF}$ is not diverse, relative to the M-SS#1 and may not be changed, and values of M(L,R) may be set to include aggregation levels and/or repetition levels for supporting coverage larger than that of the M-SS#1.

Here, the M-SS#1 may be a USS, and the M-ss#2 may be a CSS.

II-3. M-SS Configuring Method 3

The M-SS#1 in which a specific LC device monitors the M-PDCCH may be present at a period of SS-period. Here, $N_{SF}$ may be set independently from the SS-period. The value of the SS-period may be signaled to the LC device through an SIB or may be signaled to the LC device though RRC signaling device-specifically. Also, an SS-offset value for indicating a position where $N_{SF}$ number of subframes are present may be set device-specifically. The SS-offset value may be set in the LC device through an SIB or RRC signaling and/or may be determined by an ID (e.g., a C-RNTI) of a device.

The value of $N_{SF}$ may be varied semi-statically according to a coverage enhancement level of the LC device and the number of decoding candidates of each aggregation level (L) and repetition level (R) to be monitored by the LC device may be varied. The value of $N_{SF}$ regarding the M-SS#1 may be signaled to the LC device through an SIB or may be signaled to the LC device through RRC signaling device-specifically.

In this case, a subframe regarding the aggregation level (L) and the repetition level (R) corresponding to the M-PDCCH candidate of the M-SS may be as follows.

$$R\{(m+b) \bmod \lfloor N_{SF}/R \rfloor\}+i \qquad \text{[Equation 14]}$$

Here, when it is assumed that the LC device does not support carrier aggregation and cross-carrier scheduling, the value of b may always be the same as 0.

In case where the value of the repetition level (R) and the number of subframes in which the M-PDCCH is actually transmitted are not the same, the number of subframes corresponding to the repetition level (R) will be assumed to be $N_R$. Here, subframes regarding the aggregation level (L) and the repetition level (R) corresponding to the M-PDCCH candidate of the M-SS may be as follows.

$$R\{(m+b) \bmod \lfloor N_{SF}/N_R \rfloor\}+ \qquad \text{[Equation 15]}$$

Apart from the M-SS#1, the LC device may monitor the M-SS#2, an additional M-SS. The M-SS#2 may be present in a resource within an M-PDCCH-resource-set configured separately from an M-PDCCH-resource-set to which the M-SS#1 belongs. The M-SS#1 may be used to transmit a control channel (e.g., a control channel for scheduling data device-specifically or a control channel for scheduling a random access response (RAR)) required to be transmitted dependently on a coverage enhancement level of the LC device. The M-SS#2 may be used to transmit a control channel (e.g., a control channel for scheduling a paging message, a control channel for scheduling an RRC configuration/re-configuration message, (a control channel for scheduling an RAR)) required to be transmitted in relation to a maximum coverage enhancement level supported by a cell, regardless of the coverage enhancement level of the UE. Thus, types of control channels monitored by the LC device in the M-SS#1 and the M-SS#2 may be different.

The M-SS#2 may have an SS-period value and/or a value of $N_{SF}$ different from that of the M-SS#1. The SS-period value or the value of $N_{SF}$ may not be changed in relation to the maximum coverage enhancement level supported by a cell or may rarely be changed. Or the SS-period values of the M-SS#1 and the M-SS#2 are the same and the SS-period values may not be changed in relation to a maximum coverage enhancement level supported by a cell or may rarely be changed. However, the M-SS#2 may have a value of $N_{SF}$ with the M-SS#1.

Regarding the M-SS#2, an SS-offset value for indicating a position where $N_{SF}$ number of subframes are present may always be 0.

Here, the number of decoding candidates for each aggregation level (L) and repetition level (R) to be monitored by the LC device (according to $N_{SF}$) may be separately defined (set). Here, the SS-period value and/or the value of $N_{SF}$ regarding the M-SS#2 may be signaled to the LC device through an SIB or may be signaled to the LC device through RRC signaling. Or, it may be assumed that the value regarding the M-SS#2 supported by the system is previously set or can be calculated when a maximum coverage enhancement level supported by the cell is known from a preset table.

For example, a value of M(L,R) regarding the M-SS#1 may be configured as illustrated in Table 14 such that it is varied according to a value of $N_{SF}$ set (used) in the LC device. However, regarding the M-SS#2, the value of $N_{SF}$ is not diverse, relative to the M-SS#1 and may not be changed, and values of M(L,R) may be set to include aggregation levels and/or repetition levels for supporting coverage larger than that of the M-SS#1.

Here, the M-SS#1 may be a USS, and the M-ss#2 may be a CSS.

II-4. M-SS Configuring Method 4

The M-SS#1 may be configured in the same method as that mentioned above in the M-SS configuring method 1 to the M-SS configuring method 3, but the M-SS#2 may have a value of an SS-period value and/or a value of $N_{SF}$ different from those of the M-SS#1. The SS-period and/or $N_{SF}$ values may not be changed in relation to the maximum coverage enhancement level supported by cell or rarely changed.

Figure 21:
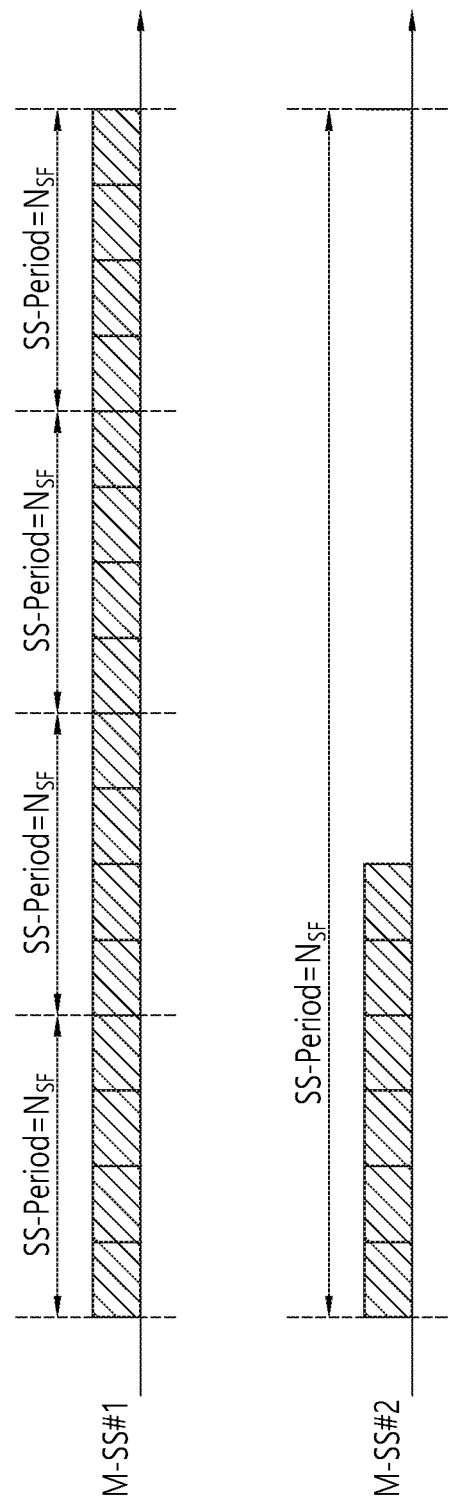
FIG. 21 illustrates an example in which a value of an SS-period is set to be greater than a value of the number of subframes (NSF).

FIG. 21 illustrates an example in which an SS-period value is set to be greater than a value of the number $N_{SF}$ of subframes.

As illustrated in FIG. 21, characteristically, the value of SS-period may be set to be greater than the value of $N_{SF}$. This is to prevent the LC device from unnecessarily frequently monitoring the M-SS#2.

Here, the number of decoding candidates of each of the aggregation level (L) and repetition level (R) to be monitored by the LC device (according to $N_{SF}$) may be separately defined (set) for the M-SS#2. Here, the values of SS-period and/or $N_{SF}$ regarding the M-SS#2 may be signaled to the LC device through an SIB or RRC signaling.

Here, the M-SS#1 may be a USS and the M-SS#2 may be a CSS.

II-5. M-SS Configuring Method 5

The M-SS#1 in which a specific LC device monitors the M-PDCCH may be present at a period of SS-period. Here, $N_{SF}$ may be set independently from the SS-period. The value of the SS-period may be signaled to the LC device through an SIB or may be signaled to the LC device though RRC signaling device-specifically.

Here, a value of $N_{SF,r}$ may be varied according to an SS-period section index r (M-PDCCH-PRB-resource-set index r).

Figure 22:
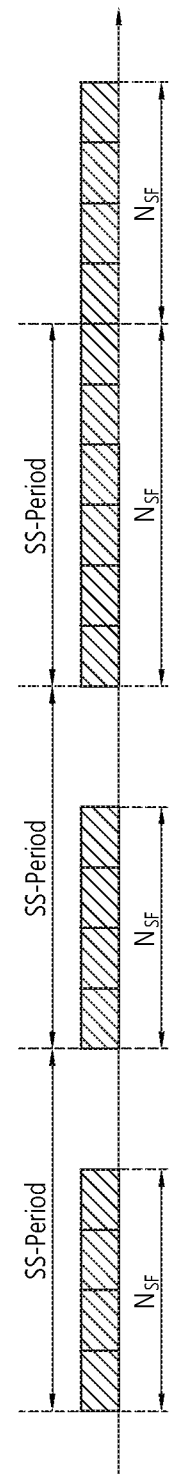
FIG. 22 illustrates an example in which several values of the number of subframes are used.

FIG. 22 illustrates an example in which several values of the number ($N_{SF}$) of subframes are used.

As illustrated in FIG. 22, two values of $N_{SF,U}$ and $N_{SF,C}$ are present in values of $N_{SF}$, and $N_{SF,U}$ may be generally used as the value of $N_{SF,r}$ and $N_{SF,C}$ may be used as the value of $N_{SF,r}$ once at N number of SS-periods. For example, $N_{SF,C}$ is used as the value of $N_{SF,r}$ in the SS-Period section index r (M-PDCCH-PRB-resource-set index r) in which r mod N=0, and $N_{SF,U}$ may be used as the value of $N_{SF,r}$ for the other remaining r values.

Here, the value of $N_{SF,U}$ may be semi-statically varied according to a coverage enhancement level of the LC device. Meanwhile, the value of $N_{SF,C}$ may be fixed according to a maximum coverage enhancement level supported by a cell or may be semi-statically varied.

Here, subframes regarding an aggregation level (L) and repetition level (R) corresponding to an M-PDCCH candidate of an M-SS may be as follows.

$$R\{(Y_r+m+b) \bmod \lfloor N_{SF}/R \rfloor\}+i \quad \text{[Equation 16]}$$

Here, when it is assumed that the LC device does not support carrier aggregation and cross-carrier scheduling, the value of b may always be the same as 0.

Here, the value of $Y_r$ may always be 0. Or, the value of $Y_r$ may be determined by an ID (e.g., a C-RNTI) of device device-specifically or may be determined by an index r regarding an SS-period section (each M-PDCCH-PRB-resource-set) by a random number device-specifically or by an ID (e.g., a C-RNTI) of a device.

In case where the value of the repetition level (R) and the number of subframes in which the M-PDCCH is actually transmitted are not the same, the number of subframes corresponding to the repetition level (R) will be assumed to be $N_R$. Here, subframes regarding the aggregation level (L) and the repetition level (R) corresponding to the M-PDCCH candidate of the M-SS may be as follows.

$$R\{(Y_r+m+b) \bmod \lfloor N_{SF}/N_R \rfloor\}+i \quad \text{[Equation 17]}$$

Characteristically, in the SS-period section in which $N_{SF,U}$ is used as a value of $N_{SF,r}$, a control channel (e.g., a control channel for scheduling data device-specifically or a control channel for scheduling a random access response (RAR)) required to be transmitted dependently on a coverage enhancement level of the LC device may be transmitted. Also, in the SS-period section in which $N_{SF,C}$ is used as the value of $N_{SF,r}$, the M-SS#2 may be used to transmit a control channel (e.g., a control channel for scheduling a paging message, a control channel for scheduling an RRC configuration/re-configuration message, (a control channel for scheduling an RAR)) required to be transmitted in relation to a maximum coverage enhancement level supported by a cell, regardless of the coverage enhancement level of the UE.

The number of decoding candidates of each aggregation level (L) and repetition level (R) according to the value of $N_{SF,r}$ may be defined as illustrated in Table 9 and Table 10.

II-6. M-SS Configuring Method 6

In another example, a method of configuring different M-SSs by M-PDCCHs/M-PDCCH sets may be considered. Configuring different SS-periods and/or offsets by sets may also be considered. Also, a set of RNTI to be read by sets may also be configured to be designated differently. For example, it may be configured such that only a C-RNTI can be decoded for set 1and P-RNTI, RA-RNTI, and C-RNTI can be decoded for set 2. In this case, it may be considered that a CSS is not present unless set 2 is configured. In the case of an LC device in which set2 is not configured in a subband set for the LC device, a control channel corresponding to common data may be detected from set1 set in a subband in which a common channel is set (it may be assumed that set1 configured in a subband configured for a common channel is a CSS).

It may be previously designated or configured such that one M-SS covers all the repetition levels supported by the network through any configuration method. For example, when repetition levels supported by the network are R1 to Rk, one M-SS may be set to correspond to search from R1 to Rk. In the M-SS, characteristically, a control channel may also be transmitted even with an RNTI other than a C-RNTI. Also, such an SS may be a CSS. Also, the M-SS may be designated and may automatically be determined according to a maximum CE level supported by the network. In order not to increase a search space and candidates of blind decoding (BD), it may be assumed that only DCI is read at a time in the M-SS, and one candidate may be fixed by repetition levels. In more detail, a period and an offset of the M-SS (or CSS) may be set and a timing to be read by RNTIs may be separately set. For example, if a CSS is set to be read at every 100 msec, the P-RNTI may be set to be read only when a paging occasion is identical with the CSS. In the case of paging occasion, the LC device may not detect a DCI to a different RNTI in the same CSS.

Meanwhile, in a situation in which a plurality of repetition levels are blind-searched in the MTC system, the use of one aggregation level at every subframe may be considered. An operation thereof is as follows.

Figure 23:
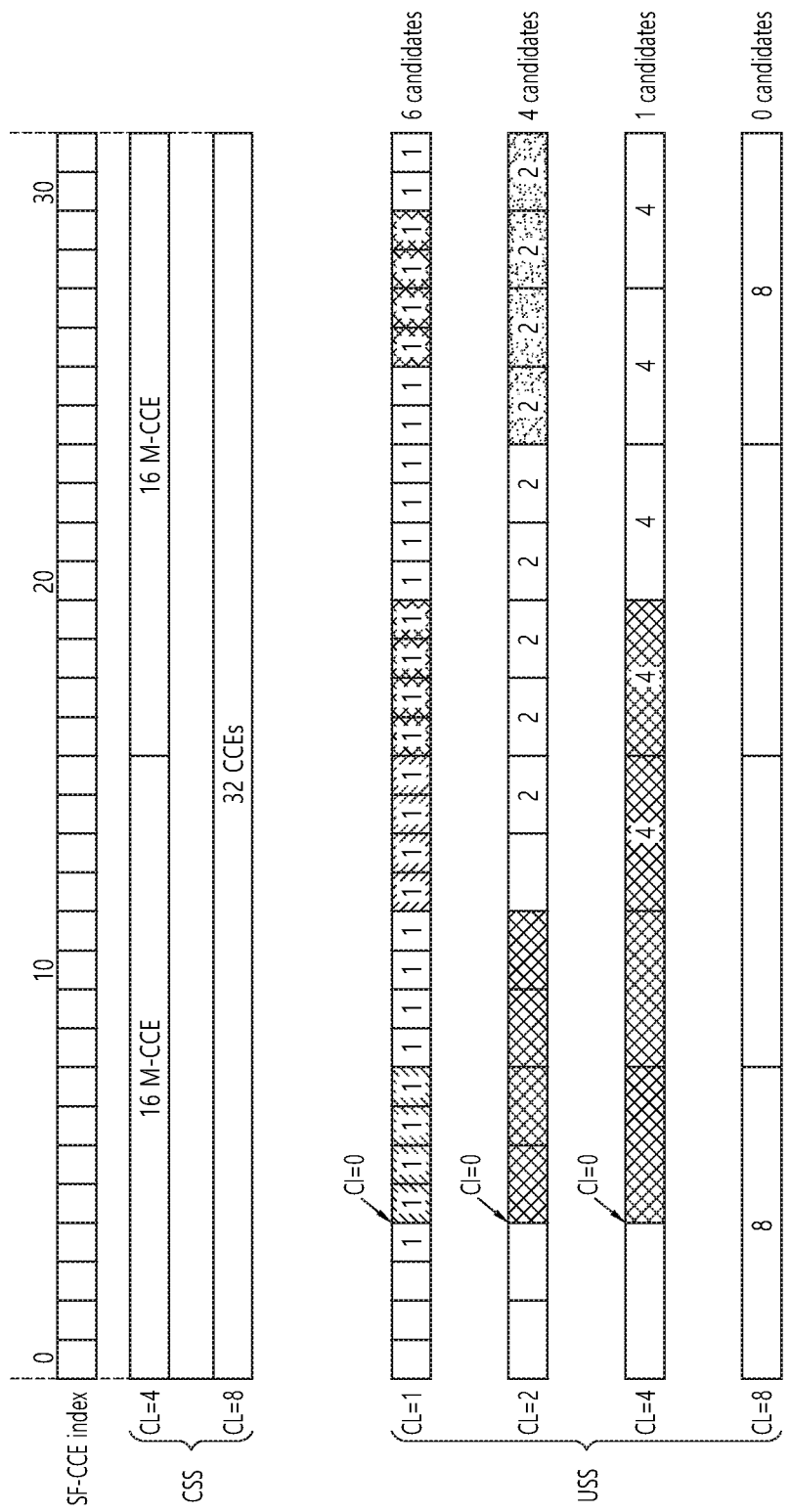
FIG. 23 illustrates an example in which the number of blind decoding candidates is changed at every different repetition levels.

FIG. 23 illustrates an example in which the number of decoding candidates is changed at every other repetition levels.

In the example of FIG. 23, one subframe or one subband in each subframe may include one M-CCE. Here, one blind decoding candidate having a coverage level (CL) 1may include four M-CCEs (i.e., four subframes). Another CL may be defined. For example, CL 1 may include four M-CCEs. CL 2 may include 8 M-CCEs. CL 3 may include 16 M-CCEs. In case where the LC device is configured as in the example described above, the LC device may need to search fifth to 32th subframes in order to search every candidate.

Another method is aligning a starting M-CCE among several CLs in order to reduce the number of subframes to be read.

Figure 24:
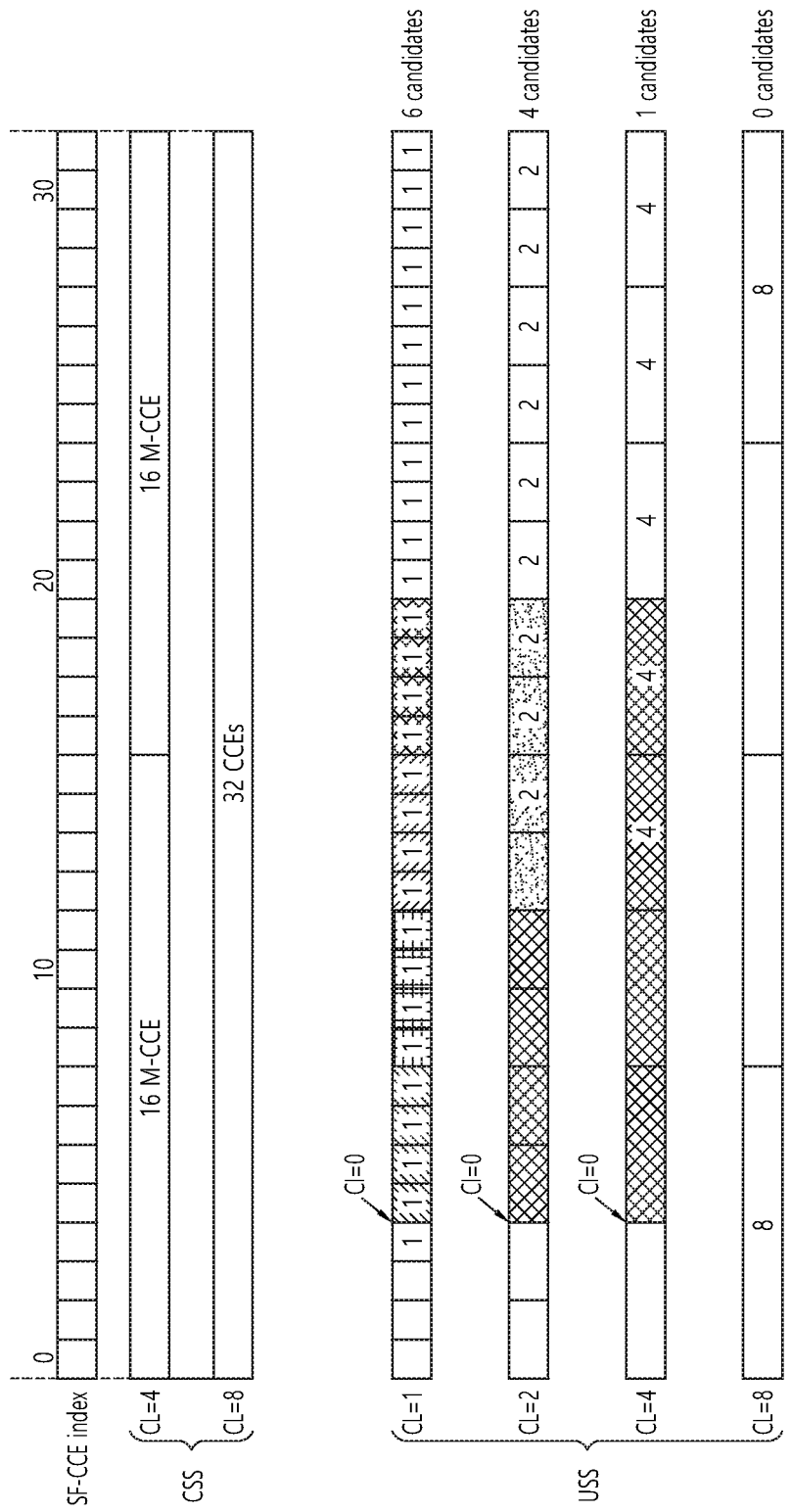
FIG. 24 illustrates an example of aligning a search space between different coverage extending levels (CLs).

FIG. 24 illustrates an example of aligning search spaces between different coverage extension levels CL.

In each coverage enhancement level, blind decoding candidates may be consecutive. In a method, if it is assumed that cross-carrier scheduling is not used in the LC device when time-domain blind detection is performed, a blind decoding candidate may be allocated to every coverage enhancement level, like a carrier indicator field (CIF).

A valid downlink subframe in which a control channel is repeatedly transmitted may be regarded as an M-CCE. A subframe in which control channels cannot be repeatedly transmitted, for example, an MBSFN, an uplink subframe, and the like, may not be considered as the M-CCE. Thus, the M-CCE may be a logical subframe index, rather than a physical subframe index or a slot index.

In order to support this, it is assumed that the coverage enhancement levels CL=0, . . . , M are present. Here, the number of subframes is $CL_L$ having an aggregation level L. For example, AL=24 and CL=0 refers to one subframe (i.e., M-CCE=1). Also, AL=24 and CL=1 refers to four subframes (i.e., M-CCE=4). In case where each LC device is configured with one or two M-PDCCHs, it is assumed that each set includes M-CCEs from 0 to $N_{M\text{-}CCE,p}$ and the same number of M-CCEs are used in a starting subframe for repetition of a control channel. Otherwise, $N_{M\text{-}CCE,p,k}$ denotes the number of M-CCEs in kth subframe in which repetition of control channels starts.

In order to support this, a device-specific search space $ES^{(CL)}{}_{k,L} CL \in \{1, 2, 3, 4, 5, 6, \ldots, M\}$ for the M-PDCCH of the aggregation level (L) is defined as a candidate set of the M-PDCCH.

Regarding an M-PDCCH set P, $Y_{p,L}$ is a starting M-CCE index within $N_{M\text{-}CCE,p}$ in which one M-PDCCH having the aggregation level (L) starts to be repeatedly transmitted. Here, when cross-carrier scheduling is not used, $ES^{(CL)}{}_{k,L}$ is given as follows.

$$CL_L\{(Y_{p,L}+m) \bmod \lfloor N_{M\text{-}CCE,p,k}/CL_L \rfloor\}+i \qquad \text{[Equation 18]}$$

Here, $CL_L$ is the number of subframes used for the coverage extension level (CL) having the aggregation level (L).

Here, $Y_{p,L}=(A_p \cdot Y_{p,k-1})$. $Y_{p,-1}=n_{RNTI} \neq 0$. $A_0=39827$, $D=635537$, and $k=\lfloor n_s/2 \rfloor$. $n_s$ is a slot number of a starting subframe when a repetition window is defined. When a repetition window is not used, $Y_{p,L}=0$. Here, starting of the M-CCE is defined by a starting subframe set configured by a higher layer.

II-6-1. ECCE Position

Meanwhile, an ECCE index corresponding to an M-PDCCH decoding candidate of a search space $MS^{(L,R)}{}_{np}$ regarding (L,R) in $n_p$th M-PDCCH monitoring period may be defined as follows.

For example, an example in which different ECCE indices are used during repetition is the same as the following equation.

$$L\left\{\left(Y_k + \left\lfloor \frac{m \cdot N_{ECCE,k}}{L \cdot M^{(L,R)}} \right\rfloor \right) \bmod \lfloor N_{ECCE,k}/L \rfloor \right\}+i \qquad \text{[Equation 19]}$$

Meanwhile, an example in which the same ECCE index is used during repletion is as follows.

$$L\left\{\left(Y_{n_p} + \left\lfloor \frac{m \cdot N_{ECCE,k}}{L \cdot M^{(L,R)}} \right\rfloor \right) \bmod \lfloor N_{ECCE,k}/L \rfloor \right\}+i \qquad \text{[Equation 20]}$$

As in Equation 19, the index of ECCEs forming one decoding candidate may be varied according to a subframe index k. Meanwhile, as in Equation 20, the index of the ECCEs forming one decoding candidate may be determined according to an index $n_p$ of the M-PDCCH monitoring period. Here, $Y_{np}$ may be a random number determined according to $n_p$. Characteristically, the variable $Y_{np}$ may be determined by an equation in which the value of k is replaced with $n_p$ in the following equation.

$$y_{p,A}=(A_p \cdot Y_{p,k-1}) \bmod D \qquad \text{[Equation 21]}$$

Here, $Y_{p,-1}=nRNTI\neq 0$, $A_0=39827$, $A_1=39829$, and $D=65537$.

Also, $k=\lfloor n_s/2 \rfloor$.

Here, $n_s$ is a slot number within a radio frame.

II-6-2. Method for Configuring Search Space

When L is an aggregation level of the M-PDCCH and R is a repetition number of the M-PDCCH, a set of {L,R} and the number of decoding candidates corresponding to each {L,R} may be defined. For example, {L,R} supported as illustrated in Table 16 below and the number of decoding candidates according to each {L,R} may be defined according to the number of PRB pairs (size of PRB-set) in which the M-PDCCH is transmitted. Here, a subset of {L,R} may be implicitly determined on the basis of a coverage enhancement level.

Here, the sub-set of {L,R} monitored by the LC device for a USS and the number of decoding candidates for each {L,R} may be determined on the basis of the number of PRB pairs of the M-PDCCH and a repetition level or a coverage enhancement level.

In order to inform about the number of decoding candidates present within the search space, a total number of decoding candidates present within a set of subframes forming the search space by each {L,R} may be informed. Here, the ECCE resource and the subframe resource forming each decoding candidate m may be defined by equation in a standard document. The decoding candidates having {L,R} may be present at a period of a position of a starting subframe of a search space defined search space-specifically or defined by a maximum R value of the search space.

Figure 25A:
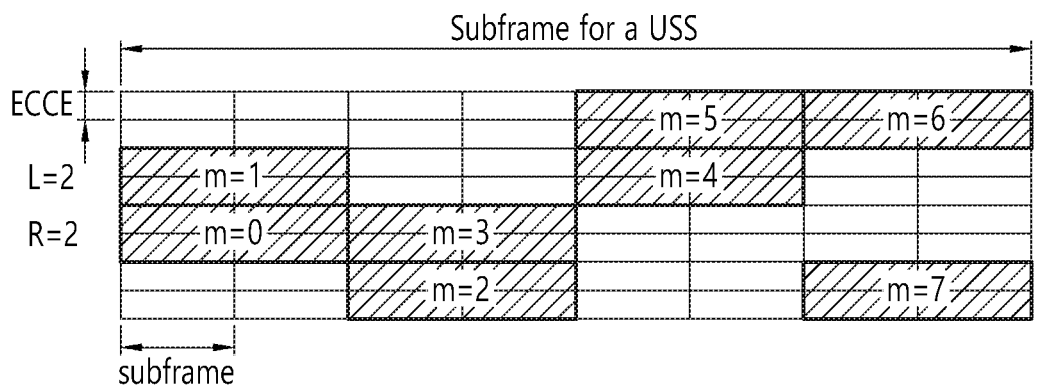
FIGS. 25A and 25B illustrate method 1 of a third disclosure of the present invention.
Figure 25A:
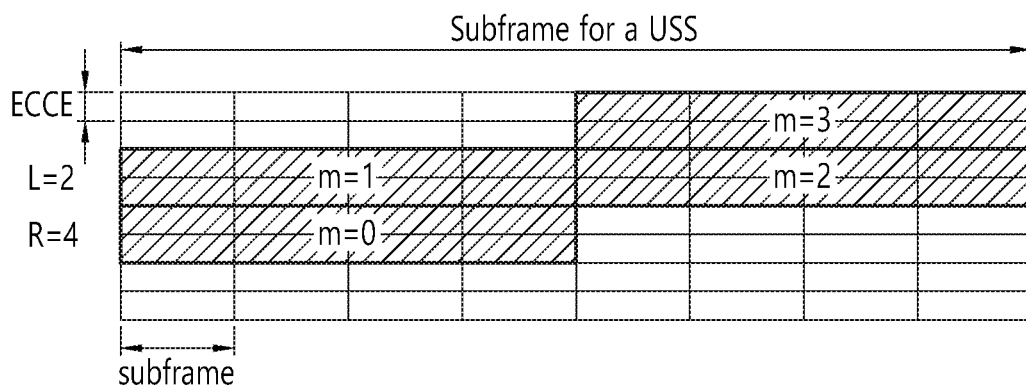
Figure 25A:
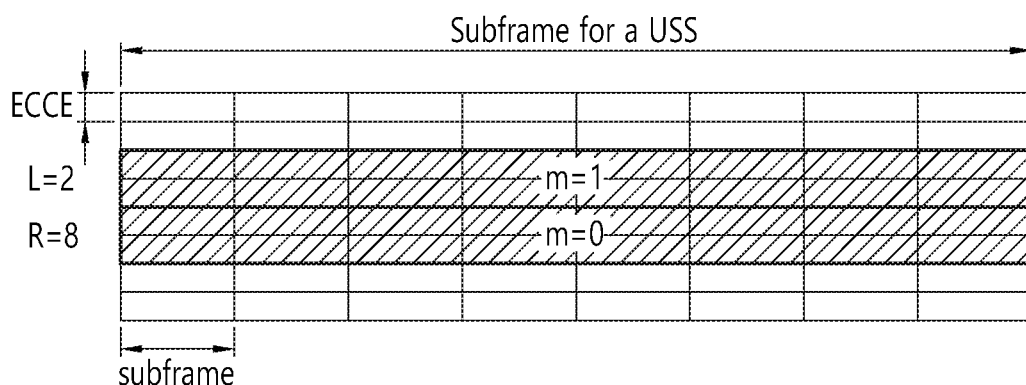
Figure 25B:
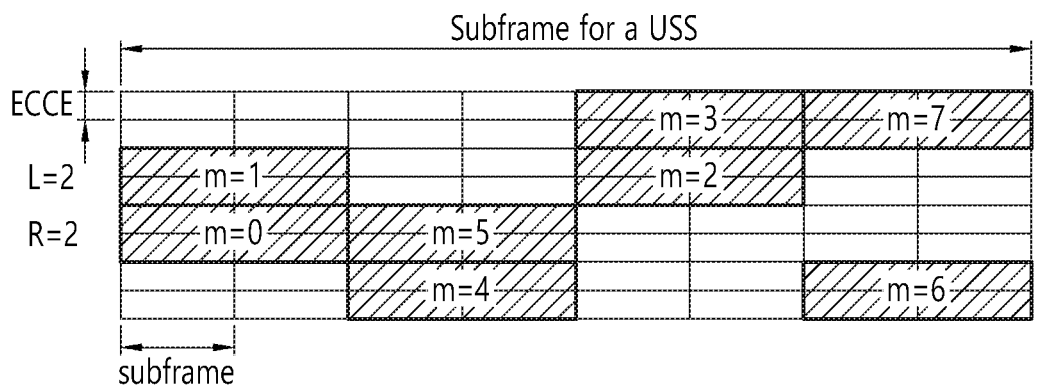
Figure 25B:
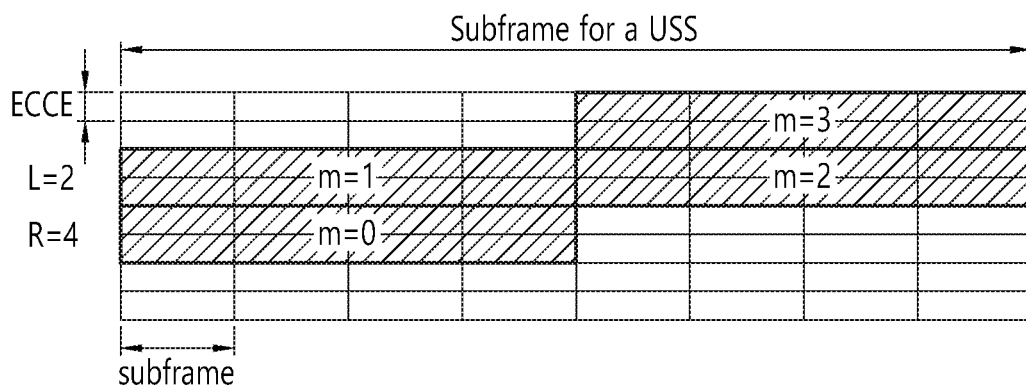
Figure 25B:
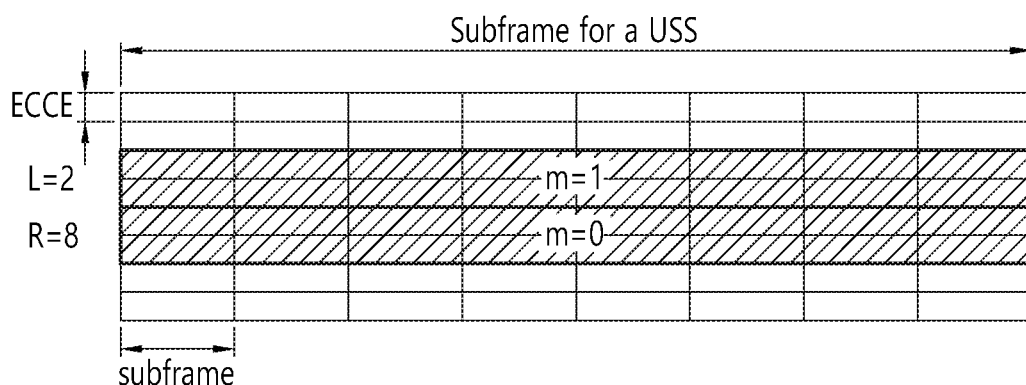

In this case, as illustrated in FIG. 25B, decoding candidates (having the same L value and different R values) having the same starting subframe and transmitted through the same ECCE resource may have the same decoding candidate index. In this case, when two decoding candidates having the same L and R1 and R2 (R1<R2) are present, the LC device may perform aggregation on an additional subframe in an LLR buffer storing a decoding candidate regarding R1 having the same decoding candidate index to decode a decoding candidate regarding R2.

TABLE 16

| Number of PRB pairs | Number of EPDCCH candidates | | | | | | | | | | | | | | |
|---|---|---|---|---|---|---|---|---|---|---|---|---|---|---|---|
| | R = 1 | | | | | R = 4 | | | | R = 8 | | | R = 16 | | |
| | L = 2 | L = 4 | L = 8 | L = 16 | L = 24 | L = 4 | L = 8 | L = 16 | L = 24 | L = 8 | L = 16 | L = 24 | L = 8 | L = 16 | L = 24 |
| 2 | 2 | 1 | 1 | 0 | 0 | 1 | 1 | 0 | 0 | 0 | 0 | 0 | 0 | 0 | 0 |
| 4 | 4 | 2 | 1 | 1 | 0 | 2 | 1 | 1 | 0 | 1 | 1 | 0 | 1 | 1 | 0 |
| 6 | 3 | 2 | 2 | 1 | 1 | 2 | 2 | 1 | 1 | 2 | 1 | 1 | 2 | 1 | 1 |

III. Third Disclosure: Details Regarding Method for Configuring M-PDCCH Search Space In this clause, details for expressing decoding candidates forming an M-PDCCH search space are proposed.

III-1. Method 1

In a first method, a resource in which one M-PDCCH is transmitted within a set of subframes forming a search space may be configured as a decoding candidate. Here, decoding candidates having the same {L,R} present within the set of subframes forming the search space may have different decoding candidate indices.

Here, one decoding candidate may include a total of L*R number of ECCE resources including L number of LCCEs in every subframe of R number of subframes. Here, a position of an ECCE resource forming a decoding candidate is the same in each subframe forming one decoding candidate.

FIGS. 25A and 25B illustrate Method 1 of the third disclosure of the present specification.

As illustrated in FIG. 25A, when a decoding candidate index is m, a plurality of decoding candidates having the same {L,R} within a set of subframes forming a search space may be present, and such decoding candidates may include different ECCE and/or subframe resources. Here, although two decoding candidates are configured using the same ECCE resource, if they include different subframe resources, the two decoding candidates may have different decoding candidate indices.

In this case, the decoding candidates within the search space may have different starting subframes within the search space. To this end, regarding each decoding candidate, a starting ECCE resource and a starting subframe resource within the subframe forming the corresponding decoding candidate are required to be defined.

III-2. Method 2

In a second method, a resource in which one M-PDCCH can be transmitted within a set of subframes forming a search space may be configured as a decoding candidate. Here, decoding candidates having the same {L,R} present within the set of subframes forming the search space may have different decoding candidate indices. Or, decoding candidates having the same {L,R} starts to be transmitted in the same subframe position may have different decoding candidate indices.

Here, one decoding candidate may include a total of L*R number of ECCE resources including L number of LCCEs in every subframe of R number of subframes. Here, a position of an ECCE resource forming a decoding candidate is the same in each subframe forming one decoding candidate.

Figure 26:
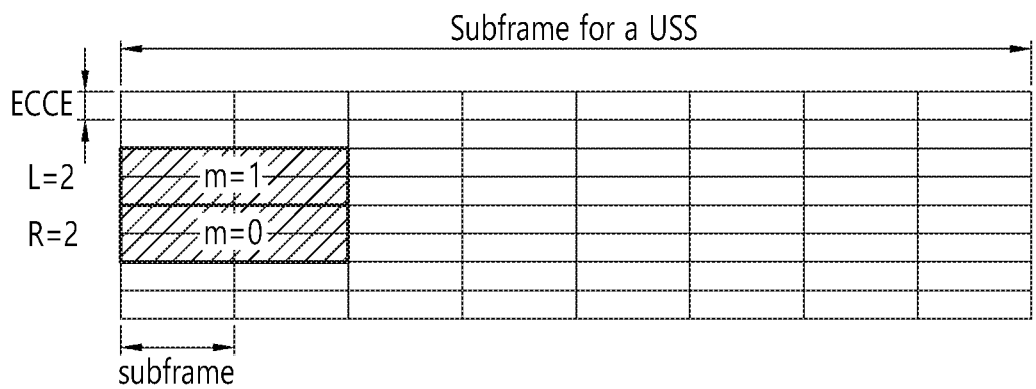
FIG. 26 illustrates method 2 of the third disclosure of the present invention.
Figure 26:
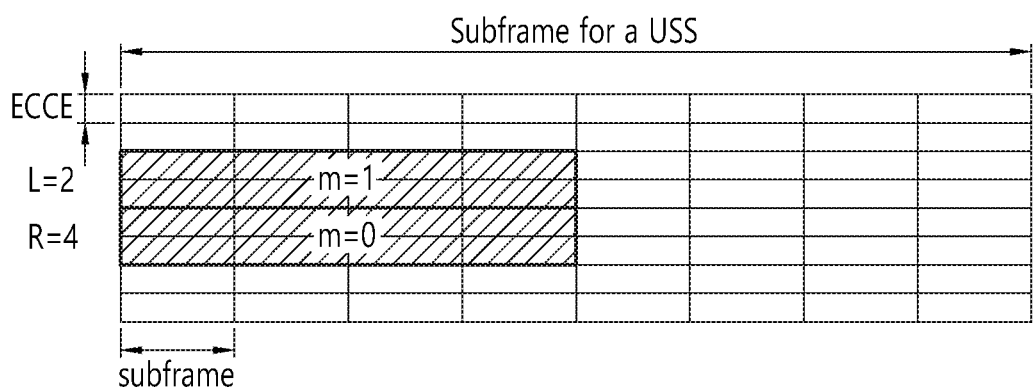
Figure 26:
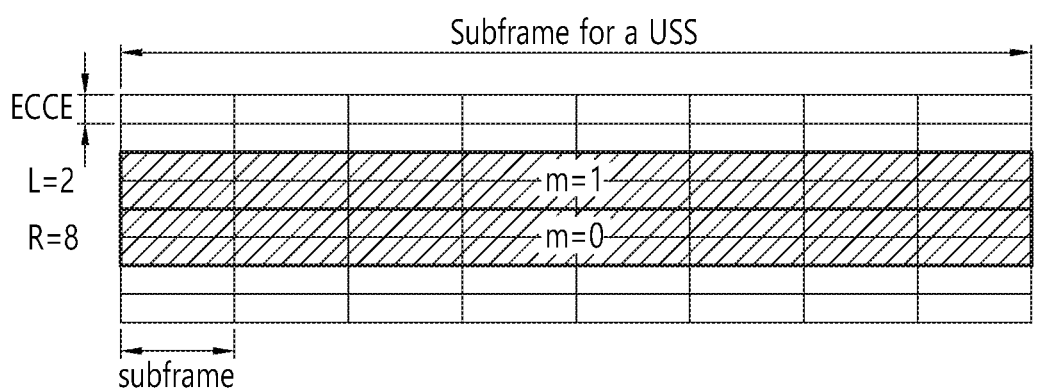

FIG. 26 illustrates Method 2 of the third disclosure of the present specification.

As illustrated in FIG. 26, when a decoding candidate index is m, a plurality of decoding candidates having the same {L,R} within a set of subframes forming a search space may be present, and such decoding candidates may include different ECCE resources and include the same subframe resources.

In this case, the decoding candidates within the search space may have a starting subframe (one starting subframe) within the search space. Thus, within the search space, the starting subframe resource is not required to be defined in every decoding candidate and a starting ECCE resource within the subframe forming the corresponding decoding candidate is required to be defined in every decoding candidate. Here, a position of a starting subframe in which the M-PDCCH may be transmitted may be defined by search spaces.

In order to inform the number of decoding candidates present within the search space, a total number of decoding candidates present within a set of subframes forming the search space by each {L,R} may be informed. Or, the number of decoding candidates having the same starting subframe may be informed by each {L,R}. Here, the ECCE resource forming each decoding candidate m may be defined by equation in a standard document. The decoding candidates having {L,R} may be present at every position of the starting subframe defined search space-specifically or defined by a maximum R value of the search space.

III-3. Method 3

In another method, a resource in which one M-PDCCH may be transmitted within a set of subframes forming a search space may be configured as a decoding candidate. Here, regarding decoding candidates having the same {L,R}, decoding candidates including the same subframe resource and different ECCE resources have different decoding candidate indices, but decoding candidates including different subframe resources may have the same decoding candidate index.

Here, one decoding candidate may include a total of L*R number of ECCE resources including L number of LCCEs in every subframe of R number of subframes. Here, a position of an ECCE resource forming a decoding candidate is the same in each subframe forming one decoding candidate.

Figure 27:
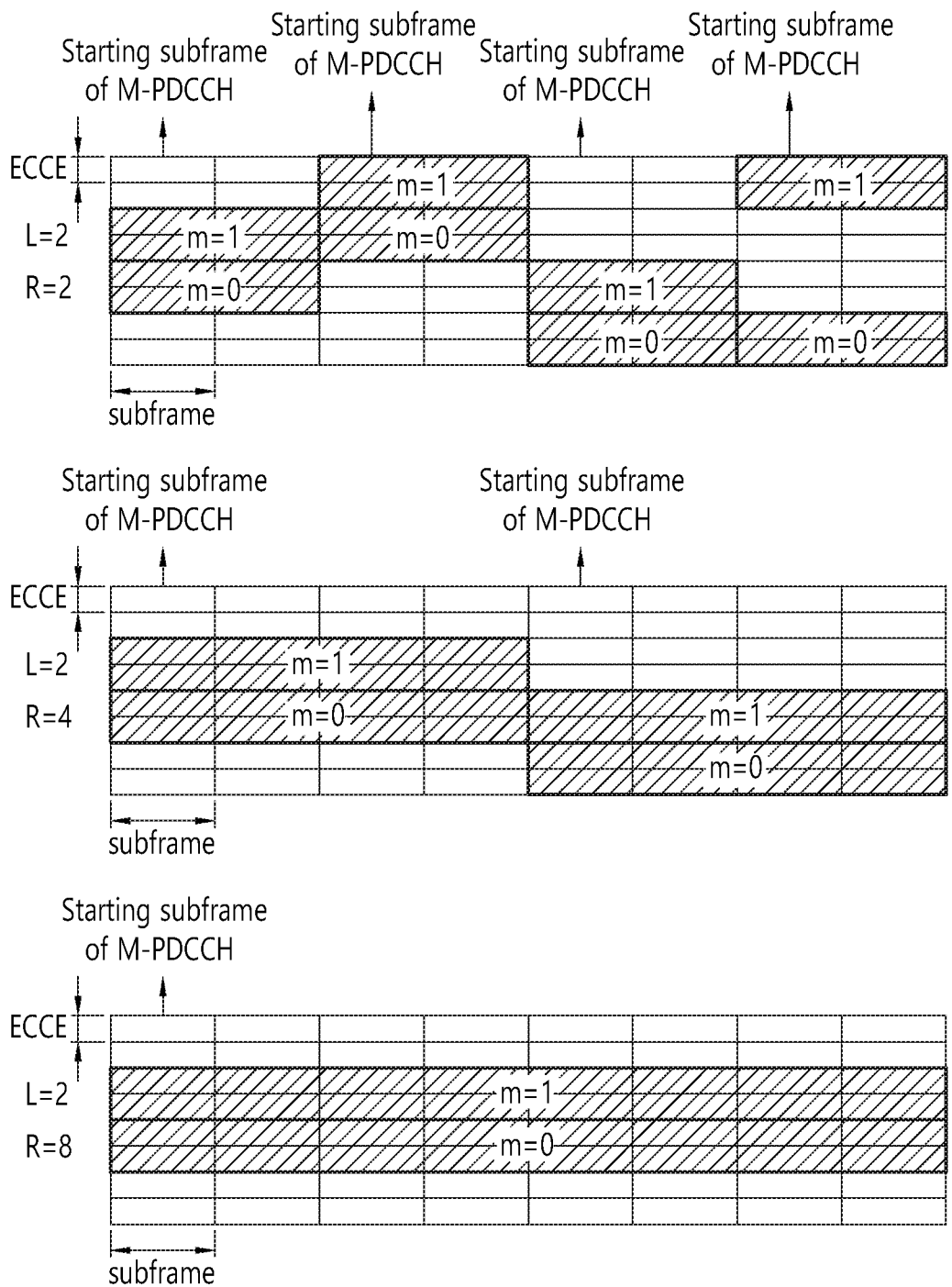
FIG. 27 illustrates method 3 of the third disclosure of the present invention.

FIG. 27 illustrates Method 3 of the third disclosure of the present specification.

As illustrated in FIG. 27, when a decoding candidate index is m, a plurality of decoding candidates having the same {L,R} regarding the same starting subframe may be present. Here, the decoding candidates having the same starting subframe position include different ECCE resources and have different decoding candidate indices. The decoding candidate indices are differentiated only when they have the same starting subframe, and are not differentiated when they have different starting subframes.

Here, a position of a starting subframe in which the M-PDCCH may be transmitted may be defined by each R. Here, regarding decoding candidates having a specific starting subframe position, a starting ECCE resource within a subframe forming the corresponding decoding candidate is required to be defined.

In order to inform about the number of decoding candidates present within the search space, a total number of decoding candidates having the same starting subframe position by {L,R} may be informed. In this case, the ECCE resource forming each decoding candidate m may be defined by equation in a standard document. The decoding candidates having {L,R} may be present at every starting subframe position defined by R of their own.

III-4. Method 4

In another method, a decoding candidate may be defined in one subframe as in the existing M-PDCCH. Here, the M-PDCCH may be transmitted through decoding candidates present in R number of (consecutive) subframes. That is, one M-PDCCH having {L,R} is transmitted through one decoding candidate having the aggregation level (L) within one subframe, and transmitted through a total of R number of decoding candidates, each in every subframe. Here, a decoding candidate index in which one M-PDCCH is transmitted in every subframe may be the same, and the same decoding candidate in R number of subframes in which one M-PDCCH is transmitted may be configured using the same ECCE resource.

To this end, an ECCE resource forming a decoding candidate in each subframe may be defined, and here, the ECCE resource forming a decoding candidate may be determined by transmission starting subframe position of the M-PDCCH transmitted using the corresponding subframe or a transmission starting SFN, rather than a subframe index (slot index) in which the corresponding candidate is transmitted.

Figure 28:
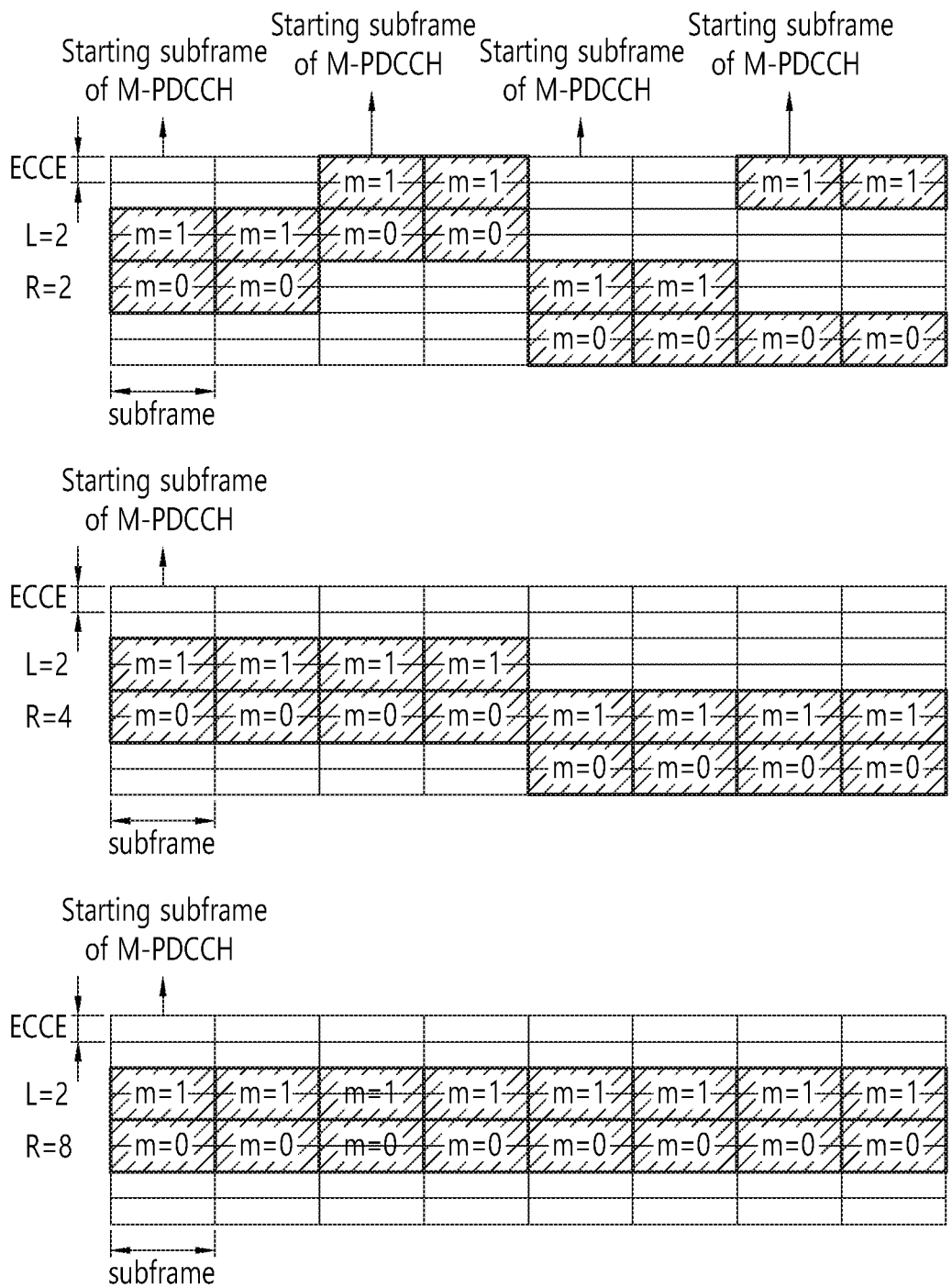
FIG. 28 illustrates method 4 of the third disclosure of the present invention.

FIG. 28 illustrates Method 4 of the third disclosure of the present specification.

As illustrated in FIG. 28, one M-PDCCH may be transmitted through R number of decoding candidates having the same decoding candidate index present in R number of subframes, starting from the starting subframe position. Here, an ECCE position forming the same decoding candidate may be changed in units of the M-PDCCH transmission starting subframe position.

Here, the starting subframe position of the M-PDCCH may be defined by each R, defined search space-specifically, or defined by a maximum R value of the search space.

In order to inform about the number of decoding candidates present within the search space, the number of decoding candidates present within a subframe may be informed by each L or each {L,R}. In this case, the ECCE resource forming each decoding candidate m may be defined by equation in a standard document.

III-5. Method 5

In another method, a decoding candidate may be defined in one subframe as in the existing M-PDCCH. Here, an ECCE resource in which the M-PDCCH is transmitted on R number of subframes may be determined by a subframe position at which transmission of the M-PDCCH starts. The M-PDCCH may be transmitted using one of decoding candidates present in a subframe position at which transmission of the M-PDCCH starts, and may be transmitted through R number of subframes using the same ECCE resource as that forming the corresponding decoding candidate. That is, the position of the ECCE in which the M-PDCCH is transmitted may be determined by decoding candidates present within the M-PDCCH transmission starting subframe, and the M-PDCCH may be transmitted through the same ECCE resource (or EREG resource) as that on the M-PDCCH transmission starting subframe on every subframe in which the M-PDCCH is transmitted. An example thereof is illustrated in FIG. 29.

Figure 29:
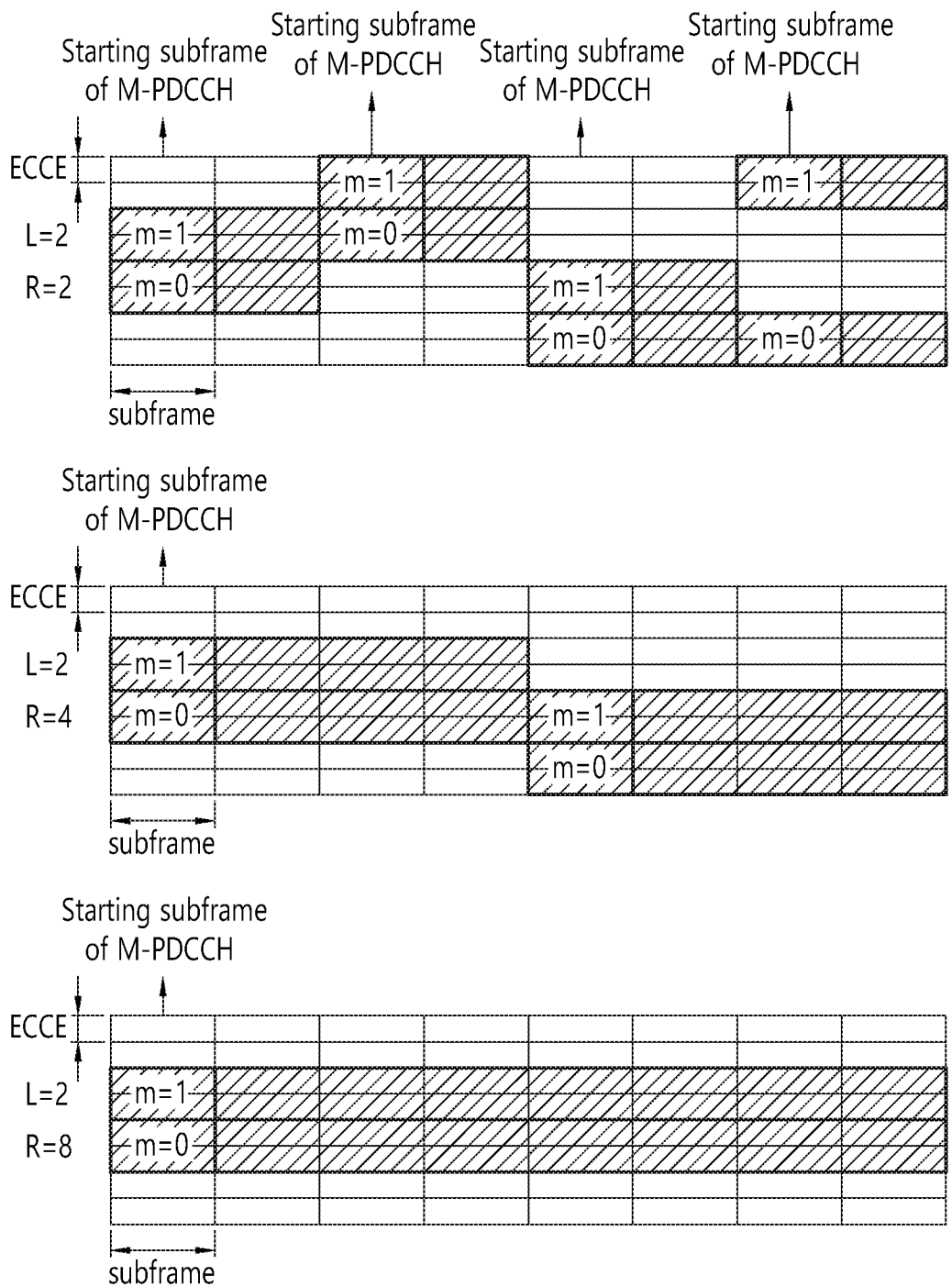
FIG. 29 illustrates method 5 of the third disclosure of the present invention.

FIG. 29 illustrates Method 5 of the third disclosure of the present specification.

In the example illustrated in FIG. 29, a starting subframe position of the M-PDCCH may be defined by each R, defined by search space-specifically, or defined by a maximum R value of the search space.

In order to inform about the number of decoding candidates present within the search space, the number of decoding candidates present within a subframe may be informed by each L or each {L,R}. In this case, the ECCE resource forming each decoding candidate m may be defined by equation in a standard document.

IV. Fourth Disclosure: Details of Method for Configuring Decoding Candidate of M-PDCCH Search Space IV-1. PRB Set Size The M-PDCCH for an LC device operating within a subband of 6 PRBs may have one or two PRB sets like the existing M-PDCCH. Here, a PRB set size of each PRB set may be 2 or 4. Here, the M-PDCCH transmitted with an aggregation level (AL)=24 may be transmitted through every ECCE resource forming a PRB set including two PRBs and a PRB set including four PRBs (a total of two PRB sets), thus being transmitted through 24 ECCEs. Here, the two PRB sets are configured by PRB positions not overlapping each other within a subband.

In this case, when one PRB set is set, a size of the corresponding PRB set may be 2 or 4. Also, when two PRB sets are set, {PRB set size for p1 and PRB set size for p2} supported for a PRB set 0 (i.e., p1) and a PRB set 1 (i.e., p2) may be as follows.

In a first example, {2, 2}, {2, 4}, {4, 2}, {4, 4}
In a second example, {2, 2}, {2, 4}, {4, 2}
Here, substantially, in case where {PRB set size for p1 and PRB set size for p2}={4, 4}, since resources forming the two PRB sets always overlap with respect to two PRBs, it may be meaningless to set the corresponding PRB set size.
In a third example, {2, 4}, {4, 2}
Here, in order to always support the aggregation level (AL)=24 transmitted through every ECCE resource forming the PRB set including two PRBs and a PRB set including four PRBs (a total of two PRB sets), only {2, 4}, {4, 2} may be supported.

When two PRB sets are set, a supported PRB set size may be varied according to a CE mode. For example, CE mode A may follow the second example, and CE mode B may follow the third example. Or, the CE mode A may follow the first example, and the CE mode B may follow the third example.

Also, the number of supported PRB sets may be varied according to CE modes. For example, in the case of the CE mode A, one or two PRB sets may be set, and in the case of the CE mode B, only two PRB sets may be set.

IV-2. Aggregation Level

A subset of the aggregation level (L) may be determined on the basis of a CE mode and a PRB-set size of the M-PDCCH.

A supportable AL (L) may be varied according to CE modes (or CE levels). An initial CE mode may be determined according to a RACH procedure and may be reset by RRC.

CE mode A: An aggregation level {1, 2, 4, 8, 16, 24} may be supported for a normal CP, and an aggregation level {1, 2, 4, 8, 12} may be supported for an extended CP.

CE mode B: An aggregation level {8, 16, 24} may be supported for the normal CP and an aggregation level {4, 8, 12} may be supported for the extended CP.

Also, the supportable aggregation level (L) for an LC device may be determined depending on a PRB-set size and the number of PRB-sets. Like the existing EPDCCH, one or two PRB-sets may be set in the LC device and each PRB-set may have a PRB-set size 2 or 4. An initial PRB-set size may be previously set or may be set through an SIB and may be reset through RRC signaling.

PRB-set having two PRBs: L≤8 may be supported
PRB-set having four PRBs: L≤16 may be supported
Two PRB-sets having 2+4 PRBs: L=24 may be supported IV-3. Repetition Number A population set of a repetition number (R) for the M-PDCCH may be {1, 2, 4, 8, 16, 32, 64, 128, 256}. Also, a subset of the repetition number 9R) monitored by an LC device may be determined by a maximum R (i.e., Rmax). When monitored according to a repetition number 4, a subset of the repetition number (R) to be monitored for the M-PDCCH on a USS may be {Rmax/8, Rmax/4, Rmax/2, Rmax}. An initial value of Rmax may be set through an SIB at every CE level and the Rmax may be reset through RRC signaling.

IV-4. Transmission Type Per PRB Set

Like the EPDCCH, the M-PDCCH supports distributed transmission or localized transmission. Here, when one PRB set is set, the corresponding PRB set may support a distributed transmission mode or a localized transmission mode. When two PRB sets are set, {transmission mode for p1, transmission mode for p2} supported for PRB set 0 (i.e., p1), PRB set 1 (i.e., p2) may be as follows.

In a first example, {localized, localized}, {distributed, distributed}, {localized, distributed}

In a second example, {localized, localized}, {distributed, distributed

IV-5. Number of Decoding Candidates

The number of decoding candidates monitored by the LC device may be varied according to a size of a PRB-set of the M-PDCCH, an aggregation level, a transmission mode, and/or a CE mode. The number of decoding candidates monitored by the LC device may be varied according to a repetition number of the M-PDCCH or a maximum repetition number, instead of the CE mode.

The number of decoding candidates for the M-PDCCH may be defined on a standard document. However, since a subset of the aggregation level (L) monitored by the LC device and the number of decoding candidates are dependent upon a PRB-set size and the CE mode, the number of decoding candidates may be defined in every PRB-set size, CP length, and CE mode.

Here, in an example below, the number of decoding candidates refers to the number of decoding candidates of each starting subframe in which the M-PDCCH is transmitted.

IV-5-1. Method 1. Individual Decoding Candidate Table Based on Transmission Mode The number of decoding candidates monitored by the LC device may be varied according to a PRB-set size of the M-PDCCH, an aggregation level, a transmission mode, a CP length, and a CE mode. For example, in the case of a normal CP, the number of decoding candidates monitored by the LC device may be as follows.

In the case of the CE mode A or in case where the M-PDCCH repetition number or a maximum repetition number is small, the number of decoding candidates monitored by the LC device may be as follows.

Table 17 below illustrates an example in which one PRB set having a distributed transmission mode is set.

TABLE 17

| PRB-set size | Number of decoding candidates | | | | | |
|---|---|---|---|---|---|---|
| | L = 1 | L = 2 | L = 4 | L = 8 | L = 16 | L = 24 |
| 2 | 8 | 4 | 2 | 1 | 0 | 0 |
| 4 | 4 | 5 | 4 | 2 | 1 | 0 |

The following table illustrates an example in which one PRB set having a localized transmission mode is configured.

TABLE 18

| PRB-set size | Number of decoding candidates | | | | | |
|---|---|---|---|---|---|---|
| | L = 1 | L = 2 | L = 4 | L = 8 | L = 16 | L = 24 |
| 2 | 8 | 4 | 2 | 1 | 0 | 0 |
| 4 | 6 | 6 | 2 | 2 | 0 | 0 |

The following table illustrates an example in which two PRB sets having a distributed transmission mode are configured.

TABLE 19

| PRB-set size for | Number of decoding candidates | | | | | |
|---|---|---|---|---|---|---|
| p1, p2 | L = 1 | L = 2 | L = 4 | L = 8 | L = 16 | L = 24 |
| 2, 2 | 2, 2 | 3, 3 | 2, 2 | 1, 1 | 0, 0 | 0 |
| 4, 4 | 2, 2 | 2, 2 | 2, 2 | 1, 1 | 1, 1 | 0 |
| 4, 2 | 3, 1 | 3, 2 | 3, 1 | 1, 1 | 1, 0 | 0 |

The following table illustrates an example in which two PRB sets having a distributed transmission mode are configured.

TABLE 20

| PRB-set size for | Number of decoding candidates | | | | | |
|---|---|---|---|---|---|---|
| p1, p2 | L = 1 | L = 2 | L = 4 | L = 8 | L = 16 | L = 24 |
| 2, 2 | 2, 2 | 3, 3 | 2, 2 | 1, 1 | 0, 0 | 0 |
| 4, 4 | 2, 2 | 2, 2 | 2, 2 | 1, 1 | 1, 1 | 0 |
| 4, 2 | 3, 1 | 3, 1 | 3, 1 | 1, 1 | 1, 0 | 1 |

A configuration of monitoring the aggregation level (AL)=24 is given to the LC device and the number of decoding candidates monitored by the LC device may be varied according to whether the aggregation level (AL)=24 is monitored. For example, in case where the LC device does not monitor the aggregation level (AL)=24, the LC device may monitor the M-PDCCH using Table 19, and in case where the LC device monitors the aggregation level (AL)=24, the LC device may monitor the M-PDCCH using Table 20.

Table 21 and Table 22 below show two PRB sets when a localized transmission mode is used for all of the PRB sets.

TABLE 21

| PRB-set size | Number of decoding candidates | | | | | |
|---|---|---|---|---|---|---|
| for p1, p2 | L = 1 | L = 2 | L = 4 | L = 8 | L = 16 | L = 24 |
| 2, 2 | 3, 3 | 3, 3 | 1, 1 | 1, 1 | 0, 0 | 0 |
| 4, 4 | 3, 3 | 3, 3 | 1, 1 | 1, 1 | 0, 0 | 0 |
| 4, 2 | 4, 2 | 4, 2 | 1, 1 | 1, 1 | 0, 0 | 0 |

TABLE 22

| PRB-set size | Number of decoding candidates | | | | | |
|---|---|---|---|---|---|---|
| for p1, p2 | L = 1 | L = 2 | L = 4 | L = 8 | L = 16 | L = 24 |
| 2, 2 | 3, 3 | 3, 3 | 1, 1 | 1, 1 | 0, 0 | 0 |
| 4, 4 | 3, 3 | 3, 3 | 1, 1 | 1, 1 | 0, 0 | 0 |
| 4, 2 | 4, 2 | 4, 1 | 1, 1 | 1, 1 | 0, 0 | 1 |

A configuration of monitoring the aggregation level (AL)=24 is given to the LC device and the number of decoding candidates monitored by the LC device may be varied according to whether the aggregation level (AL)=24 is monitored. For example, in case where the LC device does not monitor the aggregation level (AL)=24, the LC device may monitor the M-PDCCH using Table 21, and in case where the LC device monitors the aggregation level (AL)=24, the LC device may monitor the M-PDCCH using Table 22.

The following table shows two PRB sets having a localized transmission mode and a distributed transmission mode with respect to each of the PRB sets.

TABLE 23

| PRB-set size | Number of decoding candidates | | | | | |
|---|---|---|---|---|---|---|
| for p1, p2 | L = 1 | L = 2 | L = 4 | L = 8 | L = 16 | L = 24 |
| 2, 2 | 4, 1 | 4, 2 | 2, 2 | 0, 1 | 0, 0 | 0 |
| 4, 4 | 4, 1 | 4, 1 | 2, 2 | 0, 1 | 0, 1 | 0 |
| 2, 4 | 4, 1 | 4, 1 | 2, 2 | 0, 1 | 0, 1 | 0 |
| 4, 2 | 4, 1 | 4, 1 | 2, 2 | 1, 1 | 0, 0 | 0 |

In case where transmission modes of the two PRB sets are different, the aggregation level (AL)=24 is not supported.

In the case of CE mode B or in case where the M-PDCCH repetition number or a maximum repetition number is large, the number of decoding candidates monitored by the LC device may be as follows.

The following table shows one PRB set having the distributed transmission mode.

TABLE 24

| | Number of decoding candidates | | |
|---|---|---|---|
| PRB-set size | L = 8 | L = 16 | L = 24 |
| 2 | 1 | 0 | 0 |
| 4 | 1 | 1 | 0 |

Table 25 and Table 26 below show one PRB set having the localized transmission mode.

TABLE 25

| | Number of decoding candidates | | |
|---|---|---|---|
| PRB-set size | L = 8 | L = 16 | L = 24 |
| 2 | 1 | 0 | 0 |
| 4 | 2 | 0 | 0 |

TABLE 26

| | Number of decoding candidates | | |
|---|---|---|---|
| PRB-set size | L = 8 | L = 16 | L = 24 |
| 2 | 1 | 0 | 0 |
| 4 | 1 | 1 | 0 |

Table 27 and Table 28 below show PRB sets having a distributed transmission mode regarding all of PRB sets.

TABLE 27

| PRB-set size | Number of decoding candidates | | |
|---|---|---|---|
| for p1, p2 | L = 8 | L = 16 | L = 24 |
| 2, 2 | 1, 1 | 0, 0 | 0 |
| 4, 4 | 0, 0 | 1, 1 | 0 |
| 4, 2 | 0, 1 | 1, 0 | 0 |

TABLE 28

| PRB-set size | Number of decoding candidates | | |
|---|---|---|---|
| for p1, p2 | L = 8 | L = 16 | L = 24 |
| 2, 2 | 1, 1 | 0, 0 | 0 |
| 4, 4 | 0, 0 | 1, 1 | 0 |
| 4, 2 | 0, 0 | 1, 0 | 1 |

A configuration of monitoring the aggregation level (AL)=24 is given to the LC device and the number of decoding candidates monitored by the LC device may be varied according to whether the aggregation level (AL)=24 is monitored. For example, in case where the LC device does not monitor the aggregation level (AL)=24, the LC device may monitor the M-PDCCH using Table 27, and in case where the LC device monitors the aggregation level (AL)=24, the LC device may monitor the M-PDCCH using Table 28.

Table 29, Table 30, and Table 31 below show two PRB sets of the localized transmission mode regarding all of PRB sets.

TABLE 29

| PRB-set size | Number of decoding candidates | | |
|---|---|---|---|
| (p1, p2) | L = 8 | L = 16 | L = 24 |
| 2, 2 | 1, 1 | 0, 0 | 0 |
| 4, 4 | 1, 1 | 0, 0 | 0 |
| 4, 2 | 1, 1 | 0, 0 | 0 |

TABLE 30

| PRB-set size | Number of decoding candidates | | |
|---|---|---|---|
| (p1, p2) | L = 8 | L = 16 | L = 24 |
| 2, 2 | 1, 1 | 0, 0 | 0 |
| 4, 4 | 0, 0 | 1, 1 | 0 |
| 4, 2 | 0, 1 | 1, 0 | 0 |

TABLE 31

| PRB-set size | Number of decoding candidates | | |
|---|---|---|---|
| (p1, p2) | L = 8 | L = 16 | L = 24 |
| 2, 2 | 1, 1 | 0, 0 | 0 |
| 4, 4 | 0, 0 | 1, 1 | 0 |
| 4, 2 | 0, 0 | 1, 0 | 1 |

A configuration of monitoring the aggregation level (AL)=24 is separately given to the LC device and the number of decoding candidates monitored by the LC device may be varied according to whether the aggregation level (AL)=24 is monitored. For example, in case where the LC device does not monitor the aggregation level (AL)=24, the LC device may monitor the M-PDCCH using Table 29 or Table 30, and in case where the LC device monitors the aggregation level (AL)=24, the LC device may monitor the M-PDCCH using Table 31.

Table 32 and Table 33 below show two PRB sets having a localized transmission mode and the distributed transmission mode regarding each PRB set.

TABLE 32

| PRB-set size | Number of decoding candidates | | |
|---|---|---|---|
| (p1, p2) | L = 8 | L = 16 | L = 24 |
| 2, 2 | 1, 1 | 0, 0 | 0 |
| 4, 4 | 0, 0 | 1, 1 | 0 |
| 2, 4 | 1, 0 | 0, 1 | 0 |
| 4, 2 | 0, 1 | 1, 0 | 0 |

TABLE 33

| PRB-set size | Number of decoding candidates | | |
|---|---|---|---|
| (p1, p2) | L = 8 | L = 16 | L = 24 |
| 2, 2 | 1, 1 | 0, 0 | 0 |
| 4, 4 | 1, 0 | 0, 1 | 0 |
| 2, 4 | 1, 0 | 0, 1 | 0 |
| 4, 2 | 0, 1 | 1, 0 | 0 |

In case where transmission mode types of two PRB sets are different, the aggregation level (AL)=24 cannot be supported.

IV-5-2. Method 2. Same Decoding Candidate Table Irrespective of Transmission Mode The number of decoding candidates monitored by the LC device may be varied according to a PRB-set size of the M-PDCCH, an aggregation level, a transmission mode, a CP length, and a CE mode. For example, the number of decoding candidates monitored by the LC device may be as follows.

In the case of the CE mode A or in case where the M-PDCCH repetition number or a maximum repetition number for the M-PDCCH monitored by the LC device is small, the number of decoding candidates monitored by the LC device may be as follows.

Table 34 and Table 35 below show one PRB set for the normal CP.

TABLE 34

| | Number of decoding candidates | | | | | |
|---|---|---|---|---|---|---|
| PRB-set size | L = 1 | L = 2 | L = 4 | L = 8 | L = 16 | L = 24 |
| 2 | 8 | 4 | 2 | 1 | 0 | 0 |
| 4 | 4 | 5 | 4 | 2 | 1 | 0 |

TABLE 35

| | Number of decoding candidates | | | | | |
|---|---|---|---|---|---|---|
| PRB-set size | L = 1 | L = 2 | L = 4 | L = 8 | L = 16 | L = 24 |
| 2 | 8 | 4 | 2 | 1 | 0 | 0 |
| 4 | 6 | 6 | 2 | 2 | 0 | 0 |

The following table shows one PRB set for the extended CP.

TABLE 36

| | Number of decoding candidates | | | | |
|---|---|---|---|---|---|
| PRB-set size | L = 1 | L = 2 | L = 4 | L = 8 | L = 12 |
| 2 | 4 | 2 | 1 | 0 | 0 |
| 4 | 8 | 4 | 2 | 1 | 0 |

Table 37 and Table 38 below show two PRB sets for the normal CP.

TABLE 37

| PRB-set size | Number of decoding candidates | | | | | |
|---|---|---|---|---|---|---|
| (p1, p2) | L = 1 | L = 2 | L = 4 | L = 8 | L = 16 | L = 24 |
| 2, 2 | 2, 2 | 3, 3 | 2, 2 | 1, 1 | 0, 0 | 0 |
| 4, 4 | 2, 2 | 2, 2 | 2, 2 | 1, 1 | 1, 1 | 0 |
| 4, 2 | 3, 1 | 3, 1 | 3, 1 | 1, 1 | 1, 0 | 1 |

TABLE 38

| PRB-set size | Number of decoding candidates | | | | | |
|---|---|---|---|---|---|---|
| (p1, p2) | L = 1 | L = 2 | L = 4 | L = 8 | L = 16 | L = 24 |
| 2, 2 | 2, 2 | 3, 3 | 2, 2 | 1, 1 | 0, 0 | 0 |
| 4, 4 | 2, 2 | 2, 2 | 2, 2 | 1, 1 | 1, 1 | 0 |
| 4, 2 | 3, 1 | 3, 2 | 3, 1 | 1, 1 | 1, 0 | 0 |

A configuration of monitoring the aggregation level (AL)=24 is given to the LC device and the number of decoding candidates monitored by the LC device may be varied according to whether the aggregation level (AL)=24 is monitored. For example, in case where the LC device does not monitor the aggregation level (AL)=24, the LC device may monitor the M-PDCCH using Table 37, and in case where the LC device monitors the aggregation level (AL)=24, the LC device may monitor the M-PDCCH using Table 38.

Also, in case where transmission modes of two PRB-sets are different, the number of decoding candidates monitored by the LC device may be varied, compared with a case where transmission modes of the two PRB-sets are the same (or compared with a case where transmission modes of the two PRB-sets are the same and the aggregation level (AL)=24 is supported). For example, in case where the transmission modes of the two PRB-sets are the same (or in case where the transmission modes of the two PRB-sets are the same and the aggregation level (AL)=24 is supported), the LC device may monitor the M-PDCCH using Table 37 above, and in case where the transmission modes of the two PRB-sets are different, the LC device may monitor the M-PDCCH using Table 39 above.

Also, in the case of L=24, the PDCCH may be monitored only when the PRB resources forming the two PRB-sets do not overlap. That is, it may be assumed that the candidate of L=24 is not present in case where PRB resources forming the two PRB-sets do not overlap. Or, the number of decoding candidates monitored by the LC device may be varied according to whether the PRB resources forming the two PRB-sets overlap. For example, in case where the PRB resources forming the two PRB-sets overlap, the LC device may monitor the M-PDCCH using Table 37 above, and in case where the PRB resources forming the two PRB-sets do not overlap, the LC device may monitor the M-PDCCH using Table 38 above.

Table 39 and Table 40 below show two PRB sets for the extended CP.

TABLE 39

| PRB-set size | | Number of decoding candidates for Set1 and set2 | | | | |
|---|---|---|---|---|---|---|
| Set 1 | Set 2 | L = 1 | L = 2 | L = 4 | L = 8 | L = 12 |
| 2 | 2 | 4, 4 | 2, 2 | 1, 1 | 0 | 0 |
| 4 | 4 | 3, 3 | 3, 3 | 1, 1 | 1, 1 | 0 |
| 4 | 2 | 5, 3 | 3, 1 | 1, 1 | 1, 0 | 1 |

TABLE 40

| PRB-set size | | Number of decoding candidates for Set1 and set2 | | | | |
|---|---|---|---|---|---|---|
| Set 1 | Set 2 | L = 1 | L = 2 | L = 4 | L = 8 | L = 12 |
| 2 | 2 | 4, 4 | 2, 2 | 1, 1 | 0 | 0 |
| 4 | 4 | 3, 3 | 3, 3 | 1, 1 | 1, 1 | 0 |
| 4 | 2 | 5, 3 | 3, 2 | 1, 1 | 1, 0 | 0 |

A configuration of monitoring the aggregation level (AL)=12 is given to the LC device and the number of decoding candidates monitored by the LC device may be varied according to whether the aggregation level (AL)=12 is monitored. For example, in case where the LC device does not monitor the aggregation level (AL)=12, the LC device may monitor the M-PDCCH using Table 39, and in case where the LC device monitors the aggregation level (AL)=12, the LC device may monitor the M-PDCCH using Table 40.

Also, in case where transmission modes of two PRB-sets are different, the number of decoding candidates monitored by the LC device may be varied, compared with a case where transmission modes of the two PRB-sets are the same (or compared with a case where transmission modes of the two PRB-sets are the same and the aggregation level (AL)=12 is supported). For example, in case where the transmission modes of the two PRB-sets are the same (or in case where the transmission modes of the two PRB-sets are the same and the aggregation level (AL)=12 is supported), the LC device may monitor the M-PDCCH using Table 39 above, and in case where the transmission modes of the two PRB-sets are different, the LC device may monitor the M-PDCCH using Table 40 above.

Also, characteristically, in the case of L=12, the PDCCH may be monitored only when the PRB resources forming the two PRB-sets do not overlap. That is, it may be assumed that the candidate of L=12 is not present in case where PRB resources forming the two PRB-sets do not overlap. Or, the number of decoding candidates monitored by the LC device may be varied according to whether the PRB resources forming the two PRB-sets overlap. For example, in case where the PRB resources forming the two PRB-sets overlap, the LC device may monitor the M-PDCCH using Table 39 above, and in case where the PRB resources forming the two PRB-sets do not overlap, the LC device may monitor the M-PDCCH using Table 40 above.

In the case of CE mode B or in case where an M-PDCCH repetition number of a maximum repetition number is large, the number of decoding candidates monitored by the LC device may be as follows. An M-PDCCH having a low repetition number (R) in the CE mode B may start to be transmitted in a section in which an M-PDCCH having a high repetition number (R) is transmitted. In this case, the number of decoding candidates which can be simultaneously monitored may be smaller than the number of 16/repetition levels. When it is assumed that the number of repetition levels monitored by the LC device is 4, the number of decoding candidates which can be simultaneously monitored is also 4. Or, in order to reduce a size of an LLR buffer and complexity of the LC device, a maximum number of decoding candidates which can be simultaneously monitored may be assumed to be 2. A USS and a CSS for the CE mode B may share the same aggregation level and the number of decoding candidates at every PRB-set.

Table 41 and Table 42 below show one PRB set for the normal CP. A maximum number of decoding candidates which can be simultaneously monitored in Table 41 below is 2.

TABLE 41

| PRB-set size | Number of decoding candidates | | |
|---|---|---|---|
| | L = 8 | L = 16 | L = 24 |
| 2 | 1 | 0 | 0 |
| 4 | 1 | 1 | 0 |

A maximum number of decoding candidates which can be simultaneously monitored in Table 42 below is 4.

TABLE 42

| PRB-set size | Number of decoding candidates | | |
|---|---|---|---|
| | L = 8 | L = 16 | L = 24 |
| 2 | 1 | 0 | 0 |
| 4 | 2 | 1 | 0 |

Table 43 and Table 44 below show one PRB set in the extended CP. A maximum number of decoding candidates which can be simultaneously monitored in Table 43 below is 2.

TABLE 43

| PRB-set size | Number of decoding candidates | | |
|---|---|---|---|
| | L = 4 | L = 8 | L = 12 |
| 2 | 1 | 0 | 0 |
| 4 | 1 | 1 | 0 |

A maximum number of decoding candidates which can be simultaneously monitored in Table 44 below is 4.

TABLE 44

| PRB-set size | Number of decoding candidates | | |
|---|---|---|---|
| | L = 4 | L = 8 | L = 12 |
| 2 | 1 | 0 | 0 |
| 4 | 2 | 1 | 0 |

Table 45 and Table 46 below show two PRB sets in the normal CP according to option (a). A maximum number of decoding candidates which can be simultaneously monitored in Table 45 below is 2.

TABLE 45

| PRB-set size | Number of decoding candidates | | |
|---|---|---|---|
| (p1, p2) | L = 8 | L = 16 | L = 24 |
| 2, 2 | 1, 1 | 0, 0 | 0 |
| 4, 4 | 0, 1 | 1, 0 | 0 |
| 4, 2 | 0, 0 | 1, 0 | 1 |

A maximum number of decoding candidates which can be simultaneously monitored in Table 46 below is 4.

TABLE 46

| PRB-set size | Number of decoding candidates | | |
|---|---|---|---|
| (p1, p2) | L = 8 | L = 16 | L = 24 |
| 2, 2 | 1, 1 | 0, 0 | 0 |
| 4, 4 | 1, 1 | 1, 1 | 0 |
| 4, 2 | 1, 1 | 1, 0 | 1 |

Alternatively, Table 47 and Table 48 below show two PRB sets in the normal CP according to option (b). A maximum number of decoding candidates which can be simultaneously monitored in Table 47 below is 2.

TABLE 47

| PRB-set size | Number of decoding candidates | | |
|---|---|---|---|
| (p1, p2) | L = 8 | L = 16 | L = 24 |
| 2, 2 | 1, 1 | 0, 0 | 0 |
| 4, 4 | 0, 1 | 1, 0 | 0 |
| 4, 2 | 0, 1 | 1, 0 | 0 |

A maximum number of decoding candidates which can be simultaneously monitored in Table 48 below is 4.

TABLE 48

| PRB-set size | Number of decoding candidates | | |
|---|---|---|---|
| (p1, p2) | L = 8 | L = 16 | L = 24 |
| 2, 2 | 1, 1 | 0, 0 | 0 |
| 4, 4 | 1, 1 | 1, 1 | 0 |
| 4, 2 | 2, 1 | 1, 0 | 0 |

A configuration of monitoring the aggregation level (AL)=24 is given to the LC device and the number of decoding candidates monitored by the LC device may be varied according to whether the aggregation level (AL)=24 is monitored. For example, in case where the LC device does not monitor the aggregation level (AL)=24, the LC device may monitor the M-PDCCH using any one of Table 47 and Table 48, and in case where the LC device monitors the aggregation level (AL)=24, the LC device may monitor the M-PDCCH using any one of Table 45 and Table 46.

Also, in case where transmission modes of two PRB-sets are different, the number of decoding candidates monitored by the LC device may be varied, compared with a case where transmission modes of the two PRB-sets are the same (or compared with a case where transmission modes of the two PRB-sets are the same and the aggregation level (AL)=24 is supported). For example, in case where the transmission modes of the two PRB-sets are the same (or in case where the transmission modes of the two PRB-sets are the same and the aggregation level (AL)=24 is supported), the LC device may monitor the M-PDCCH using any one of Table 45 and Table 46, and in case where the transmission modes of the two PRB-sets are different, the LC device may monitor the M-PDCCH using any one of Table 47 and Table 48.

Also, in the case of L=24, the PDCCH may be monitored only when the PRB resources forming the two PRB-sets do not overlap. That is, it may be assumed that the candidate of L=24 is not present in case where PRB resources forming the two PRB-sets do not overlap. Or, the number of decoding candidates monitored by the LC device may be varied according to whether the PRB resources forming the two PRB-sets overlap. For example, in case where the PRB resources forming the two PRB-sets overlap, the LC device may monitor the M-PDCCH using any one of Table 47 and Table 48, and in case where the PRB resources forming the two PRB-sets do not overlap, the LC device may monitor the M-PDCCH using any one of Table 45 and Table 46.

Meanwhile, Table 49 and Table 50 show two PRB sets in the extended CP according to the option (a).

A maximum number of decoding candidates which can be simultaneously monitored in Table 49 below is 2.

TABLE 49

| PRB-set size | | Number of decoding candidates for Set1 and set2 | | |
|---|---|---|---|---|
| Set 1 | Set 2 | L = 4 | L = 8 | L = 12 |
| 2 | 2 | 1, 1 | 0, 0 | 0 |
| 4 | 4 | 0, 1 | 1, 0 | 0 |
| 4 | 2 | 0, 0 | 1, 0 | 1 |

A maximum number of decoding candidates which can be simultaneously monitored in Table 50 below is 4.

TABLE 50

| PRB-set size | | Number of decoding candidates for Set1 and set2 | | |
|---|---|---|---|---|
| Set 1 | Set 2 | L = 4 | L = 8 | L = 12 |
| 2 | 2 | 1, 1 | 0, 0 | 0 |
| 4 | 4 | 1, 1 | 1, 1 | 0 |
| 4 | 2 | 1, 1 | 1, 0 | 1 |

Alternatively, Table 51 and Table 52 below show two PRB sets in the extended CP according to the option (b). A maximum number of decoding candidates which can be simultaneously monitored in Table 51 below is 2.

TABLE 51

| PRB-set size | | Number of decoding candidates for Set1 and set2 | | |
|---|---|---|---|---|
| Set 1 | Set 2 | L = 4 | L = 8 | L = 12 |
| 2 | 2 | 1, 1 | 0, 0 | 0 |
| 4 | 4 | 0, 1 | 1, 0 | 0 |
| 4 | 2 | 0, 1 | 1, 0 | 0 |

A maximum number of decoding candidates which can be simultaneously monitored in Table 52 below is 4.

TABLE 52

| PRB-set size | | Number of decoding candidates for Set1 and set2 | | |
|---|---|---|---|---|
| Set 1 | Set 2 | L = 4 | L = 8 | L = 12 |
| 2 | 2 | 1, 1 | 0, 0 | 0 |
| 4 | 4 | 1, 1 | 1, 1 | 0 |
| 4 | 2 | 2, 1 | 1, 0 | 0 |

A configuration of monitoring the aggregation level (AL)=12 is given to the LC device and the number of decoding candidates monitored by the LC device may be varied according to whether the aggregation level (AL)=12 is monitored. For example, in case where the LC device does not monitor the aggregation level (AL)=12, the LC device may monitor the M-PDCCH using any one of Table 51 and Table 52, and in case where the LC device monitors the aggregation level (AL)=12, the LC device may monitor the M-PDCCH using any one of Table 49 and Table 50.

Also, in case where transmission modes of two PRB-sets are different, the number of decoding candidates monitored by the LC device may be varied, compared with a case where transmission modes of the two PRB-sets are the same (or compared with a case where transmission modes of the two PRB-sets are the same and the aggregation level (AL)=12 is supported). For example, in case where the transmission modes of the two PRB-sets are the same (or in case where the transmission modes of the two PRB-sets are the same and the aggregation level (AL)=12 is supported), the LC device may monitor the M-PDCCH using any one of Table 49 and Table 50, and in case where the transmission modes of the two PRB-sets are different, the LC device may monitor the M-PDCCH using any one of Table 51 and Table 52.

Also, in the case of L=12, the PDCCH may be monitored only when the PRB resources forming the two PRB-sets do not overlap. That is, it may be assumed that the candidate of L=12 is not present in case where PRB resources forming the two PRB-sets do not overlap. Or, the number of decoding candidates monitored by the LC device may be varied according to whether the PRB resources forming the two PRB-sets overlap. For example, in case where the PRB resources forming the two PRB-sets overlap, the LC device may monitor the M-PDCCH using any one of Table 51 and Table 52, and in case where the PRB resources forming the two PRB-sets do not overlap, the LC device may monitor the M-PDCCH using any one of Table 49 and Table 50.

The CSS for monitoring the M-PDCCH scheduling paging may follow an aggregation level supported in the CE mode B, a PRB set size, and/or the number of decoding candidates by transmission modes. In detail, in the case of the CSS for monitoring the M-PDCCH scheduling paging, it is assumed that two PRB sets are always present and a size of each PRB set is two PRBs and four PRBs (or four PBs and two PRBs). Thus, only the case in which the PRB-set sizes for p1 and p2 are 4 and 2 may be supported.

Like the M-PDCCH USS, a subframe in which the M-PDCCH for the CSS may start, an aggregation level, and a repetition level are required to be determined. A design of the M-PDCCH CSS may be similar to that of the M-PDCCH USS.

IV-6. CS for RAR

A design of a CSS scheduling PAR may be similar to a design of a USS having the same CE level.

Regarding the CSS for scheduling RAR, a PRB-set size may be fixed to 2+4 or may be set semi-statically through an SIB. A supportable aggregation level and repetition number may be the same as those of USS. A subset of the aggregation level (L) is determined dependently from a PRB-set size and the CE mode. Also, a subset of the repetition number (R) is determined dependently from a maximum supportable repetition number (i.e., $R_{max}$). Here, $R_{max}$ may be set by CE levels through an SIB.

IV-7. CSS for Paging

Although LC devices have different CE levels, the LC devices monitor a CSS for scheduling paging in the same manner, and thus, the CSS for paging is required to be designed to cover all the CE levels. Also, the CSS for paging is required to be designed on the basis of a design of a USS regarding the CE mode B.

Regarding the CSS for scheduling RAR, a PRB-set size may be fixed to 2+4 or may be set semi-statically through an SIB. A subset of the aggregation level (L) is determined dependently from a PRB-set size and the CE mode. Also, a subset of the repetition number (R) is determined dependently from a maximum supportable repetition number (i.e., $R_{max}$). Here, $R_{max}$ may be a fixed value or may be set through an SIB. In order to support various repetition numbers, the subset of the repetition number (R) for the M-PDCCH USS may be $\{R_{max}/64, R_{max}/16, R_{max}/4, R_{max}\}$.

The embodiments of the present invention described above may be implemented through various means. For example, embodiments of the present invention may be implemented by hardware, firmware, software, or a combination thereof. This will be described with reference to the accompanying drawings.

Figure 30:
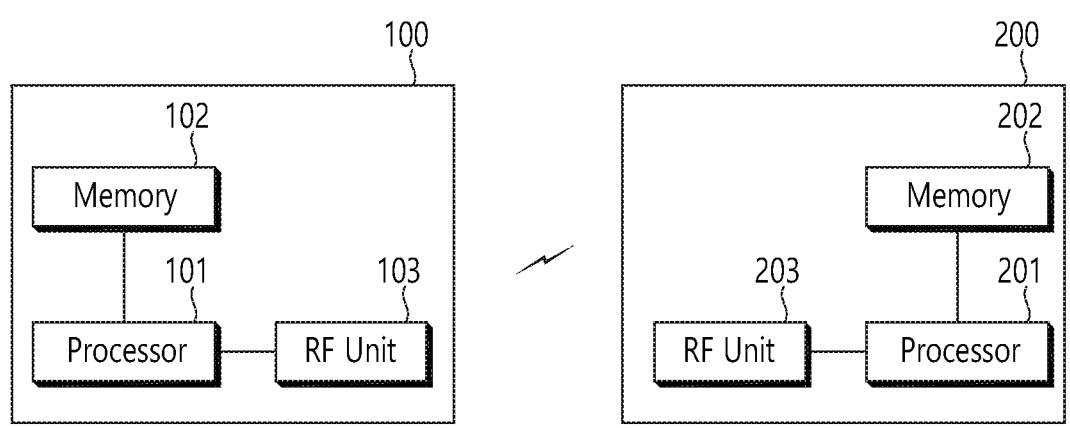
FIG. 30 is a block diagram of a wireless communication system implementing a disclosure of the present invention.

FIG. 30 is a block diagram illustrating a wireless communication system implementing the disclosure of this specification.

A base station (BS) (i.e., an eNB or an eNodeB) includes a processor 201, a memory 202, and a transceiver (or a radio frequency (RF) unit) 203. The memory 202 is connected to the processor 201 and stores various types of information for driving the processor 201. The transceiver (or the RF unit) 203 is connected to the processor 201 and transmits and/or receives a radio signal. The processor 201 implements the proposed function, process, and/or method. In the aforementioned embodiment, an operation of the BS may be implemented by the processor 201.

An LC device 100 includes a processor 101, a memory 102, and a transceiver (or an RF unit) 103. The memory 102 is connected to the processor 101 and stores various types of information for driving the processor 101. The transceiver (or the RF unit) 103 is connected to the processor 101 and transmits and/or receives a radio signal. The processor 1721 implements the proposed function, process, and/or method.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for receiving a downlink control channel, the method performed by a user equipment (UE) and comprising:
   receiving a first repetition number by higher layer signaling,
   wherein the first repetition number is one of $\{1, 2, 4, 8, 16, 32, 64, 128, 256\}$,
   wherein four repetition numbers are available based on the first repetition number, and
   wherein the four repetition numbers include the first repetition number, a second repetition number equal to a half of the first repetition number, a third repetition number equal to one-fourth of the first repetition number, and a fourth repetition number equal to one-eighth of the first repetition number;
   determining a search space for monitoring the downlink control channel,
   wherein the search space is defined by candidates of the downlink control channel based on Physical Resource Block (PRB) set size, an aggregation number and one of the four repetition numbers,
   wherein one of $\{2, 4, 8, 16, 24\}$ is used as the aggregation number for the candidates of the downlink control channel, based on the PRB set size and based on that the UE is configured with a coverage enhancement (CE) mode A,
   wherein one of $\{8, 16, 24\}$ is used for the aggregation number for the candidates of the downlink control channel, based on the PRB set size and based on that the UE is configured with the CE mode B, and
   wherein each candidate of the downlink control channel is repeated on a plurality of consecutive subframes starting with a start subframe; and
   decoding each candidate of the downlink control channel repeated on the plurality of the consecutive subframes.

2. The method of claim 1, wherein when a number of a repetition number is N, the N is counted only using valid downlink subframes.

3. The method of claim 1, wherein the PRB set size is one of 2 PRBs, 4 PRBs or 2+4 PRB s.

4. The method of claim 3,
   wherein a set $\{2, 4, 8\}$ is used as the aggregation number for the candidates of the downlink control channel, based on that the PRB set size is 2 PRBs and based on the UE is configured with a coverage enhancement (CE) mode A, and
   wherein a set $\{2, 4, 8, 16\}$ is used as the aggregation number for the candidates of the downlink control channel, based on that the PRB set size is 4 PRBs and based on the UE is configured with a coverage enhancement (CE) mode A.

5. The method of claim 3,
   wherein a set $\{8\}$ is used as the aggregation number for the candidates of the downlink control channel, based on that the PRB set size is 2 PRBs and based on the UE is configured with a coverage enhancement (CE) mode B, and
   wherein a set $\{8, 16\}$ is used as the aggregation number for the candidates of the downlink control channel, based on that the PRB set size is 4 PRBs and based on the UE is configured with a coverage enhancement (CE) mode B.

6. The method of claim 1, wherein a number of the consecutive subframes for repeating the downlink control channel is determined based on the one of the four repetition numbers.

7. The method of claim 1, wherein the search space exists per a specific subframe periodicity.

8. The method of claim 1, further comprising:
determining the number of the candidates at the aggregation number in each subframe among the plurality of consecutive subframes.

9. The method of claim 8, further comprising:
determining enhanced control channel element (ECCE) resources based on the determined number of the candidates.

10. A user equipment (UE) for receiving a downlink control channel, the UE comprising:
a transceiver; and
a processor operatively connected to the transceiver, wherein the processor is configured to:
control the transceiver to receive a first repetition number by higher layer signaling,
wherein the first repetition number is one of {1, 2, 4, 8, 16, 32, 64, 128, 256},
wherein four repetition numbers are available based on the first repetition number, and
wherein the four repetition numbers include the first repetition number, a second repetition number equal to a half of the first repetition number, a third repetition number equal to one-fourth of the first repetition number, and a fourth repetition number equal to one-eighth of the first repetition number;
determine a search space for monitoring the downlink control channel,
wherein the search space is defined by candidates of the downlink control channel based on Physical Resource Block (PRB) set size, an aggregation number and one of the four repetition numbers,
wherein one of {2, 4, 8, 16, 24} is used as the aggregation number for the candidates of the downlink control channel, based on the PRB set size and based on that the UE is configured with a coverage enhancement (CE) mode A,
wherein one of {8, 16, 24} is used for the aggregation number for the candidates of the downlink control channel, based on the PRB set size and based on that the UE is configured with the CE mode B, and
wherein each candidate of the downlink control channel is repeated on a plurality of consecutive subframes starting with a start subframe; and wherein the processor is further configured to decode each candidate of the downlink control channel repeated on the plurality of the consecutive subframes.

11. The UE of claim 10, wherein when a number of a repetition number is N, the N is counted only using valid downlink subframes.

12. The UE of claim 10, wherein the PRB set size is one of 2 PRBs, 4 PRBs or 2+4 PRBs.

13. The UE of claim 12,
wherein a set {2, 4, 8} is used as the aggregation number for the candidates of the downlink control channel, based on that the PRB set size is 2 PRBs and based on the UE is configured with a coverage enhancement (CE) mode A, and
wherein a set {2, 4, 8, 16} is used as the aggregation number for the candidates of the downlink control channel, based on that the PRB set size is 4 PRBs and based on the UE is configured with a coverage enhancement (CE) mode A.

14. The UE of claim 12,
wherein a set {8} is used as the aggregation number for the candidates of the downlink control channel, based on that the PRB set size is 2 PRBs and based on the UE is configured with a coverage enhancement (CE) mode B, and
wherein a set {8, 16} is used as the aggregation number for the candidates of the downlink control channel, based on that the PRB set size is 4 PRBs and based on the UE is configured with a coverage enhancement (CE) mode B.

15. The UE of claim 10, wherein a number of the consecutive subframes for repeating the downlink control channel is determined based on the plurality of values related to the repetition number.

16. The UE of claim 10, wherein the search space exists per a specific subframe periodicity.

17. The UE of claim 10, wherein the processor is further configured to:
determine the number of the candidates at the aggregation number in each subframe among the plurality of consecutive subframes.

18. The UE of claim 10, wherein the processor is further configured to:
determine enhanced control channel element (ECCE) resources based on the determined number of the candidates.

19. The method of claim 1, wherein a location of the start subframe is determined based on a value received by the higher layer signaling.

20. The UE of claim 10, wherein a location of the start subframe is determined based on a value received by the higher layer signaling.

* * * * *